US012758844B2

(12) United States Patent
Augustin et al.

(10) Patent No.: US 12,758,844 B2

(45) **Date of Patent: *Oct. 13, 2026**

(54) SYSTEMS AND METHODS FOR COMPUTER VISION AND MACHINE-LEARNING BASED FORM FEEDBACK

(71) Applicant: Tempo Interactive Inc., San Francisco, CA (US)

(72) Inventors: Joshua Augustin, San Francisco, CA (US); Moawia Eldeeb, Brisbane, CA (US)

(73) Assignee: Tempo Interactive Inc., San Francisco, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/788,058

(22) Filed: Jul. 29, 2024

(65) Prior Publication Data

US 2025/0083021 A1 Mar. 13, 2025

Related U.S. Application Data

(63) Continuation of application No. 17/591,313, filed on Feb. 2, 2022, now Pat. No. 12,048,868, which is a (Continued)

(51) Int. Cl.

*A63B 71/00* (2006.01)
*A63B 21/00* (2006.01)
(Continued)

(52) U.S. Cl.

CPC ...... *A63B 71/0036* (2013.01); *A63B 21/4037* (2015.10); *A63B 24/0006* (2013.01);
(Continued)

(58) Field of Classification Search

CPC ............ A63B 71/0036; A63B 21/4037; A63B 24/0006; A63B 24/0062; A63B 24/0075;
(Continued)

(56) References Cited

U.S. PATENT DOCUMENTS

| | | |
|---|---|---|
| 4,811,946 A | 3/1989 | Pelczar |
| 8,029,410 B2 | 10/2011 | Shea |

(Continued)

FOREIGN PATENT DOCUMENTS

| | | |
|---|---|---|
| KR | 20220102674 A | 7/2022 |

OTHER PUBLICATIONS

International Search Report and Written Opinion for International Application No. PCT/US2021/043344 dated Nov. 19, 2021.

*Primary Examiner* — Sundhara M Ganesan

(74) *Attorney, Agent, or Firm* — AHMANN KLOKE LLP

(57) ABSTRACT

A plurality of motion sensors capable of capturing IR video, depth video, and RGB images. Periodically emitting IR pulses. Capturing IR video, depth video, and RGB images of a user. Generating a point cloud of the user. Generating a 3D model of the user including the point cloud of the user. Inputting the IR video, depth video, and RGB images into a machine learning model. Estimating a set of joints of the user in the 3D model. Tracking, based on the estimated set of joints of the user in the 3D model, the user's motion over a period of time. Determining a number of repetitions of an exercise performed by the user. Determining a feedback value. Calculating, based on the number of repetitions and the feedback value, a user exercise score. Providing, via a graphical user interface, the user exercise score and the feedback value to the user.

20 Claims, 37 Drawing Sheets

Related U.S. Application Data continuation of application No. 17/347,514, filed on Jun. 14, 2021, now Pat. No. 11,273,343.

(60) Provisional application No. 63/057,155, filed on Jul. 27, 2020.

(51) Int. Cl.

| | |
|---|---|
| ***A63B 21/072*** | (2006.01) |
| ***A63B 24/00*** | (2006.01) |
| ***A63B 71/04*** | (2006.01) |
| ***A63B 71/06*** | (2006.01) |
| ***G06F 3/01*** | (2006.01) |
| ***G06F 3/04815*** | (2022.01) |
| ***G06N 3/08*** | (2023.01) |
| ***G06V 40/20*** | (2022.01) |
| ***G09B 19/00*** | (2006.01) |

(52) U.S. Cl.

CPC ...... *A63B 24/0062* (2013.01); *A63B 24/0075* (2013.01); *A63B 71/04* (2013.01); *A63B 71/0622* (2013.01); *G06F 3/011* (2013.01); *G06F 3/04815* (2013.01); *G06N 3/08* (2013.01); *G09B 19/0038* (2013.01); *A63B 21/072* (2013.01); *A63B 2024/0015* (2013.01); *A63B 2024/0068* (2013.01); *A63B 2024/0081* (2013.01); *A63B 2071/0625* (2013.01); *A63B 2071/0638* (2013.01); *A63B 2071/0647* (2013.01); *A63B 2210/06* (2013.01); *A63B 2220/05* (2013.01); *A63B 2220/803* (2013.01); *A63B 2220/805* (2013.01); *A63B 2220/806* (2013.01); *A63B 2220/833* (2013.01); *G06T 2207/30196* (2013.01); *G06T 2207/30221* (2013.01); *G06V 40/23* (2022.01)

(58) Field of Classification Search

CPC ... A63B 71/04; A63B 71/0622; A63B 21/072; A63B 2024/0015; A63B 2024/0068; A63B 2024/0081; A63B 2071/0625; A63B 2071/0638; A63B 2071/0647; A63B 2210/06; A63B 2220/05; A63B 2220/803; A63B 2220/805; A63B 2220/806; A63B 2220/833; A63B 2225/20; A63B 2225/50; A63B 21/0724; A63B 21/0726; G06F 3/011; G06F 3/04815; G06N 3/08; G06N 3/0464; G06N 3/09; G09B 19/0038; G06T 2207/30196; G06T 2207/30221; G06V 40/23

See application file for complete search history.

(56) References Cited

U.S. PATENT DOCUMENTS

| | | | | |
|---|---|---|---|---|
| 8,109,862 | B2 | 2/2012 | Cooper | |
| 11,103,748 | B1 * | 8/2021 | Kong ................. | A63B 24/0062 |
| 12,048,868 | B2 * | 7/2024 | Augustin ........... | A63B 24/0006 |
| 2008/0179214 | A1 | 7/2008 | Hall | |
| 2010/0197399 | A1 | 8/2010 | Geiss | |
| 2010/0317488 | A1 | 12/2010 | Cartaya | |
| 2013/0123667 | A1 | 5/2013 | Komatireddy | |
| 2014/0134584 | A1 | 5/2014 | French | |
| 2015/0196804 | A1 | 7/2015 | Koduri | |
| 2015/0359462 | A1 | 12/2015 | Laan | |
| 2016/0096062 | A1 | 4/2016 | Moerth-Cross | |
| 2016/0199693 | A1 | 7/2016 | Vermilyea | |
| 2016/0332054 | A1 | 11/2016 | Smith | |
| 2017/0007884 | A1 | 1/2017 | Deutsch | |
| 2017/0148345 | A1 | 5/2017 | Dickerson | |
| 2017/0243511 | A1 | 8/2017 | Belsito | |
| 2017/0266491 | A1 | 9/2017 | Rissanen | |
| 2017/0304705 | A1 | 10/2017 | Hermandorfer | |
| 2017/0326411 | A1 | 11/2017 | Watterson | |
| 2018/0020954 | A1 | 1/2018 | Lillie | |
| 2018/0130373 | A1 | 5/2018 | Bernard-Paroly | |
| 2018/0184947 | A1 | 7/2018 | Richards | |
| 2019/0091515 | A1 | 3/2019 | Shavit | |
| 2019/0126122 | A1 | 5/2019 | Vester | |
| 2019/0209777 | A1 | 7/2019 | O'Connell | |
| 2019/0295436 | A1 | 9/2019 | Rubinstein | |
| 2020/0009444 | A1 | 1/2020 | Putnam | |
| 2020/0114190 | A1 | 4/2020 | Tuller | |
| 2020/0114204 | A1 | 4/2020 | Owusu | |
| 2020/0126284 | A1 | 4/2020 | Garofalo | |
| 2020/0175266 | A1 | 6/2020 | Murakami | |
| 2020/0254309 | A1 | 8/2020 | Watterson | |
| 2020/0302621 | A1 | 9/2020 | Kong | |
| 2020/0333462 | A1 | 10/2020 | Mellor | |
| 2020/0388187 | A1 | 12/2020 | Nakashima | |
| 2021/0004981 | A1 | 1/2021 | Song | |
| 2021/0019507 | A1 | 1/2021 | Brookshire | |
| 2021/0138332 | A1 | 5/2021 | Dalebout | |
| 2021/0154529 | A1 | 5/2021 | Barr | |
| 2023/0241450 | A1 * | 8/2023 | Sanghera ........... | A63B 24/0062 482/4 |

* cited by examiner

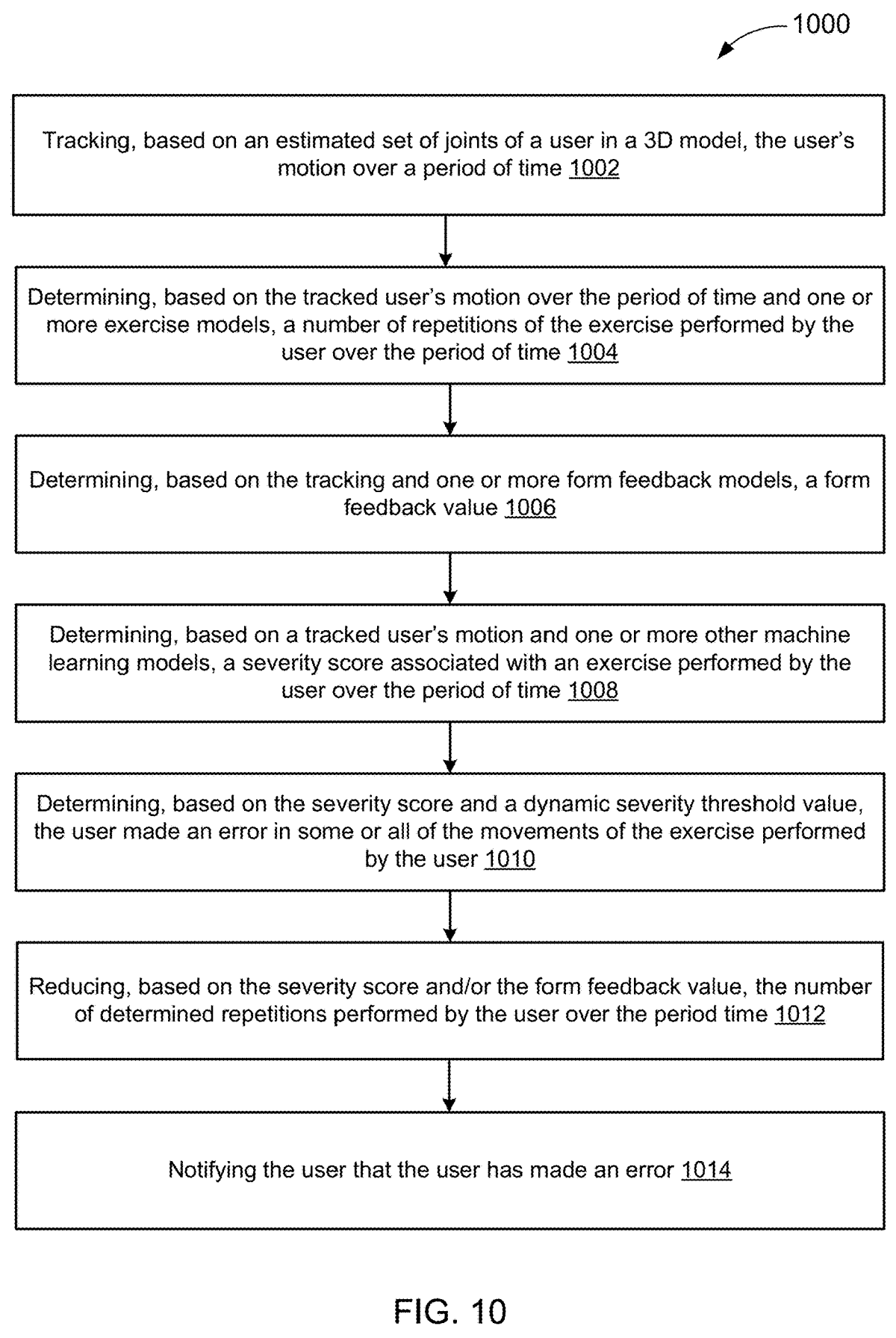

1000

Tracking, based on an estimated set of joints of a user in a 3D model, the user's motion over a period of time 1002

↓

Determining, based on the tracked user's motion over the period of time and one or more exercise models, a number of repetitions of the exercise performed by the user over the period of time 1004

↓

Determining, based on the tracking and one or more form feedback models, a form feedback value 1006

↓

Determining, based on a tracked user's motion and one or more other machine learning models, a severity score associated with an exercise performed by the user over the period of time 1008

↓

Determining, based on the severity score and a dynamic severity threshold value, the user made an error in some or all of the movements of the exercise performed by the user 1010

↓

Reducing, based on the severity score and/or the form feedback value, the number of determined repetitions performed by the user over the period time 1012

↓

Notifying the user that the user has made an error 1014

FIG. 10

Real-time feedback

Personalized experience that adjusts based on your inputs: weight recommendations and form feedback tailored to you

2000

2100

2300

2500

FIG. 26
PACE
55 REPS / MIN
AVG 25 cm - MAX 60 cm
DEPTH
133 CM
AVG 25 cm - MAX 60 cm
HEART RATE
100 BPM
ZONE: 2 - MAX: 50%

2600

SYSTEMS AND METHODS FOR COMPUTER VISION AND MACHINE-LEARNING BASED FORM FEEDBACK

CROSS-REFERENCE TO RELATED APPLICATIONS

The present application is a continuation of U.S. patent application Ser. No. 17/591,313 filed Feb. 2, 2022, now U.S. Pat. No. 12,048,868, which is a continuation of U.S. patent application Ser. No. 17/347,514 filed Jun. 14, 2021, now U.S. Pat. No. 11,273,343, which claims priority to U.S. Provisional Patent Application Ser. No. 63/057,155 filed Jul. 27, 2020, each of which is hereby incorporated by reference herein.

BRIEF DESCRIPTION OF THE DRAWINGS

FIG. 10 is a flowchart of an example of a method of determining a relative degree of error in an exercise performed by a user, and adjusting a repletion count accordingly.

DETAILED DESCRIPTION

Figure 1B:
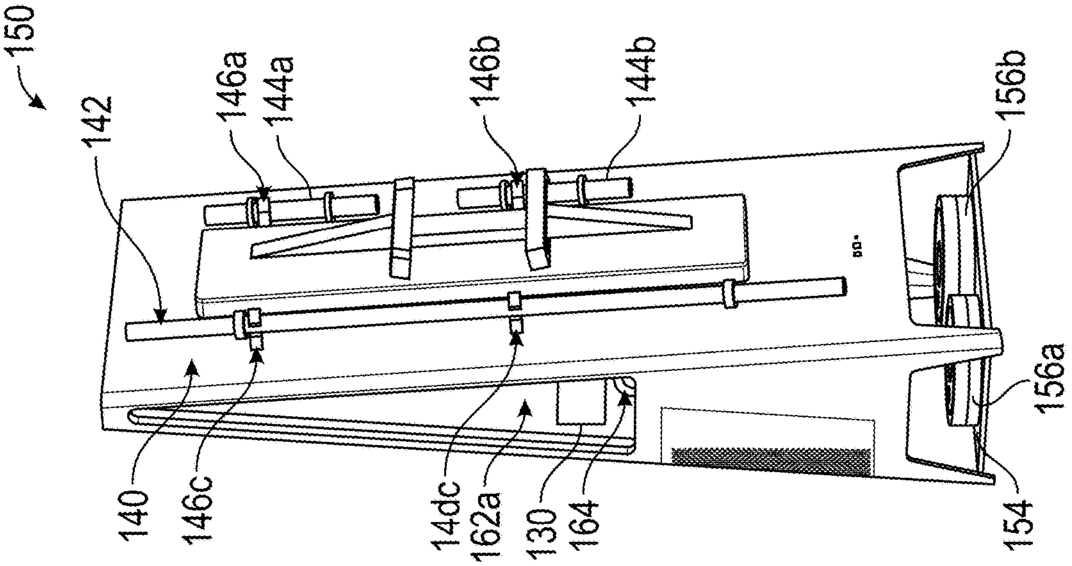
FIG. 1B depicts an example of a free-standing A-frame exercise equipment cabinet with an additional workbench.
Figure 1A:
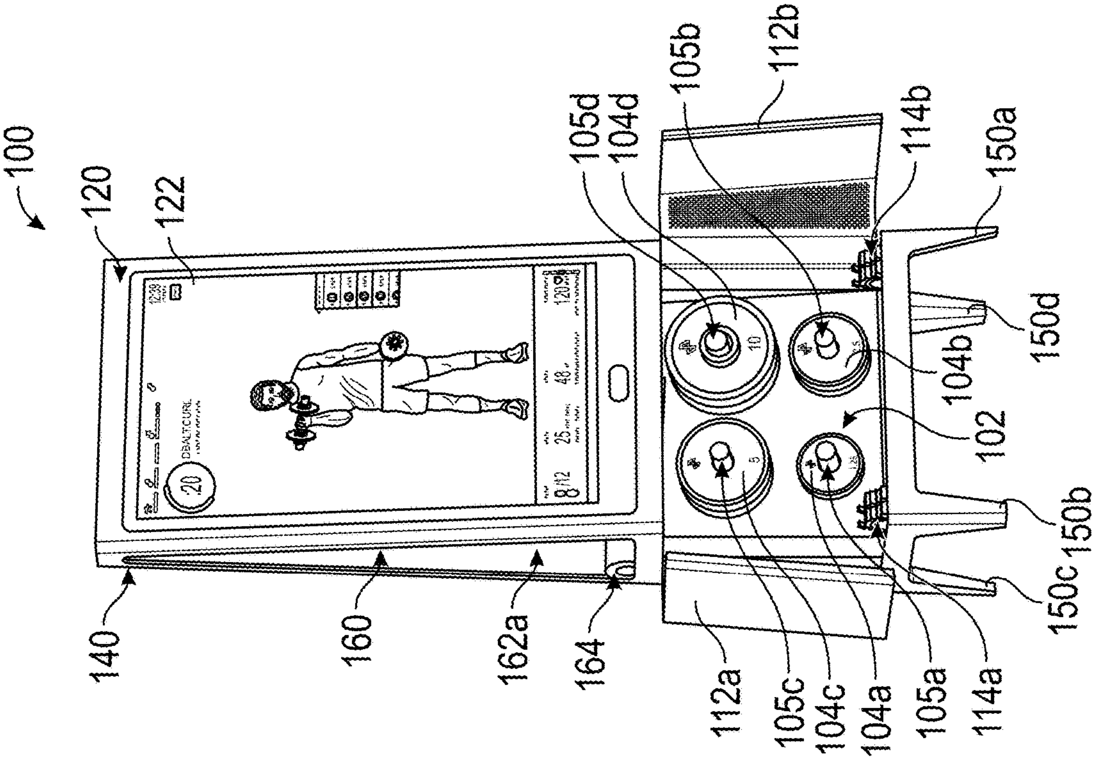
FIG. 1A depicts an example of a free-standing A-frame exercise equipment cabinet.

FIGS. 1A-1B depict examples of a free-standing A-frame exercise equipment cabinet 100. Generally, the free-standing A-frame exercise equipment cabinet 100 provides an "all-in-one" fitness platform (e.g., for home-use). In some embodiments, the free-standing exercise-equipment cabinet 100 has an integrated computer screen display (e.g., LCD or OLED) that can serve as both a display and as a touch screen user interface for an interactive exercise system. The free-standing A-frame exercise equipment cabinet 100 can also include storage containers for exercise equipment. Additionally, the free-standing A-frame exercise equipment cabinet 100 can locally house computer software and hardware, such as one or more three-dimensional (3D) camera (e.g., for use in computer vision applications) and an integrated computer.

In one example, the free-standing A-frame exercise equipment cabinet 100 stands six feet in height (or approximately six feet, e.g., within 6 inches of six feet), and two feet wide (or approximately two feet, e.g., within 6 inches of two feet). It will be appreciated that the free-standing A-frame exercise equipment cabinet 100 stands on its own and does not require a dedicated or full-time installation to be fully functional. In other words, the free-standing A-frame exercise equipment cabinet 100 can be easily positioned and moved (e.g., by one person) and placed in different locations without requiring an installation, de-installation, or other additional supports.

In the example of FIG. 1A, the free-standing A-frame exercise equipment cabinet 100 includes a first portion (or, "weight cabinet") 102 of the free-standing A-frame exercise equipment cabinet 100, a second portion (or, "display portion") 120 of the free-standing A-frame exercise equipment cabinet 100, a third portion 130 (or "computing component" portion) of the free-standing A-frame exercise equipment cabinet 100, a fourth portion 140 (or "rear" portion, as more clearly depicted in FIG. 1B) of the free-standing A-frame exercise equipment cabinet 100, a fifth portion 150 (or, "legs" or "stand" portion) of the free-standing A-frame exercise equipment cabinet 100, and a sixth portion 160 (or, "open-air interior" portion) of the free-standing A-frame exercise equipment cabinet 100. Although the first portion, second portion, third portion, fourth portion, fifth portion, and sixth portion of the free-standing A-frame exercise equipment cabinet 100 are shown in a specific configuration in the embodiment of FIG. 1A, other embodiments may contemplate different configurations. It will be appreciated that in some embodiments the entire free-standing A-frame exercise equipment cabinet 100 may be constructed from a single piece or sheet of material (e.g., metal), or one or more portions of the free-standing A-frame exercise equipment cabinet 100 may be constructed from one or more pieces of material and connected together to form the free-standing A-frame exercise equipment cabinet 100.

In a specific implementation, the first portion 102 of the free-standing A-frame exercise equipment cabinet 100 is configured to removably house exercise weight plates 104*a-d*. In the example of FIG. 1, the first portion 102 of the free-standing A-frame exercise equipment cabinet 100 includes mounts (or, pegs) 105*a-d* that can hold weight plates of varying sizes (e.g., diameter and width) and weights (e.g., pounds or kilograms). For example, each mount 104 may be capable of receiving dumbbell weight plates 104*a-b* and barbell weight plates 104*c-d* of varying sizes and weights.

In some embodiments, the exercise weight plates 104 are sized to allow each of the weight plates 104 to fit onto the outer diameter of both a barbell and a dumbbell. The weight plates 104 may each have fixed amounts of pounds or kilograms, and each can have a distinct color and geometry. However, each weight plate 104 may have a center hole with a diameter that can fit on both a dumbbell and a barbell. In some embodiments, the weight plates 104 may be color coded, or include other identifiers (e.g., tags), to facilitate recognition by a machine vision system.

In a specific implementation, the first portion of the free-standing A-frame exercise equipment cabinet 100 is accessed (e.g., by a user) by placing one or both of the doors 112*a-b* in an open position (e.g., as shown in FIG. 1A) using door hinges 114*a-b*. The doors 112*a-b* may be ventilated to provide airflow when the doors 112 are in a closed position. For example, each door panel 112 may include perforations over some or all of the surface area of the door panels 112. The perforations may also reduce an overall weight of the free-standing A-frame exercise equipment cabinet 100. Advantageously, the weights and mounts 105*a-d* are entirely contained behind the doors 112*a-b*, making the freestanding A-frame exercise equipment cabinet 100 aesthetically unobtrusive and safe by making it less likely for the mounts to snag clothing or cause injury when a person bumps into them.

In a specific implementation, the second portion 120 of the free-standing A-frame exercise equipment cabinet 100 is configured to mount a computer screen display 122. The computer screen display 122 may be a 42" LCD capable of presenting graphical information and images to a user while a user is exercising. In a specific implementation, the computer screen display 122 includes a mirror display that allows a user to see their form while exercising. Instead or in addition, the computer screen display 122 can include display of proper movement form as demonstrated by a trainer for viewing by a user.

In a specific implementation, the computer screen display 122 includes a touch screen display. The touch screen display can incorporate a user interface that is easy and intuitive to navigate. Such a user interface can allow the user to select, for example, HIIT and Tabata classes, warm-up and cool-down sessions, mobility routines, body-part specific workouts, or the like. Instead or in addition, the computer screen display 122 can display data provided by a handheld or wearable device of a user and/or the user interface can be navigated using data provided by the handheld or a wearable device.

In some embodiments, the second portion 120 of the free-standing A-frame exercise equipment cabinet 100 includes a glass covering over the front of the computer screen display 122, and one or more panels (e.g., a metal panel(s)) covering the rear, sides, bottom, and/or top portions of the computer screen display 122. The glass covering can serve as a protective covering and, if desired, improve the aesthetics of the A-frame exercise equipment cabinet 100.

In a specific implementation, the second portion 120 of the free-standing A-frame exercise equipment cabinet 100 comprises a top front portion of the free-standing A-frame exercise equipment cabinet 100, and the first portion 102 of the free-standing A-frame exercise equipment cabinet 100 is directly below the second portion 120 of the free-standing A-frame exercise equipment cabinet 100 (e.g., as shown in FIG. 1A). Advantageously, the A-frame itself provides stability, plus the weights housed in the first portion 102 act as an anchor to provide further stability, for the computer screen display 122.

In a specific implementation, the third portion 130 of the free-standing A-frame exercise equipment cabinet 100 is configured to mount at least one camera. The camera may be 3D camera, a Kinect camera, and/or the like, and it may be positioned behind a camera hole 124. The camera, or cameras, may be of the type to support computer vision capabilities. The third portion 130 of the free-standing A-frame exercise equipment cabinet 100 may also be configured to house other electronics and/or an integrated computer system (e.g., memory, processors, graphical processing units, computer vision software and/or hardware, network hardware and software to provide Wi-Fi and Bluetooth network connections, stereo speakers, 3D motion tracking system, sensors, and/or the other computer hardware and software). The integrated computer system may be referred to simply as the "computer system" or "cabinet computer system". The computer system may be integrated into the free-standing A-frame exercise equipment cabinet 100. The cabinet computer system is discussed further below.

In a specific implementation, the third portion 130 of the free-standing A-frame exercise equipment cabinet 100 is positioned behind the first portion 102 of the free-standing A-frame exercise equipment cabinet 100. For example, the third portion 130 may be located between the first portion 120 of the free-standing A-frame exercise equipment cabinet 100 and the fourth portion 140 of free-standing A-frame exercise equipment cabinet 100 (discussed below). For example, the third portion 130 of the free-standing A-frame exercise equipment cabinet 100 may be located on rear surface of the first portion 102 of the free-standing A-frame exercise equipment cabinet 100.

In a specific implementation, the fourth portion 140 of the free-standing A-frame exercise equipment cabinet 100 is configured to removably house at least one barbell and a plurality of dumbbells, and/or other exercise equipment (e.g., bench, weight plates, mats, and/or the like). The fourth portion 140 of the free-standing A-frame exercise equipment cabinet 100 is discussed further with reference to FIG. 1B.

In a specific implementation, the fifth portion 150 of the free-standing A-frame exercise equipment cabinet 100 includes four legs 150*a-d* of the free-standing A-frame exercise equipment cabinet 100. The four legs 150*a-d* of the free-standing A-frame exercise equipment cabinet 100 can allow the free-standing A-frame exercise equipment cabinet 100 to stand upright without additional support. Although four legs are shown here, other embodiments may have a greater or lesser number of such legs, or use other supports (e.g., a flat surface). In some embodiments, each leg 150*a-b* have a small rubber nub on the bottom. These nubs can help stabilize the free-standing A-frame exercise equipment cabinet 100 and/or allow it to slide smoothly across a floor, or other surface, leaving hardwood floors scratch-free.

In a specific implementation, the sixth portion 160 of the free-standing A-frame exercise equipment cabinet 100 is configured to removably store additional exercise equipment. The additional exercise equipment can include, for example, a rolled-up yoga mat 164. The specific implementation, the sixth portion 160 of the free-standing A-frame exercise equipment cabinet 100 comprises an interior upper middle portion of the free-standing A-frame exercise equipment cabinet 100, and the interior upper middle portion of the free-standing A-frame exercise equipment cabinet 100 is positioned between the second portion 120 of the free-standing A-frame exercise equipment cabinet 100 and the fourth portion 140 of the free-standing A-frame exercise equipment cabinet 100. The sixth portion 160 of the free-standing A-frame exercise equipment cabinet 100 can include two opposing openings (e.g., opening 162*a* shown in FIG. 1A and opening 162*b* shown in FIG. 1B) of the free-standing A-frame exercise equipment cabinet 100, and each of the two opposing openings can provide access to an interior of the sixth portion 160 of the free-standing A-frame exercise equipment cabinet 100. The two opposing openings 162 of the free-standing A-frame exercise equipment cabinet 100 can each comprise an open-air opening.

FIG. 1B depicts an example of a free-standing A-frame exercise equipment cabinet 100 with an additional workbench 154. In some embodiments, the free-standing A-frame exercise equipment cabinet 100 shown in FIG. 1B may include some or all of features of the free-standing A-frame exercise equipment cabinet 100 shown in FIG. 1A. In other words, the only difference between the free-standing A-frame exercise equipment cabinet 100 shown in FIG. 1A and the free-standing A-frame exercise equipment cabinet 100 shown in FIG. 1B may be the addition of the workbench 154, and the additional weights 156*a-b* positioned on the workbench 154. Thus, for example, the free-standing A-frame exercise equipment cabinet 100 of FIG. 1B may include the features shown in free-standing A-frame exercise equipment cabinet 100 of FIG. 1A, and vice versa.

As shown, the fourth portion 140 of the free-standing A-frame exercise equipment cabinet 100 comprises a rear portion of the free-standing A-frame exercise equipment cabinet 100. The fourth portion 140 of the free-standing A-frame exercise equipment cabinet 100 includes mounts 146*a-d* which are configured to hold the barbell 142 and dumbbells 144*a-b*. For example, the mounts 146 may comprise hooks and the barbell 142 and the dumbbells 144 can hang on the hooks. Other embodiments may include a greater or lesser number of such mounts 146*a-b* and/or dumbbells 144 and barbells 142.

In some embodiments, the free-standing A-frame exercise equipment cabinet 100 may be customizable (e.g., by the manufacturer and/or a user). For example, the first portion 102 of the free-standing A-frame exercise equipment cabinet 100 may be customized to hold a different number of weights and different types of weights, the second portion 120 of the free-standing A-frame exercise equipment cabinet 120 may be customized to house a computer screen display of a different size, the fourth portion 140 of the free-standing A-frame exercise equipment cabinet 100 may be customized to hold different types and/or different number of weight equipment, the work bench 154 of the free-standing A-frame exercise equipment cabinet 100 may be able to be added or removed (e.g., during manufacturing or after manufacturing by a user), and/or the like. Accordingly, the free-standing A-frame exercise equipment cabinet 100 may comprise a modular design. For example, each of the portions, and/or the components of portions (e.g., the mounts 104 of the first portion 102 of the free-standing A-frame exercise equipment cabinet 100) may be a connectable module that may be adjusted or otherwise customized (e.g., during manufacturing or by a user after manufacturing.) Continuing the prior example, the free-standing A-frame exercise equipment cabinet 100 may include additional receiving points (e.g., holes) for additional mounts (e.g., pegs) in the first portion 102 of the free-standing A-frame exercise equipment cabinet 100 and/or the fourth portion 140 of the free-standing A-frame exercise equipment cabinet 100.

FIGS. 2A-2F are schematic diagrams depicting orthographic views 200, 210, 220, 230, 240 and 250 of an example of a free-standing A-frame exercise equipment cabinet. In the example of FIGS. 2A-2F, the freestanding A-frame exercise equipment cabinet is represented for illustrative purposes as the freestanding A-frame exercise equipment cabinet 100 of FIG. 1.

Figure 2A:
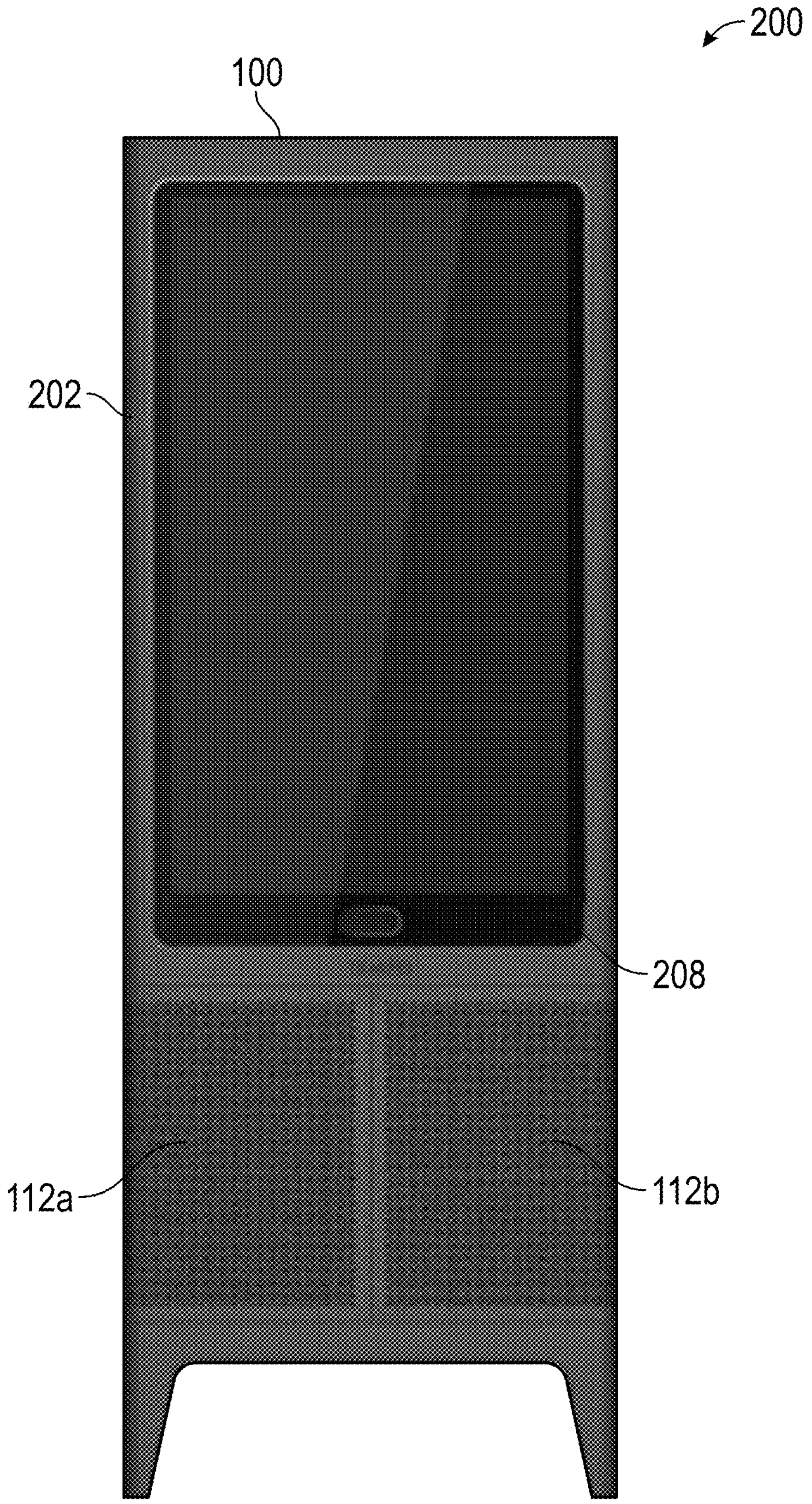
FIGS. 2A-2F are schematic diagrams depicting orthographic views of a free-standing A-frame exercise equipment cabinet.

More specifically, FIG. 2A is a schematic diagram depicting a front-view 200 of an exterior of a free-standing A-frame exercise equipment cabinet. As shown in FIG. 2A, the free-standing A-frame exercise equipment cabinet 200 comprises a housing 202, left door 112*a*, right door 112*b*, a logo 206, and a computer screen display cover glass 208. The housing 202 may comprise 3 mm thick sheet of powder coated aluminum with a matte finish. The doors 112 may comprise 1.5 mm perforated sheet of powder coated steel with a matte finish. The computer screen display cover glass 208 may comprise a tempered glass sheet of back-painted masked glass with a high gloss finish.

Figure 2B:
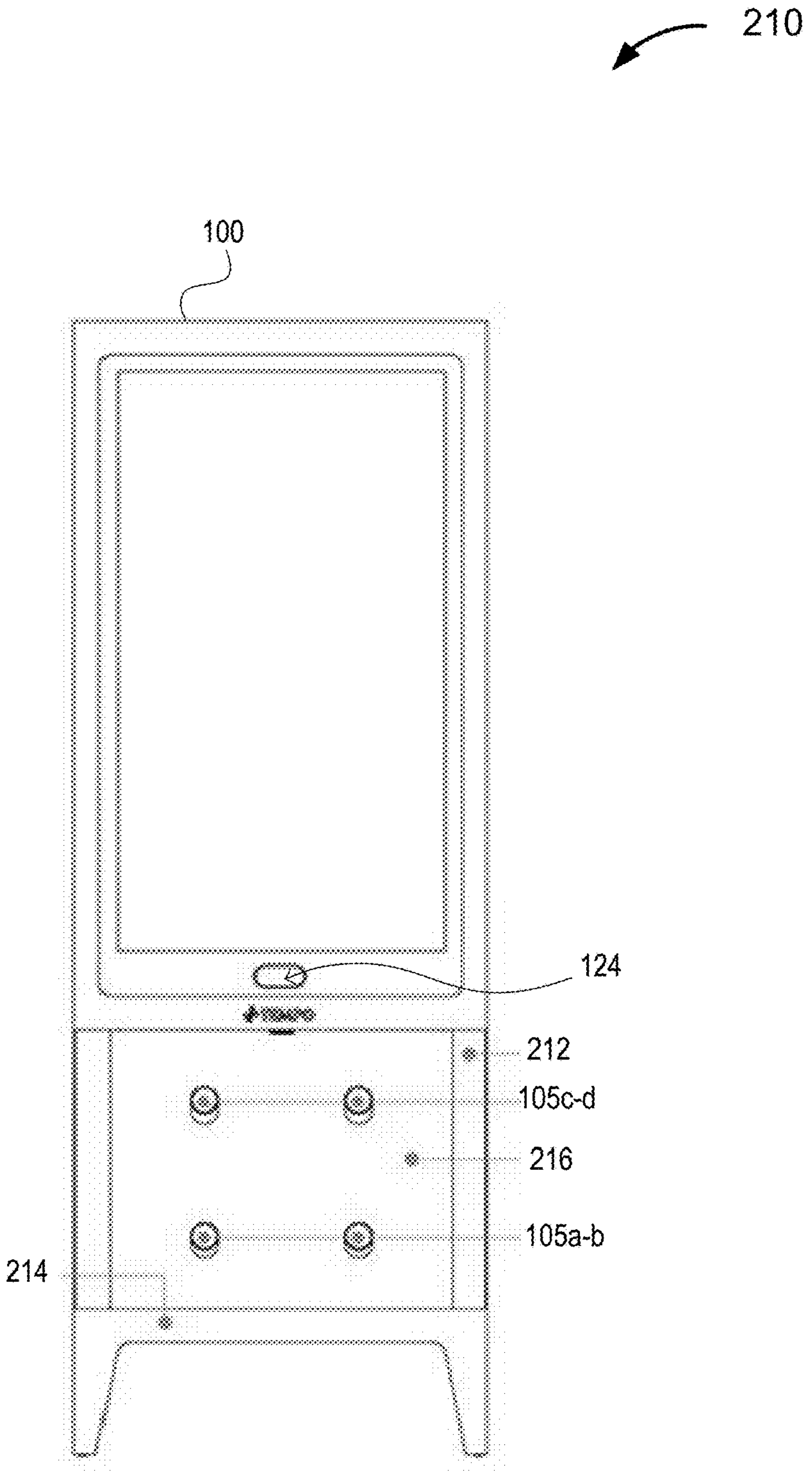

FIG. 2B is a schematic diagram depicting a front-view 210 of an interior of the free-standing A-frame exercise equipment cabinet 100. As shown, the front-view 210 includes mounts 105*a-d*, hinges 212, a tray 214 and an internal panel 216. The mounts 205 may comprise pegs of CeraKote aluminum tubing with a matte finish. The hinges 212 may comprise Blum hinges with a soft close and a matte finish. The tray 214 may be configured to store exercise equipment. The internal panel may comprise 3 mm thick sheet of powder coated aluminum with a matte finish.

Figure 2C:
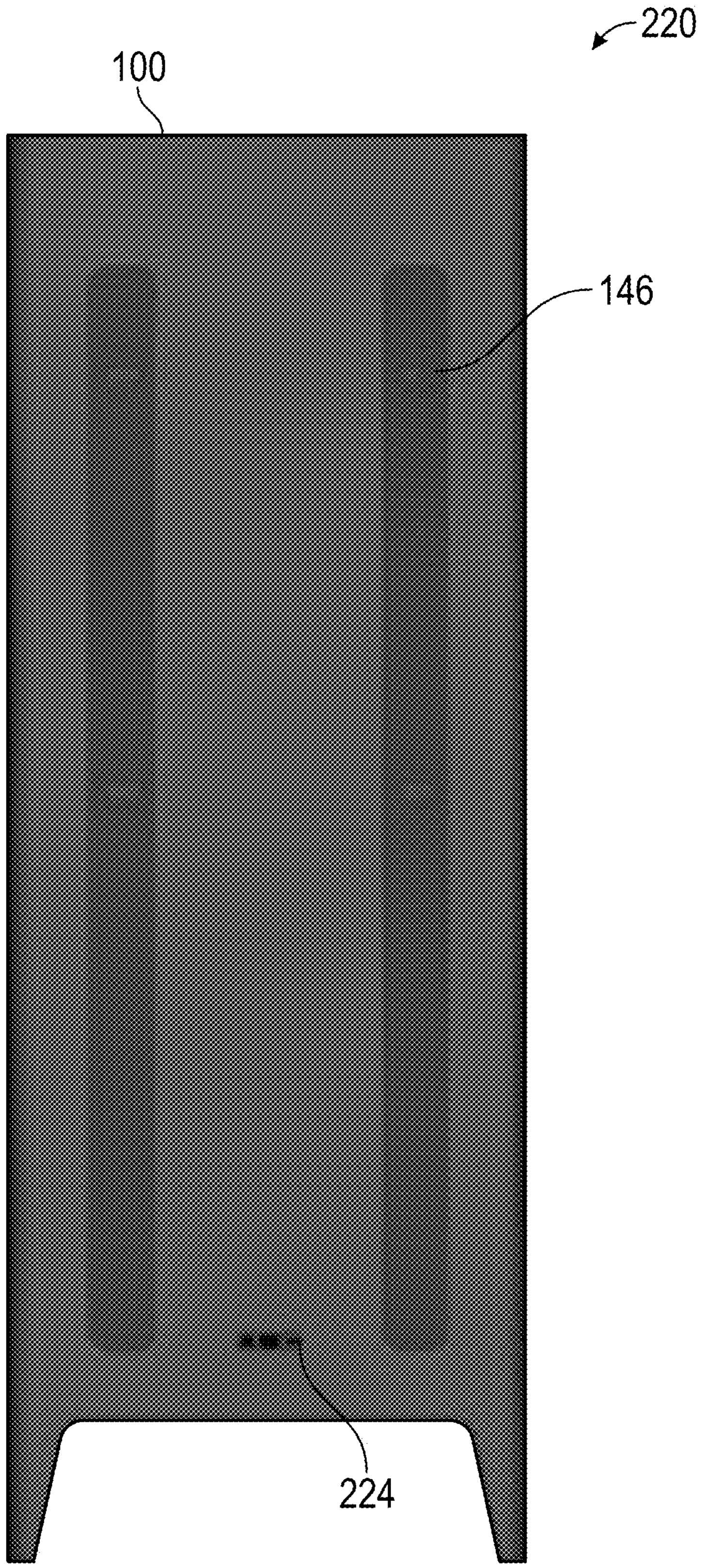

FIG. 2C is a schematic diagram depicting a rear-view 220 of the free-standing A-frame exercise equipment cabinet 100. As shown, the free-standing A-frame exercise equipment cabinet 100 can include barbell mounts 146, back rubber pads 222, and a port cover 224 (e.g., covering power connectors, network connectors, and/or the like).

Figure 2D:
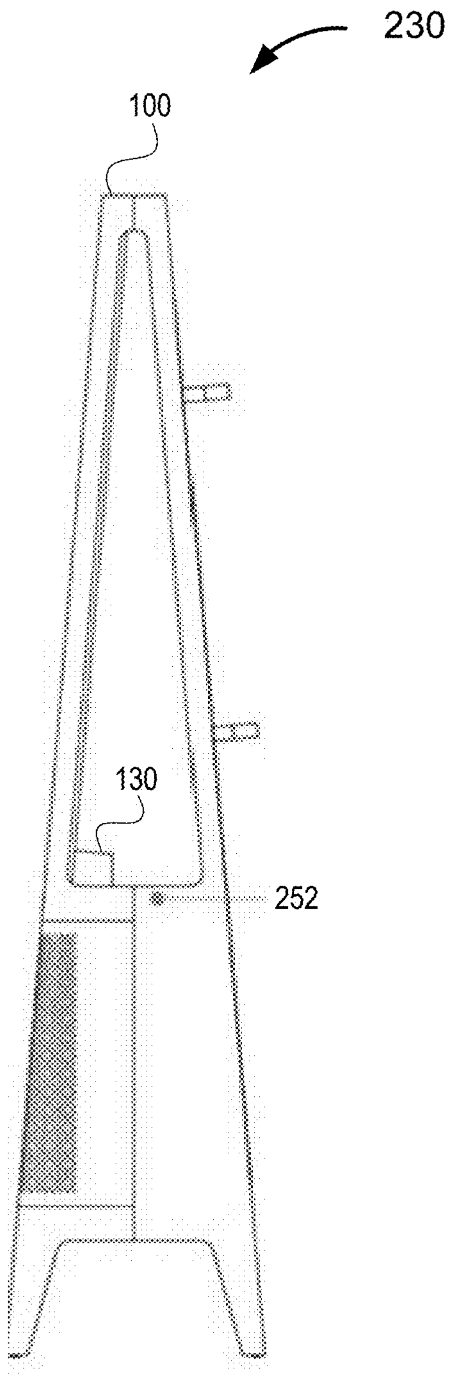
Figure 2E:
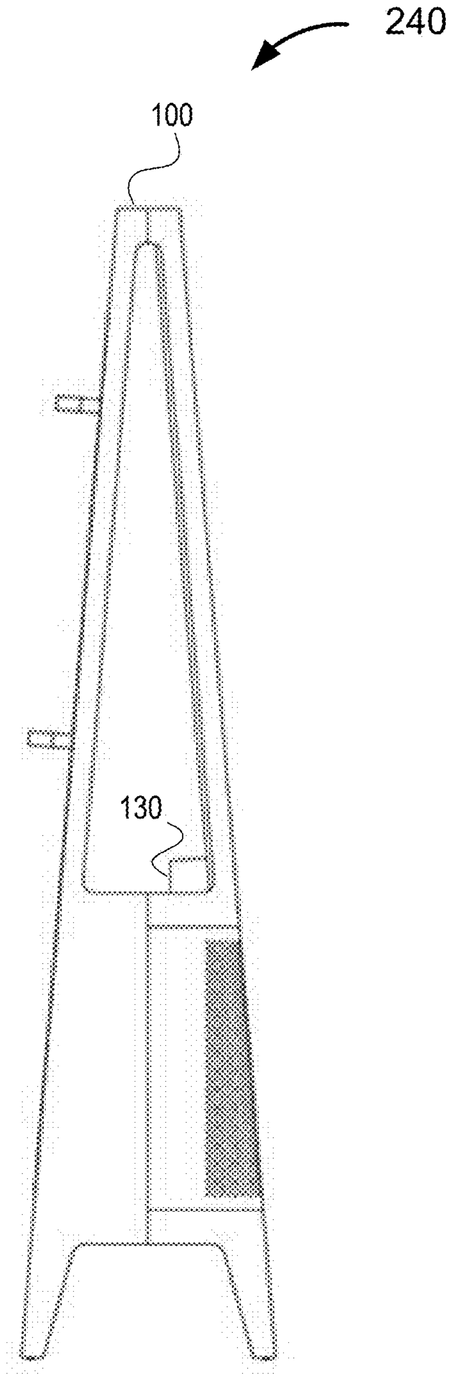
Figure 2F:
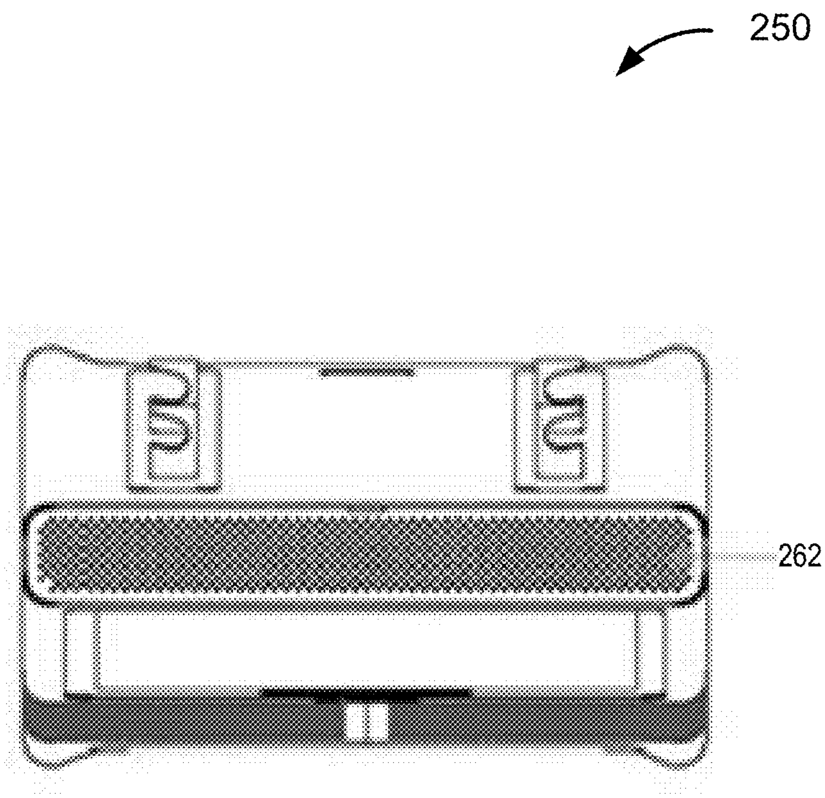

FIGS. 2D and 2E are schematic diagrams depicting side-views 230 and 240 of the free-standing A-frame exercise equipment cabinet 100. As shown, the free-standing A-frame exercise equipment cabinet 100 may include a middle rubber pad 252. FIG. 2F is a schematic diagram depicting an example view 250 of an audio speaker grill 262 of the free-standing A-frame exercise equipment cabinet 100. The audio speaker grill 262 may produce audio output (e.g., in conjunction with images presented on the computer screen display 122).

Figure 3:
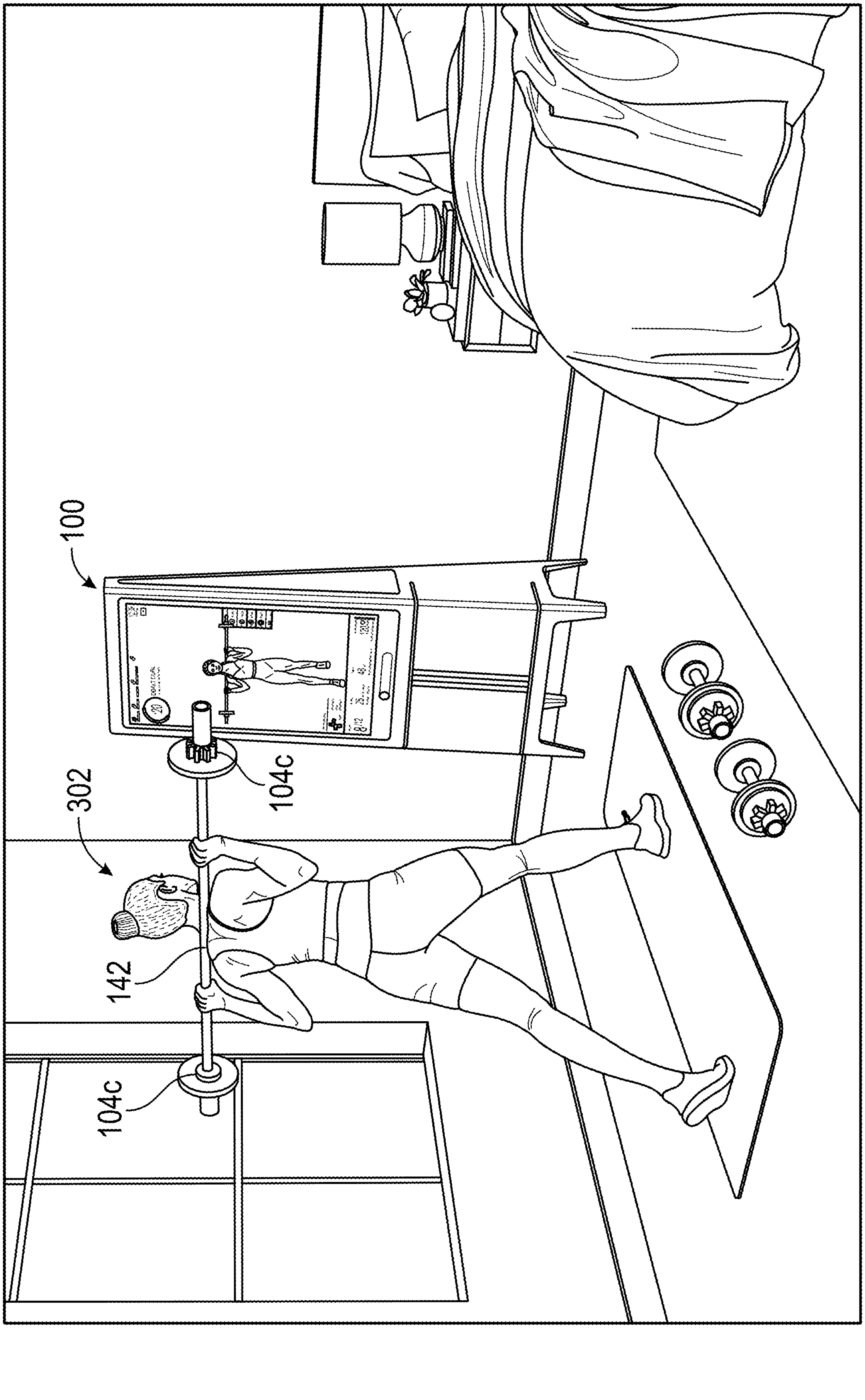
FIG. 3 depicts a user exercising using a free-standing A-frame exercise equipment cabinet.

FIG. 3 depicts a user 302 exercising using a free-standing A-frame exercise equipment cabinet 100. As shown, the user 302 is exercising using a barbell 142 and weight plates 104 from the free-standing A-frame exercise equipment cabinet 100, and the computer screen display 122 of free-standing A-frame exercise equipment cabinet 100 is presenting video of a trainer demonstrating proper form for the exercise movement.

Figure 4:
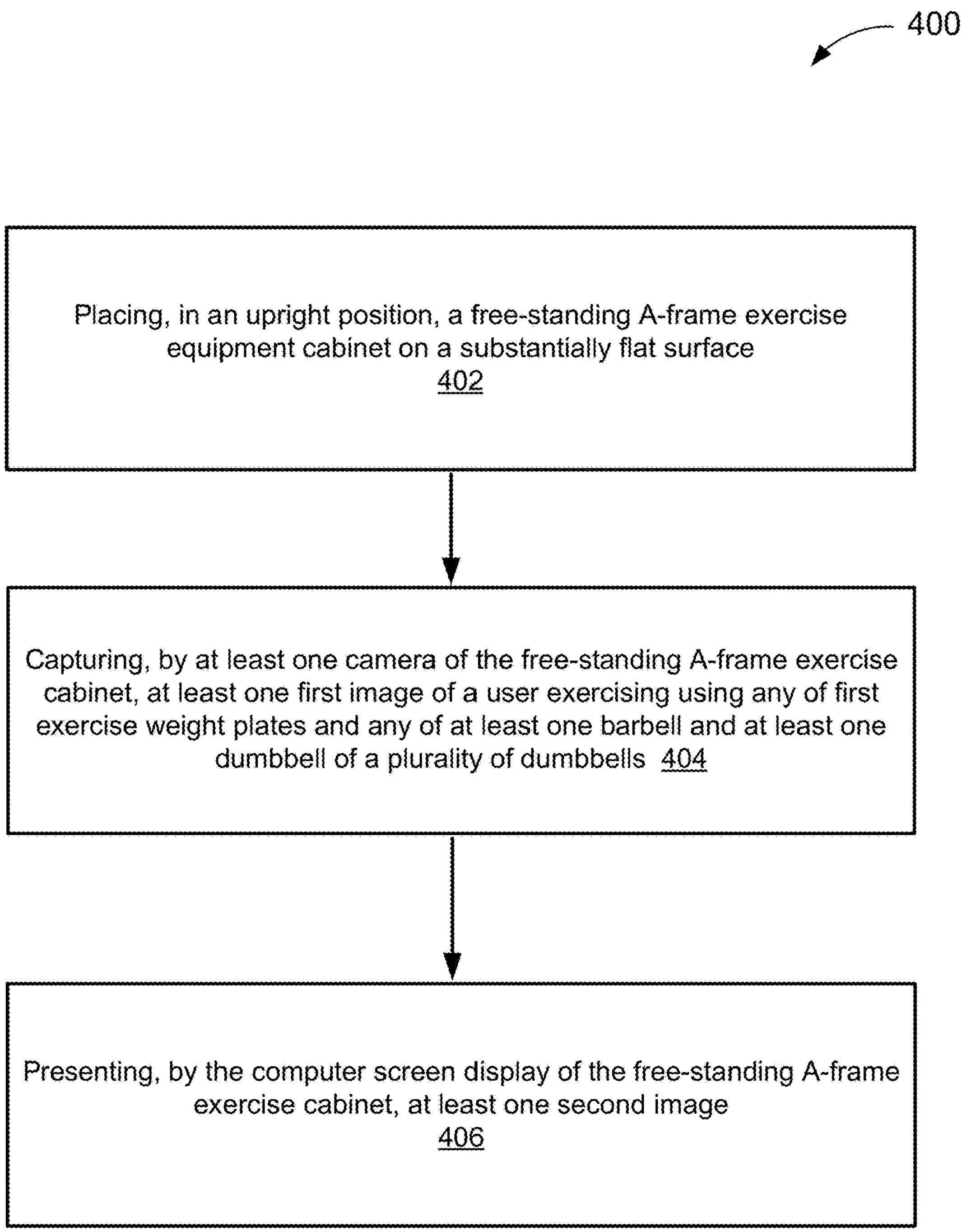
FIG. 4 is a flowchart of an example of a method of using a free-standing A-frame exercise equipment cabinet.

FIG. 4 is a flowchart 400 of an example of a method of using a free-standing A-frame exercise equipment cabinet (e.g., free-standing A-frame exercise equipment cabinet 100). In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 402, a user places, in an upright position, the free-standing A-frame exercise equipment cabinet on a substantially flat surface, the free-standing A-frame exercise equipment cabinet (e.g., free-standing A-frame exercise equipment cabinet 100). For example, and as discussed elsewhere herein, the free-standing A-frame exercise equipment cabinet may include a first portion of the free-standing A-frame exercise equipment cabinet configured to removably house first exercise weight plates of a plurality of different sizes and a plurality of different weights; a second portion of the free-standing A-frame exercise equipment cabinet configured to house a computer screen display; a third portion of the free-standing A-frame exercise equipment cabinet configured to house at least one camera, one or more processors, and memory storing instructions that, when executed by the one or more processors, cause the free-standing A-frame exercise equipment cabinet to present a display on the computer screen display housed in the second portion of the free-standing A-frame exercise equipment cabinet; a fourth portion of the free-standing A-frame exercise equipment cabinet configured to removably house at least one barbell and a plurality of dumbbells; and a fifth portion of the free-standing A-frame exercise equipment cabinet comprising four legs of the free-standing A-frame exercise equipment cabinet, the four legs of the free-standing A-frame exercise equipment cabinet allowing the free-standing A-frame exercise equipment cabinet to stand upright without additional support.

In module 404, the free-standing A-frame exercise equipment cabinet captures, by the at least one camera, at least one first image of a user exercising using any of the first exercise weight plates and any of the at least one barbell and at least one dumbbell of the plurality of dumbbells.

In module 406, the free-standing A-frame exercise equipment cabinet presents, by the computer screen display, at least one second image. For example, the second image may include a rendered representation (e.g., based on a point cloud determined by the free-standing A-frame exercise equipment cabinet) of the user performing one or more exercise movements. In another example, the at least one second image may include a rendered image of an exercise instructor or a picture image or video image of an exercise instructor.

Cabinet Computer System

As noted elsewhere herein, the free-standing A-frame exercise equipment cabinet 100 described herein can include an integrated computer system. In some embodiments, the integrated computer system includes a computer-readable medium (CRM) and other computing components (e.g., as described elsewhere herein). A CRM can be a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end-users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

As discussed elsewhere herein, the free-standing exercise-equipment 100 that can include a computer screen display (e.g., mirror display) with touch screen interface. The free-standing A-frame exercise equipment cabinet 100 can, in some embodiments, also include a 3D motion capture system and advanced Artificial Intelligence that can use a live feedback system with ultra-low latency. A user interface working with the A.I. can provide technique feedback to help a user achieve proper form for an exercise movement (e.g., lunge, squat, and/or the like). The software system on the free-standing A-frame exercise equipment cabinet 100 can be able to detect a user's mistake in form (e.g., while performing a squat or other exercise movement) and inform the user when they have successfully corrected their error in performing the exercise.

In some embodiments, the hardware of the GPU and CPU are embedded locally in the free-standing A-frame exercise equipment cabinet 100 along with form models so that analysis and calculations on whether the proper form and technique are being used can be calculated in real time and then displayed back on the display screen to the user in real time while they are doing the exercise verses having to wait for all of that information being captured and then sent over the internet to a remote server for an internet site, which then could perform analysis and calculations on whether the proper form and technique are being used, and then send back the guidance. The lag between performing the exercise with an improper technique would not be quick enough for the user to correct their form via the feedback.

With built in 3D sensors of the free-standing A-frame exercise equipment cabinet 100, the free-standing A-frame exercise equipment cabinet 100 can track the user's form, count the user's exercise repetitions, and can recommend a heaviness of weights to use in an exercise. The computer vision system of the free-standing A-frame exercise equipment cabinet 100 can capture motion by emitting pulses of infrared light, for example, 30 times a second, generating a 3D model of the user's body made up of for example, 80,000 individual points. The Artificial Intelligence of the computer system of the free-standing A-frame exercise equipment cabinet 100 can analyze the, for example, 80,000 individual points and break this down into, for example, 25 points of the user's body's essential joints as the user works out.

The software in the integrated computer of the free-standing A-frame exercise equipment cabinet 100 can send relevant data on, for example, 25 joint movements and how that is relevant to the current exercise being performed by the user over the internet to a cloud platform for the free-standing A-frame exercise equipment cabinet 100 is much faster than 80,000 individual points 30 times a second over the internet to a cloud platform, which can significantly reduce lag in providing feedback from a live trainer or the software models when the user is still doing the exercise. Ultra-low latency can be achieved for the exercises being captured by the 3D video computer vision system of the free-standing A-frame exercise equipment cabinet 100, when the hardware and software performs the local calculations for an exercise being performed by the user to check for errors in that exercise.

As noted elsewhere herein, the hardware of the GPU and CPU are embedded locally in the free-standing A-frame exercise equipment cabinet 100 along with the form models so that the analysis and calculations on whether the proper form and technique are being used can be calculated in real time, thus, merely the results of the calculations and analysis need to be sent over the internet to the live trainer so the trainer can comment on the form and show proper technique in real time just like in a real time class. The local calculation and analysis allow for real-time form cues and feedback during the user's workout.

The live feedback system with ultra-low latency can use specialized hardware in the integrated computer system of the free-standing A-frame exercise equipment cabinet 100. The live feedback system with ultra-low latency allows for live video streaming from the studio to the users' screens. The computer vision captures motion by emitting pulses of infrared light, for example, 30 times a second, generating a 3D model of the user's body made up of for example, 80,000 individual points. The Artificial Intelligence can analyze the, for example, 80,000 individual points and break this down into, for example, 25 points of the user's body's essential joints as the user works out. The live feedback system with ultra-low latency can further compress down the information captured by the 3D camera hardware into information regarding what mistakes are made by user(s) and to what severity, number of repetitions, and/or the like.

As noted elsewhere herein the computer system may include 3D motion capture and Artificial Intelligence functionality. The 3D motion capture system and advanced Artificial Intelligence may use a computer vision software system for providing real-time guidance and measurement to users who are performing weight training and other exercises. In an example, a 3D time of flight camera and the computer vision software capture both RGB and motion capture of the user and their exercise equipment. The 3D motion capture system and advanced Artificial Intelligence track a user's form, count the user's repetitions, and can recommend weights while also empowering live coaches to give the user a richer and more effective workout.

In some embodiments, the free-standing A-frame exercise equipment cabinet 100 can be equipped with a 3D motion capture system and advanced Artificial Intelligence system that can empower live athletic coaches to give the user a richer and more effective workout. Accordingly, the free-standing A-frame exercise equipment cabinet 100 can be an all-in-one home fitness studio featuring elite trainers who can see when the user makes a mistake and help the user fix it, live. With its built in 3D sensors, the 3D motion capture system and advanced Artificial Intelligence can track the user's form, count the user's repetitions, and recommend weights. The computer vision software can use models to help track user's motion as well as track the color and geometry of weights on a barbell or dumbbell.

In some embodiments, the computer vision captures motion by emitting pulses of infrared light, for example, 30 times a second, generating a 3D model of the user's body made up of for example, 80,000 individual points. The Artificial Intelligence can analyze the, for example, 80,000 individual points and break this down into, for example, 25 points of the user's body's essential joints as the user works out. The live feedback system with ultra-low latency can further compress down the information captured by the 3D camera hardware into information regarding what mistakes are made by user(s) and to what severity, number of reps, etc. Powered by two or more 3D motion sensors and A.I., the 3D motion capture system and advanced Artificial Intelligence analyzes 25 points of the user's body's essential joints as the user works out and gives the user easily understood form feedback. The system takes in the information corresponding to at least this raw 3D model and pares it down to 25 essential joints, while also tracking the motion of the user's exercise equipment, such as barbell and dumbbells.

In an example, this step may require a GPU with at least 2 GB of RAM to be available onboard the device, which allows the local computing system in the cabinet to avoid uploading this data to the cloud. This has three major advantages:

Instantaneity—the system has a latency of <100 ms;

Security—no image data is required to be uploaded during use; and

Much lower internet bandwidth requirement—in a normal representation uploading the raw data would require bandwidth upwards of 30 MB/s, which is currently very rare and would limit the users who could use the home gym exercise platform to people in major cities with excellent internet infrastructure.

These positions may be recorded for each frame from the camera (e.g., at 30 frames-per-second).

Next, the software interprets the user's motion over a period of time, comparing it against models of good and bad technique. When the user makes an error in technique/form, the error is detected by running CNNs, statistical analysis, or support vector machines across the feature vector of the human skeleton across one or more frames, producing an error "severity" score on the interval (e.g., 0 to 1) that represents how badly the user made the mistake, with 1.0 being "as bad as possible".

In some embodiments, a trainer can view a user in his or her live class and see a user using bad form highlighted with their name in red. The analyzer module then decides if this severity score is above a threshold. This threshold is dynamic and specific to a user-a beginner will have a higher threshold than an expert. If the score is above the threshold, the user will be notified by an onscreen indicator that they have made this error. The user interface can indicate the error and also show the user the error in their exercise form.

Thus, the software can trigger a notification that tells the user what mistake they have made. A user interface can display, for example, with red text "bad depth" in red on the display screen on the free-standing A-frame exercise equipment cabinet 100 or some things like knees over toes would be the proper technique. Also, the user can also see their form in real time being displayed on the display screen on the free-standing exercise equipment cabinet 100. The live trainer when it is a live class, or a video when it is a recorded class, can present the proper technique to correct the error in the user's exercise form.

The computer vision system can use, for example, a built-in Azure Kinect 3D sensor. By making use of artificially intelligent intelligence and the Azure Kinect 3D sensor, the 3D vision system can track the user's every move, comparing what it is capturing against how each movement (e.g., lift) should look. The artificial intelligence knows exactly, for example, what dumbbell presses should look like for that individual, the correct form for push-ups, and even how a burpee should be performed. In other words, it is like having a digital personal trainer watching the user's every move and just slightly altering the user's form as needed. The computer vision with its 3D camera kinetic human motion tracking hardware can supply information into the A.I. and models to notice form errors in, for example, weight training exercises.

The live feedback system with ultra-low latency quickly delivers feedback triggered by the user(s) to the trainers which then allows for the live feedback from the trainer to the user(s). The Machine learning models/algorithms take the input of million points of raw data (in 3D depth and RGB) captured by two or more sensors to create at least the 25 points on the skeleton and then interprets what is a repetition, what is a right form for that user and that exercise, what is wrong and different levels of severity for what is wrong about the exercise being performed by the user.

An example set of machine learning models/algorithms and the artificial intelligence evaluation process can be as follows. The artificial intelligence is trained specifically for each exercise, feedback, or other feature. Some of the artificial intelligence models have been trained with supervised learning, some with unsupervised learning, some with both, and some are just calculations based on the skeletal data. Note, some classes of exercise have similar ML approaches and minorly tweaked configurations. For example, bicep exercises can all use similar models but depending on the type of bicep exercise (e.g., Dumbbell Bicep Curl, Barbell Bicep Curl, alternating versions of those, Barbell Reverse Curl and a few others) have minorly tweaked configurations.

In some embodiments, each set of training can evaluate form such as when users are dangerously using their back to lift the weight instead of their arms. In an example, a statistical model based on the positions of the 3D joints can estimates the orientation of the back, and tracks this through the rep, using the range of motion in space and comparing this to a simple supervised-learned ML model that calculates and reports a severity score (e.g., 0 to 1).

Thus, for example, when the user makes an error, the error is detected by, for example, by running convolutional neural networks CNNs, recurrent neural networks (RNN), statistical analysis, or support vector machines across the feature vector of the human skeleton across one or more frames, producing an error "severity" score on the interval (e.g., 0 to 1) that represents how badly the user made the mistake, with, for example, 1.0 being "as bad as possible".

An example analyzer module in integrated computer system of the free-standing A-frame exercise equipment cabinet 100 working with the artificial intelligence, then decides if this severity score is above a threshold. This threshold is dynamic and specific to a user—e.g., a beginner will have a higher threshold than an expert. If the score is above the threshold, the user will be notified by an onscreen indicator on the touch screen display on the free-standing equipment cabinet that they have made this error.

The trained models, classifiers and other artificial intelligence can use a feedback path to use unsupervised learning algorithms to update the model when it is deployed at someone's dwelling. The trained models, classifiers, and other artificial intelligence can be individualized for the users at that location and/or be based on average example users during the training. The trained models, classifiers, and other artificial intelligence can use many different weighting factors to generate the score, which has the dynamic threshold. The trained models, classifiers, and other artificial intelligence can be trained from three years of exercises by users in a gym setting captured by 3D equipment in a 3D motion capture studio into 3D data sets with over 1 million tagged recordings and analyzed.

In an example, the free-standing A-frame exercise equipment cabinet 100 includes a 3D time of flight camera that can have example minimum requirements for the CPU (e.g., cores, threads, processor speed, etc.) and GPU (e.g., memory size, memory speed, etc.) to allow for the live training and feedback. For example, hardware requirements can be:

GPU with >=3 GB of RAM;

CPU with >=4 cores, equivalent computing power to an Intel 9th-generation i5 processor.

Figure 5:
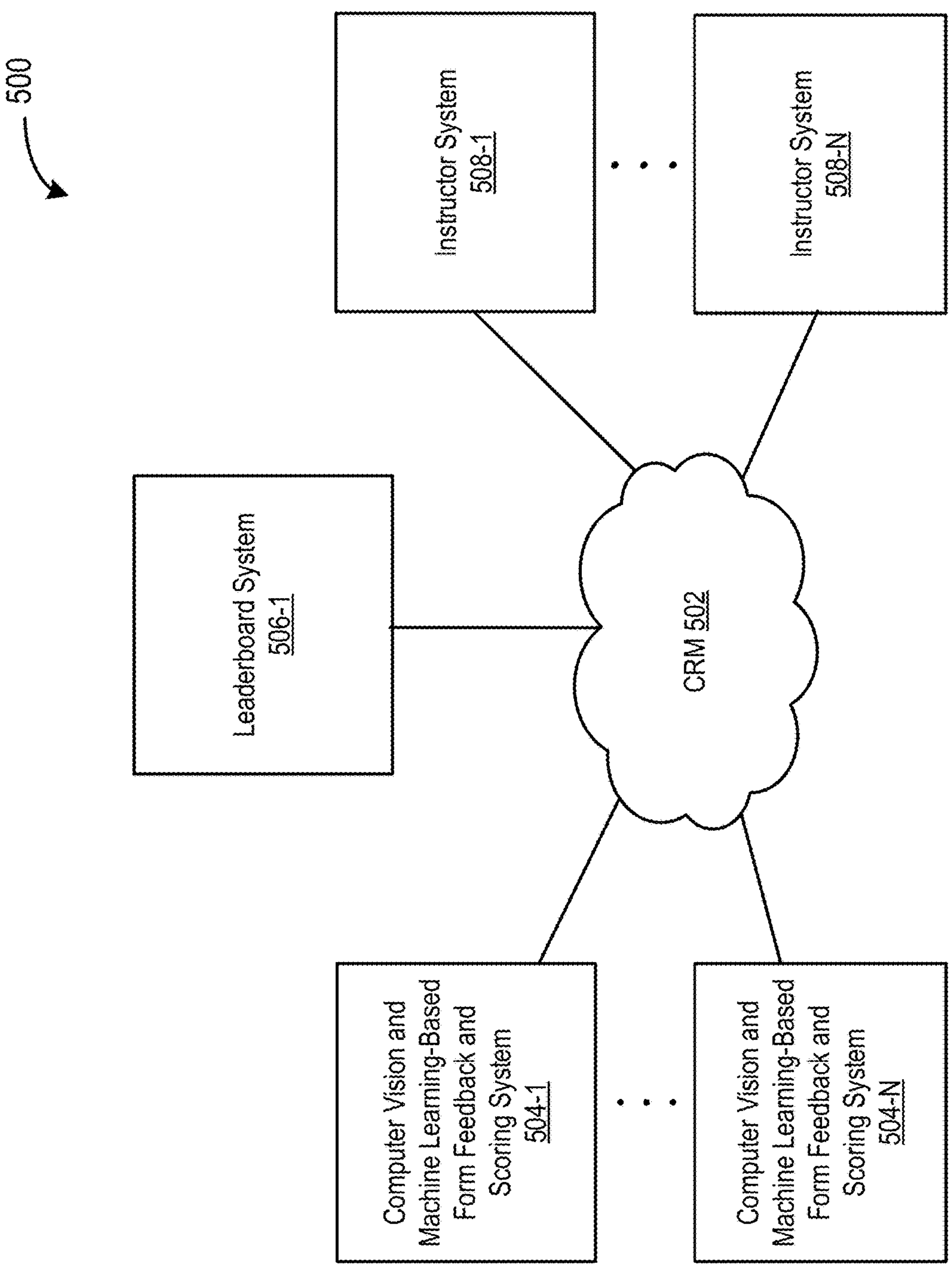
FIG. 5 is a diagram of an example of a system for computer vision and machine learning-based form feedback and scoring of user exercise movements.

FIG. 5 is a diagram 500 of an example of a system for computer vision and machine learning-based form feedback and scoring of user exercise movements. The diagram 500 includes a computer-readable medium (CRM) 502, computer vision and machine learning-based form feedback and scoring systems 504-1 to 504-N (individually, the computer vision and machine learning-based form feedback and scoring system 504, collectively, the computer vision and machine learning-based form feedback and scoring systems 504) coupled to the CRM 102, leaderboard system 506, and instructor systems 508-1 to 508-N (individually, the instructor system 508, collectively, the instructor systems 508) coupled to the CRM 102.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The computer vision and machine learning-based form feedback and scoring systems 504 can function to provide real-time guidance and measurement to users who are performing weight training and other exercises. For example, the computer vision and machine learning-based form feedback and scoring system 504 can utilize built in sensors (e.g., 3D motion sensors, 3D camera) and machine learning to track a user's form during a workout, count the user's repetitions of an exercise, recommend weights that a user should use for an exercise, identify improper form of a user during an exercise, and provide indicators to correct improper form. Functionality of the computer vision and machine learning-based form feedback and scoring system 504 can be performed by one or more computing devices (e.g., a computing device with one or more processors, memory, and/or the like).

In a specific implementation, the computer vision and machine learning-based form feedback and scoring system 504 can be implemented as a component of a free-standing A-frame exercise equipment cabinet 102. For example, the computer vision and machine learning-based form feedback and scoring system 504 can be implemented in portion 130 of the free-standing A-frame exercise equipment cabinet 102. It will be appreciated that, in some embodiments, the computer vision and machine learning-based form feedback and scoring system 504 can also be referred to in this paper, and/or include the functionality of, a "3D motion capture system," "advanced artificial intelligence system," "live feedback system with ultra-low latency", and/or the like.

In a specific implementation, the computer vision and machine learning-based form feedback and scoring system 504 locally implements and executes a three-dimensional (3D) motion capture system, computer vision system, and a machine-learning artificial intelligence system to provide real-time guidance and measurement to users. In one example, a 3D time of flight camera and associated computer vision software of the computer vision and machine learning-based form feedback and scoring system 504 can capture both RGB data and motion capture data of the user and their exercise equipment during a workout. It will be appreciated that techniques described in this paper for 3D can also be applied to two-dimensions (2D). It will be further appreciated that time of flight cameras can provide particular techniques for determining position.

Figure 24:
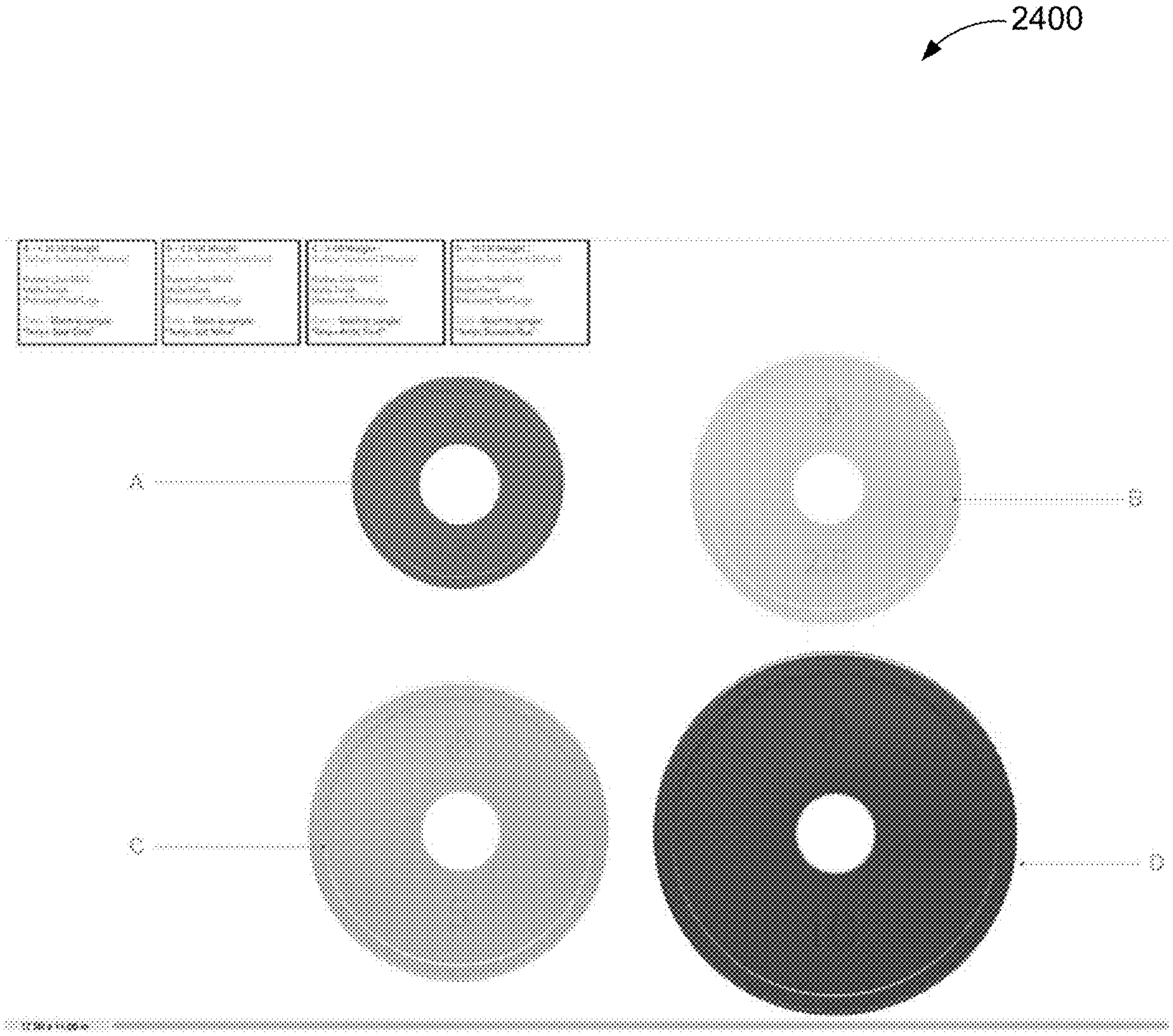
FIG. 24 depicts example weight plates that can be recognized by a computer vision and machine learning-based form feedback and scoring system.

In a specific implementation, the computer vision and machine learning-based form feedback and scoring system 504 can capture motion by emitting pulses of infrared light (e.g., 30 times a second), and generating a 3D model of the user's body made up of, for example, 80,000 individual points. In some embodiments, the 3D model may also include exercise equipment (e.g., barbell with barbell plates). The computer vision and machine learning-based form feedback and scoring system 504 can use models to help track a user's motion during various exercises (e.g., squats, lunges, bicep curls, and/or the like), as well as track the motion, position, and/or orientation of associated exercised equipment (e.g., based on the color and geometry of exercise equipment). The computer vision and machine learning-based form feedback and scoring system 504 can know the color and geometry of weights in order to recognize a type of exercise equipment (e.g., barbell and barbell plates) and weights associated with the exercise equipment (e.g., 25-pound barbell plates). Example color-coded weight plates are shown in FIG. 24.

In a specific implementation, the computer vision and machine learning-based form feedback and scoring system 504 can provide the guidance of a personal trainer (or, "instructor") combined with artificial intelligence to provide feedback on the user's form during an exercise, as well as meet the energy of a group fitness class. Without the user needing to wear special clothing or use connected electronic equipment, the computer vision and machine learning-based form feedback and scoring system 504 can count a user's exercise repetitions while also evaluating their form and providing feedback to the user regarding their form (e.g., their knees are too far over their toes during a lunge, and this needs correction). This count and other data can be used to power a competitive leaderboard in both live and on-demand classes.

Figure 11:
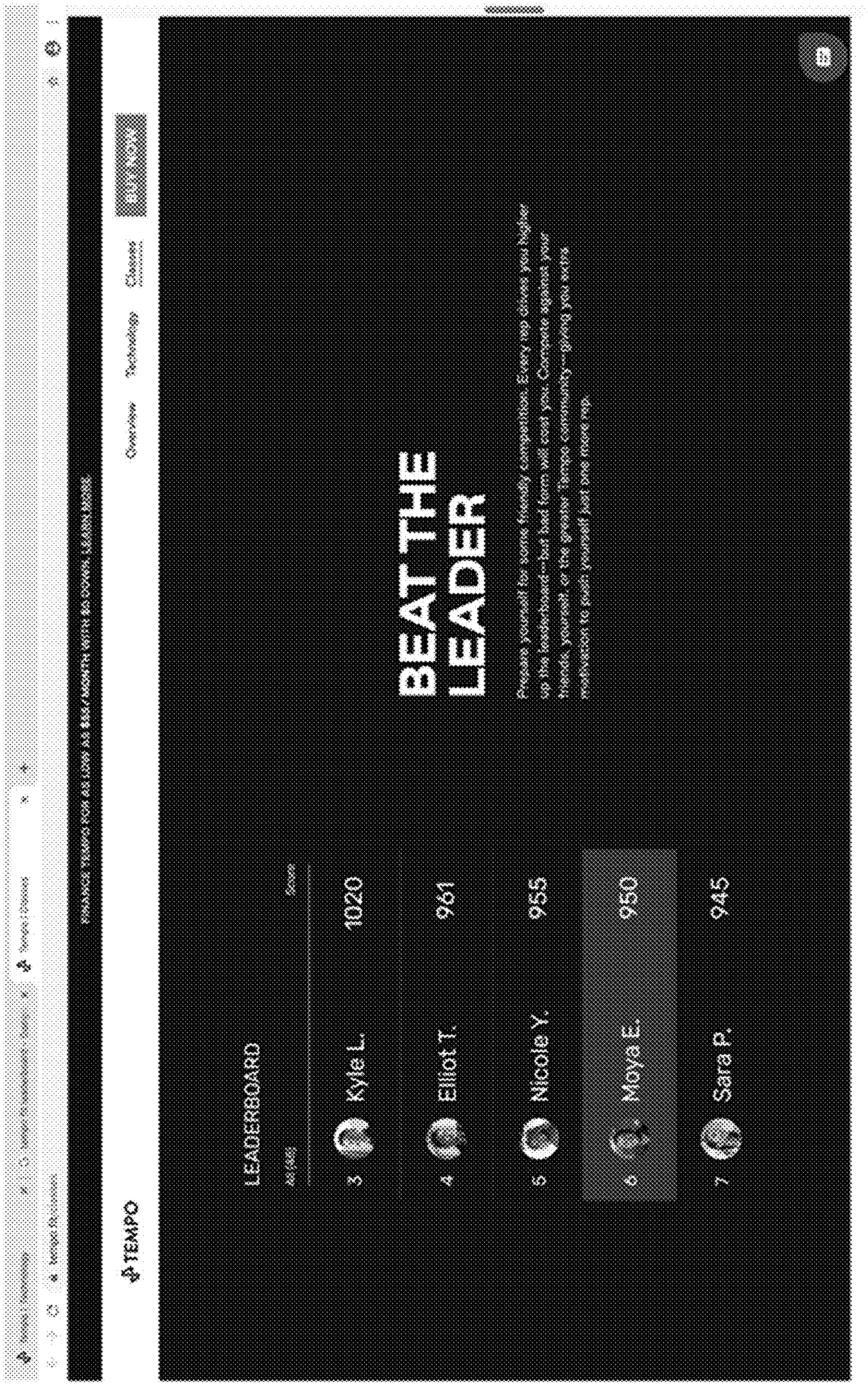
FIG. 11 is screenshot of an example leaderboard.

For example, FIG. 11 shows an example leaderboard presented by a computer vision and machine learning-based form feedback and scoring system 504. In one example, a user can glance up during a class and see the user's repetition count displayed on a touch screen display screen of the computer vision and machine learning-based form feedback and scoring system 504. The computer vision and machine learning-based form feedback and scoring system 504 can provide deep guidance and review of, for example, the depth of the user's squat. The user interface on the display screen shows the user's spot on the leaderboard with, for example, each curl as well as compare today's performance with their own past performances.

Returning to FIG. 5, the computer vision and machine learning-based form feedback and scoring system 504 can function to initiate a workout for a user in response to a user selecting a workout routing or class through a graphical user interface presented by the computer vision and machine learning-based form feedback and scoring system 504. For example, if a user enters the field-of-view of a sensor (e.g., 3D camera) of the computer vision and machine learning-based form feedback and scoring system 504, the computer vision and machine learning-based form feedback and scoring system 504 can prompt the user to input a selection. The computer vision and machine learning-based form feedback and scoring system 504 can also recommend to the user particular exercises, workouts or routines based on the user's goals and/or weekly workout routine.

Figure 12:
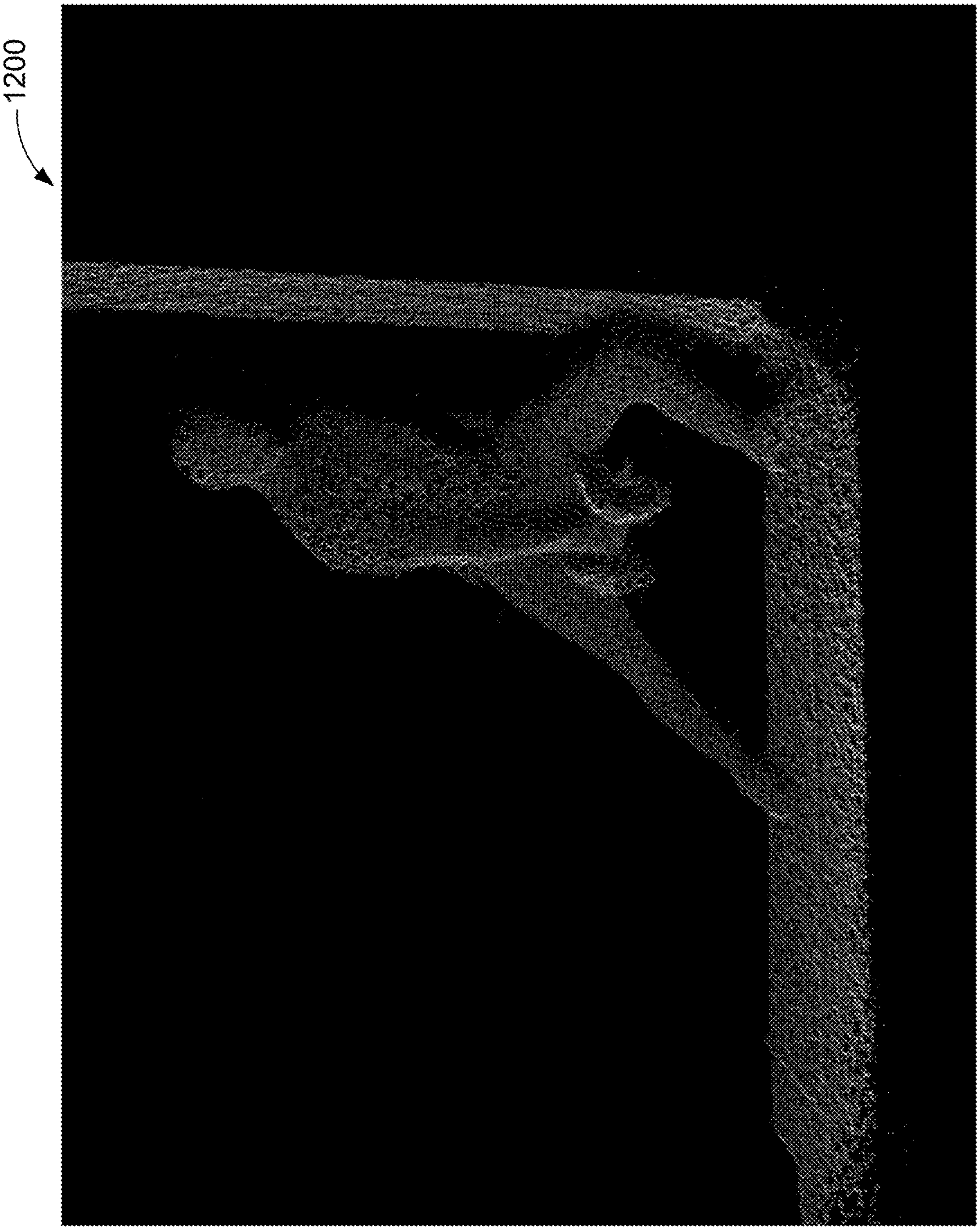
FIG. 12 depicts an example point cloud of a user.

In a specific implementation, the computer vision and machine learning-based form feedback and scoring system 504 can function to capture data about a user's skeleton and/or equipment being used by the user (e.g., dumbbells). For example, a 3D camera of the computer vision and machine learning-based form feedback and scoring system 504, as well as other sensors, hardware, and/or software of the computer vision and machine learning-based form feedback and scoring system 504, can capture data about a user's skeleton and/or equipment being used by the user. The computer vision and machine learning-based form feedback and scoring system 504 can capture one or more point clouds of the user (e.g., as the user performs an exercise). An example point cloud of the user is shown in FIG. 12.

Figure 13:
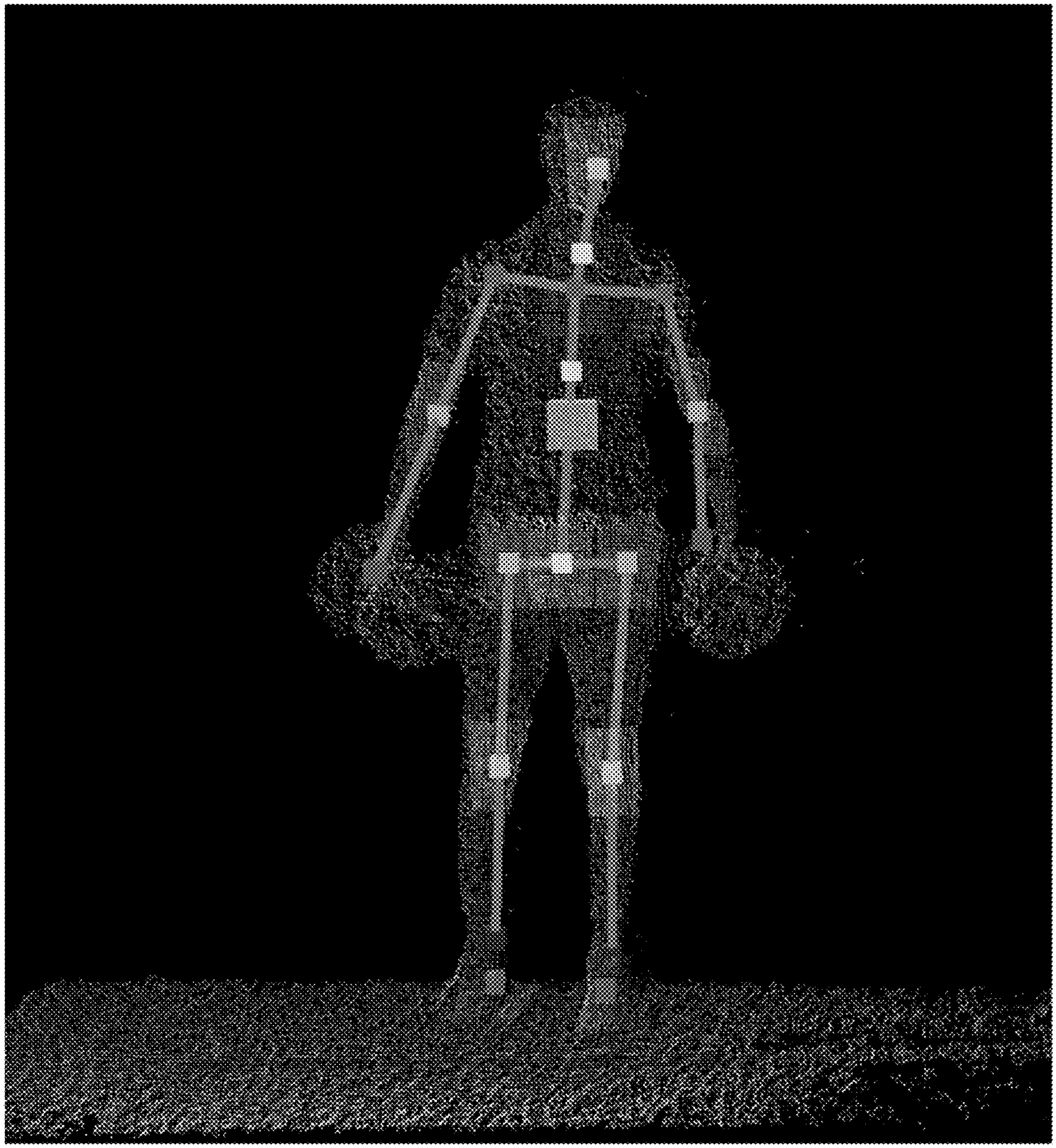
FIGS. 13 and 14 depict example 3D models of a user with estimated joints.

In a specific implementation, the computer vision and machine learning-based form feedback and scoring system 504 can function to capture (e.g., of the user) IR images and/or video, depth images (e.g., image data with depth information) and/or depth video (e.g., video data with depth information), and/or red, green, blue (RGB) data. The computer vision and machine learning-based form feedback and scoring system 504 can provide some or all of the aforementioned captured data through one or more machine learning models (e.g., a convolutional neural net mode) to estimate (or, predict) the position of, for example, 25 joints in 3D, which can be further processed through other nets and/or statistical models or techniques for accuracy. An example 3D model of a user with the estimated joints is shown in FIG. 13. Although 25 joints are discussed herein, other embodiments may estimate a different number of joints (e.g., 30 joints) and/or a number range of joints (e.g., between 20 and 30).

Figure 14:
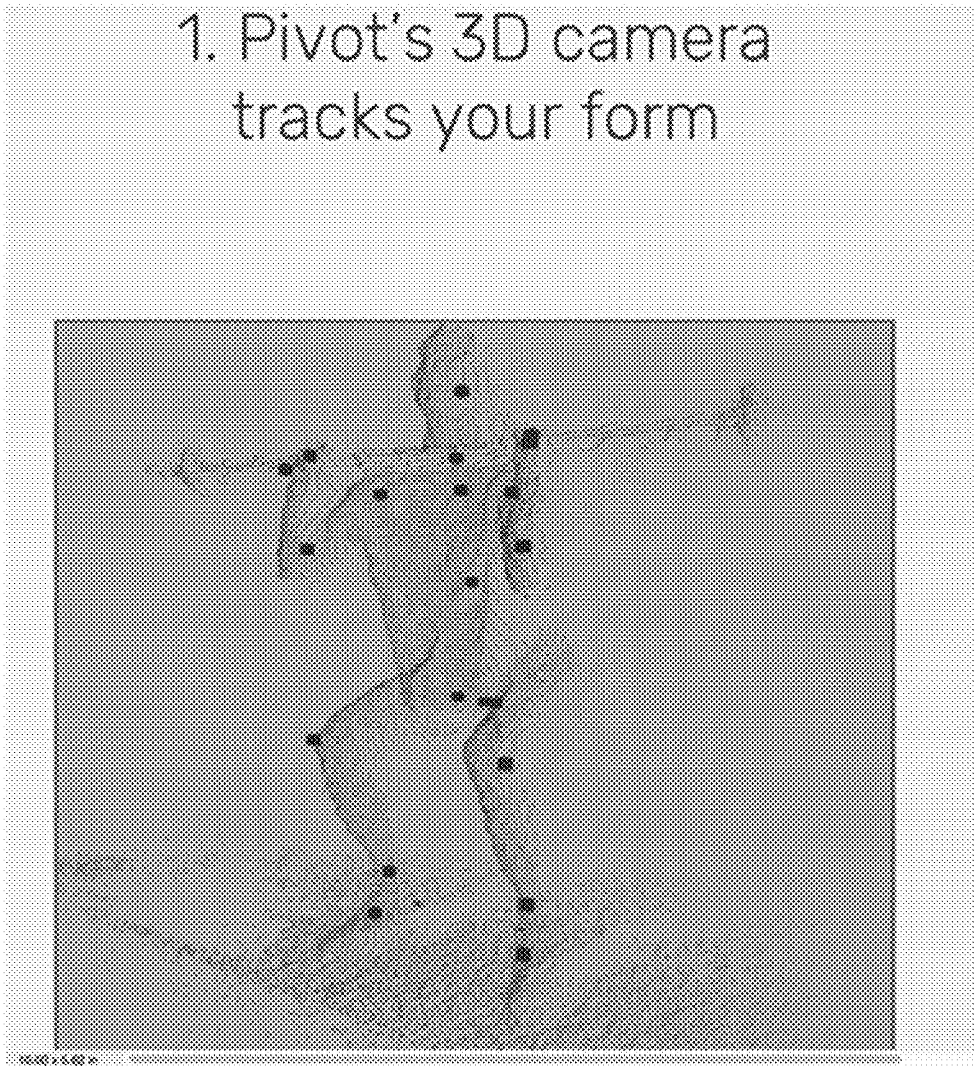

In a specific implementation, the computer vision and machine learning-based form feedback and scoring system 504 can, as discussed elsewhere herein, function to capture motion by emitting pulses of infrared light, for example, 30 times a second, and generating a 3D model of the user's body made up of, for example, 80,000 individual points. The computer vision and machine learning-based form feedback and scoring system 504 can analyze, for example, the 80,000 individual points and break (or, reduce) the 80,000 points down into, for example, 25 points of the user's body's essential joints as the user works out. In some embodiments, the 25 points may be exercise-dependent (e.g., a squat may use a different set of estimated points than a bench press). The computer vision and machine learning-based form feedback and scoring system 504 can further compress down the information captured by the 3D camera hardware into information regarding what mistakes are made by user(s) and to what severity, number of repetitions, and/or the like. (e.g., as shown in FIG. 14). Powered by two or more 3D motion sensors and artificial intelligence, the computer vision and machine learning-based form feedback and scoring system 504 can analyze, for example, 25 points of the user's body's essential joints as the user works out and gives the user easily understood form feedback. The system can take in the information corresponding to at least this raw 3D model and pares it down to the 25 essential joints, while also tracking the motion of the user's exercise equipment, such as a barbell and dumbbells. In one example, this functionality can be performed by a GPU with at least 2 GB of RAM to be available onboard the system, which can allow the computer vision and machine learning-based form feedback and scoring system 504 to avoid uploading data to the cloud. In one example, user and equipment movements, motions, positions, orientations, and/or the like, are recorded for each frame from a 3D camera at 30 frames per second (FPS).

In a specific implementation, the computer vision and machine learning-based form feedback and scoring system 504 performs the functionally described herein on local hardware and/or locally executing software. This can have several advantages. For example, this can allow the computer vision and machine learning-based form feedback and scoring system 504 to perform near instantaneous functionality (e.g., less than 100 ms); the system 504 can have improved security (e.g., no image data is required to be uploaded during use) relative to systems that are not executed locally; and have much lower internet bandwidth requirements relative to systems that are not executed locally—with these other systems, uploading the raw data would require bandwidth upwards of 30 MB/s, which is currently very rare and could limit the users who could use the system to people in major cities with excellent internet infrastructure.

In a specific implementation, the computer vision and machine learning-based form feedback and scoring system 504 can function to interpret the user's motion over a period of time (e.g., 5 minutes, the time it takes to complete a particular exercise or a particular number of repetitions, and/or the like), and compare the user's motion against models of "good" (e.g., as defined by a model) and "bad" technique (e.g., as defined by a model). When the user makes an error in technique/form, the error can be detected by executing CNNs, statistical analysis, or support vector machines across the feature vector of the human skeleton across one or more frames, producing an error "severity" score on the interval [0 to 1] that represents how badly the user made the mistake (e.g., with 1.0 being "as bad as possible", and 0.0 being "as good as possible").

Figure 15:
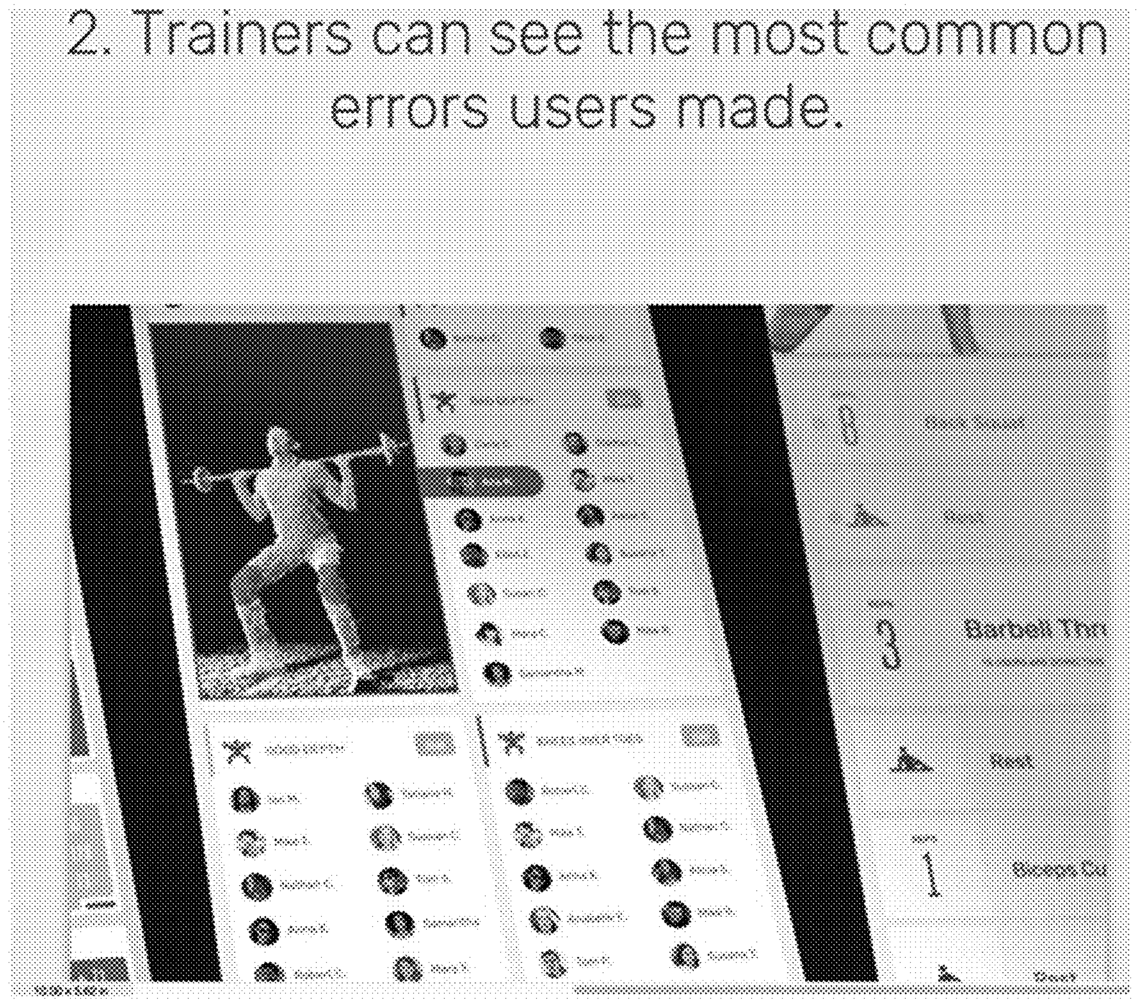
FIGS. 15 and 16 depict example displays showing errors made by users.
Figure 16:
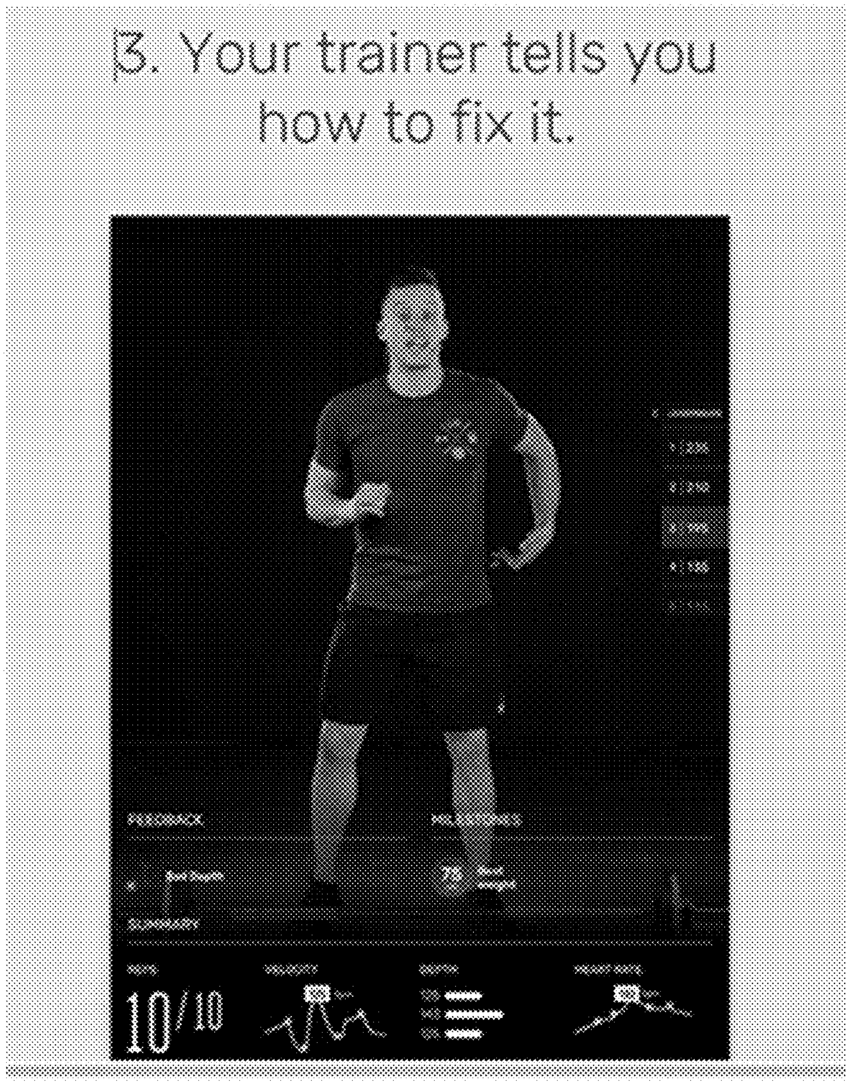
Figure 17:
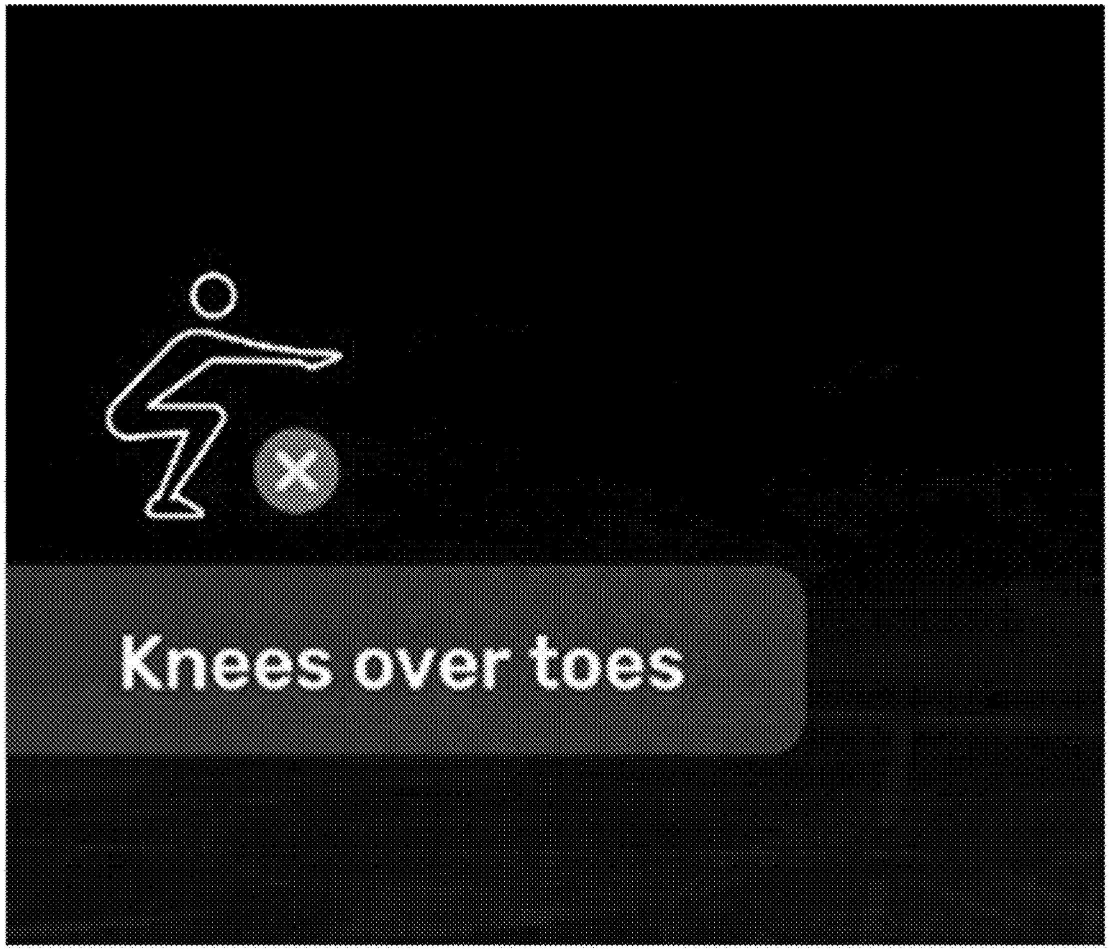
FIG. 17 depicts an example indication of an error in a user's form during an exercise.

In one example, instructors (e.g., using instructor systems 508) can view the most common errors a user made (e.g., as shown in FIGS. 15 and 16). More specifically, in FIG. 16, an instructor can view users in their live class and see users using bad form highlighted with their name in red. The computer vision and machine learning-based form feedback and scoring system 504 can then determine if this severity score is above a threshold. This threshold can be dynamic and/or specific to a user. For example, a beginner can have a higher threshold than an expert. If the score is above the threshold, the user can be notified by an onscreen indicator, generated and/or presented by the computer vision and machine learning-based form feedback and scoring system 504, that they have made this error. The user interface generated and/or presented by the computer vision and machine learning-based form feedback and scoring system 504 can indicate the error and/or show the user the error in their exercise form (e.g., as shown in FIG. 17).

Accordingly, the computer vision and machine learning-based form feedback and scoring system can trigger a notification that notifies the user what mistake the user has made and/or how to correct the mistake. For example, as shown in FIG. 16, the user interface can display with red text "bad depth" in on the display to indicate an error in the user's form involving and incorrect depth of the movement performed by the user. Notifications can also include indicators of proper technique in addition to, or instead of, indicators of improper technique.

Figure 18:
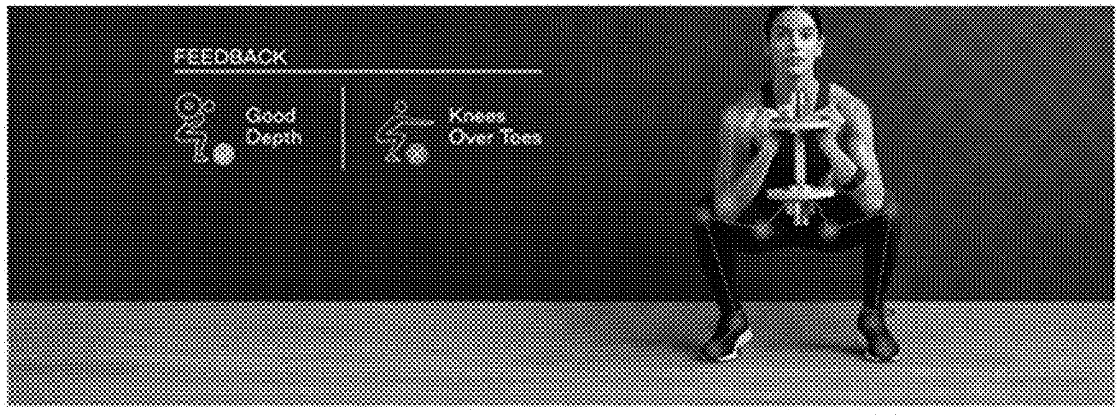
FIG. 18 depicts example real-time feedback.
Figure 19:
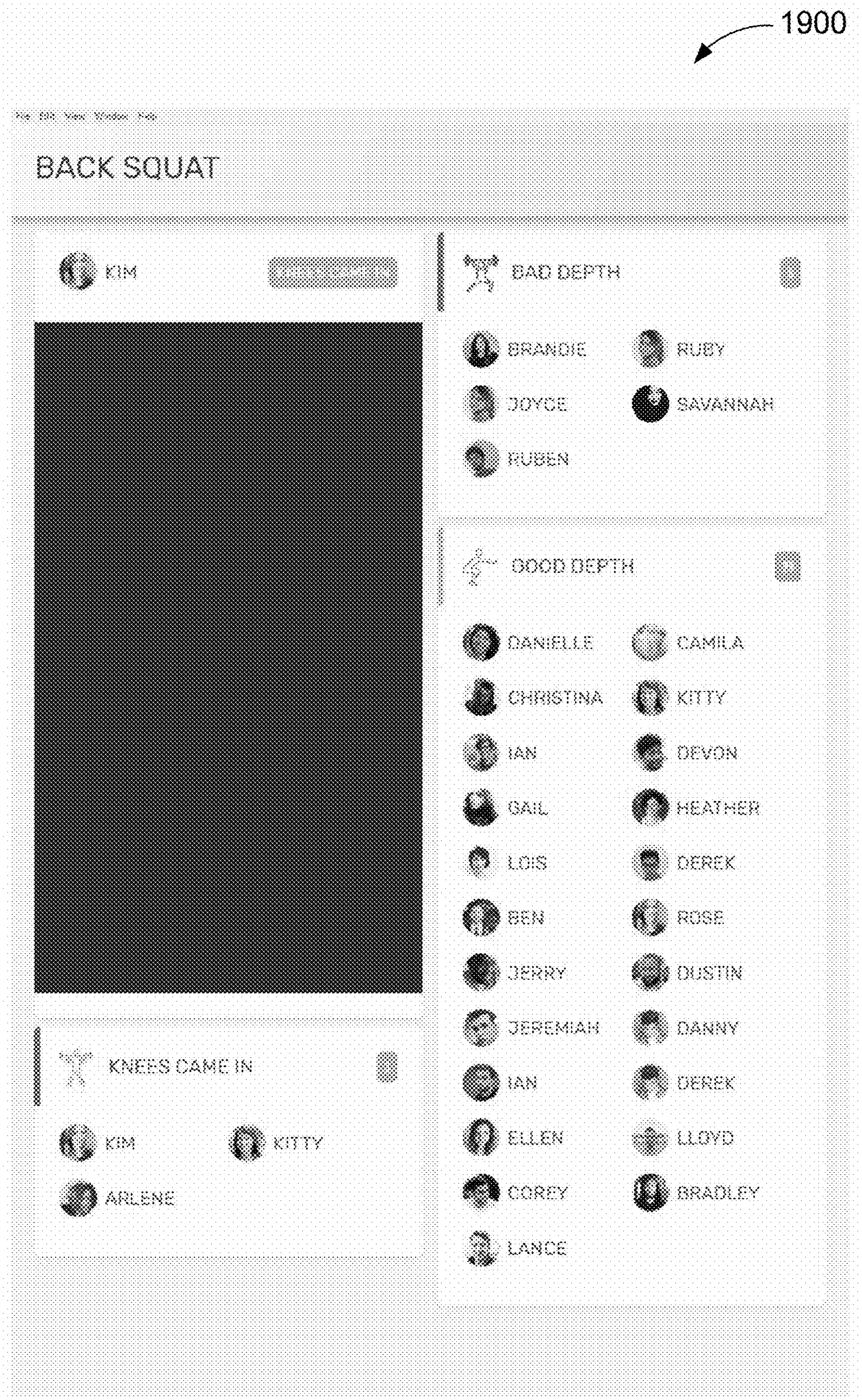
FIG. 19 depicts an example display showing users that had correct form and users that had incorrect form.

In a specific implementation, the computer vision and machine learning-based form feedback and scoring system 504 can function to provide a 3D representation of the user performing an exercise such that the user can view their form in real-time. Accordingly, an instructor can correct a user's form live (e.g., in real-time) rather than having the user wait a long period of time to receive form feedback. Example real-time feedback is shown in FIG. 18. In some embodiments, error and associated data (e.g., what time the error occurred, the user that made the error, and/or the like) can then be serialized to a byte stream representation and sent along the internet to a class server (e.g., leaderboard system 506). By merely transmitting the errors (which are small in size), the computer vision and machine learning-based form feedback and scoring system 504 is able to dramatically reduce the bandwidth required from the raw point cloud representation above. In some embodiments, analysis engines (or, leaderboard engines) may execute in the cloud (e.g., on the leaderboard system 506) or at a recording studio (e.g., instructor system 508) and can be notified each time that an error occurs and can updates its display to show the live trainer which users have made which errors during this set (e.g., see example in FIG. 19).

In a specific implementation, a live instructor who is leading a live class, or the computer vision and machine learning-based form feedback and scoring system 504 when the user is exercising to a recorded class, can choose to provide individual guidance to users who made the error, calling them out by their usernames and telling them how they can fix the mistake they made. This video feed can be broadcast from a studio (e.g., instructor system 508) using, for example, Blackmagic cameras which are connected to a video mixing board, which can feed into a hardware H.264 encoder that packages the video and uploads it using RTMP to the cloud video services, which package this into a DASH video feed which can then be consumed by the computer vision and machine learning-based form feedback and scoring system 504 (e.g., in the user's home).

Figure 20:
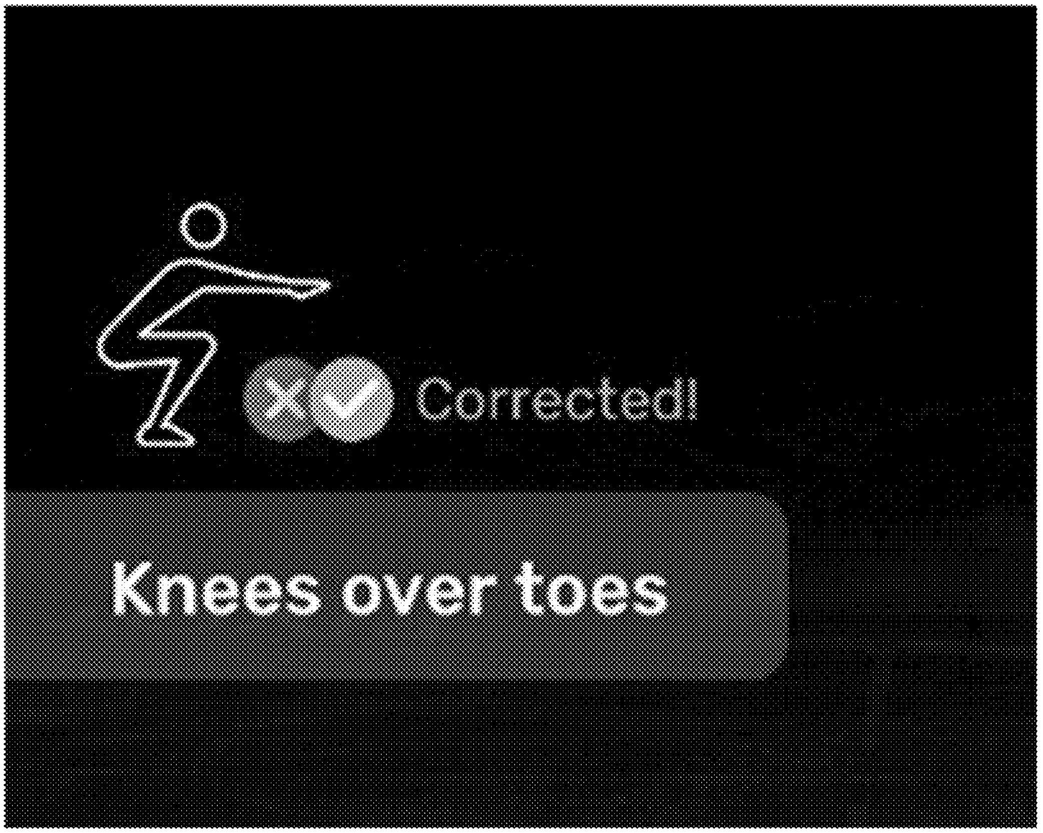
FIG. 20 depicts an example display showing an indication to the user that the user has corrected their form.

With the guidance of the computer vision and machine learning-based form feedback and scoring system 504, the user can attempt to correct their mistake on subsequent repetitions of an exercise (e.g., the next repetition). The user can continue exercising and attempt to change their behavior to correct their mistake in exercise technique/form. The computer vision and machine learning-based form feedback and scoring system 504 can detect that the user has corrected their mistake and can trigger a notification showing the user that their correction has been noticed. Thus, when the user is successfully performing an exercise with the proper technique, the computer vision and machine learning-based form feedback and scoring system 504 can detect an error severity for that error that is beneath a threshold, and the user can be immediately rewarded with an onscreen indication that they were successful in correcting the error (e.g., as shown in FIG. 20).

In a specific implementation, the computer vision and machine learning-based form feedback and scoring system 504 can function to, as described elsewhere herein, detect when users are making mistakes in their technique and notify them in real-time by comparing the tracked user form to, for example, exercise models of this exercise being performed properly. The computer vision and machine learning-based form feedback and scoring system 504 and/or and instructors can provide insights to the user on how to improve/correct both their exercise routine and individual technique on specific exercises.

Generally, proper form gets the user stronger, faster—and the computer vision and machine learning-based form feedback and scoring system 504 can help the user improve in real-time. for example, the computer vision and machine learning-based form feedback and scoring system 504 can use built in 3D sensors to track the user's form, counts the user's repetitions, and recommend a heaviness of weights to use in an exercise, as discussed elsewhere herein. Also as discussed elsewhere herein, the computer vision and machine learning-based form feedback and scoring system 504 can capture motion by emitting pulses of infrared light, for example, 30 times a second, and generating a 3D model of the user's body made up of for example, 80,000 individual points. The computer vision and machine learning-based form feedback and scoring system 504 can analyze, for example, the 80,000 individual points and break this down into, for example, 25 points of the user's body's essential joints as the user works out. Powered by two or more 3D motion sensors and artificial intelligence, the computer vision and machine learning-based form feedback and scoring system 504 can analyze the 25 points of the user's body's essential joints as the user exercises and can provide the user easily understood form feedback.

It will be appreciated that providing feedback on merely heart rate and repetitions during an exercise is not sufficient. The computer vision and machine learning-based form feedback and scoring system 504 can break down the user's workout into a greater level of granularity than traditional systems by, for example, recording the user's repetitions, time under tension, the user's overall volume, and/or other parameters. The computer vision and machine learning-based form feedback and scoring system 504 can provide detailed statistics for every exercise and class, so the user knows exactly what it takes to set the user's next level of performance.

In a specific implementation, the computer vision and machine learning-based form feedback and scoring system 504 can function to count repetitions of exercises (e.g., bodyweight exercises, weighted exercises), heaviness of weight, and/or the like, while also providing sophisticated exercise form guidance and overall workout routine guidance. The computer vision and machine learning-based form feedback and scoring system 504 can support a wide variety of types of exercises and provide sophisticated guidance in real time (e.g., by using a user's anatomy and fitness history to influence the recommendations that the software system makes for technique and heaviness of weights to use).

In a specific implementation, the computer vision and machine learning-based form feedback and scoring system 504 can function to, as described elsewhere herein, track at least 25 points of movement of the user with computer vision to take in raw data as inputs into one or more models (e.g., 3D models, machine learning models, statistical models, and/or other models discussed herein), while also tracking the motion of the user's exercise equipment such as barbell and dumbbells. In an example, the computer vision and machine learning-based form feedback and scoring system 504 can pare down the raw data to 25 essential joints and the positions of the exercise equipment. The computer vision and machine learning-based form feedback and scoring system 504 can initially map a user's body (e.g., bodies of any size, and in any kind of clothing the user feels comfortable working out in). The computer vision and machine learning-based form feedback and scoring system 504 can overcome obstructions of a user while exercising, (e.g., when weights block the view of the camera to the user's body). The computer vision and machine learning-based form feedback and scoring system 504 is able to effectively "see through" the weights to keep track of the user's body properly through the entire motion. The computer vision and machine learning-based form feedback and scoring system 504 knows the colors and geometry of the exercise equipment so it can ensure the proper form on the weights (e.g., level on both sides) and then effectively erase them to make sure the human body form is used during the exercise.

The computer vision and machine learning-based form feedback and scoring system 504 can use artificial intelligence (e.g., machine learning models) to apply weighted factors in the algorithms so that unnecessarily rushing through lifts and logging reps but using poor form will not result in counted repetitions and/or a user competing for a top spot on a leaderboard displayed on the user interface. The computer vision and machine learning-based form feedback and scoring system 504 can apply weighted factors in the algorithms which can force a user to realize that it is also important to use proper form and technique, rather than rushing through a routine. If the user does not, for example, use proper form in a weightlifting exercise, then the user will not see proper results from their exercise routine.

In a specific implementation, the computer vision and machine learning-based form feedback and scoring system 504 can execute functions locally to identify a user's mistake and inform them when they have successfully corrected their error in performing the exercise. The hardware of the GPU and CPU are embedded locally to the computer vision and machine learning-based form feedback and scoring system 504 along with the form feedback models (and the other models discussed herein) so that the analysis and calculations on whether proper form and technique are being used can be calculated in real-time and then displayed back on a local display screen to the user in real time while they are doing the exercise verses having to wait for all of that information to be captured and then sent over the internet to a remote server, which then could perform analysis and calculations on whether the proper form and technique are being used, and then send back the guidance. The lag between performing the exercise with an improper technique would not be quick enough for the user to correct their form via the feedback.

In a specific implementation, the computer vision and machine learning-based form feedback and scoring system 504 can function to calculate exercise scores for users. Exercise scores may be calculated based on a number of "good" (or, "proper" or "satisfactory") repetitions (e.g., based on a dynamic severity threshold) performed by a user, an amount of weight used during the exercise, form feedback, and/or the like. For example, the combination of an exercise score of a user's performance incorporating exercise form into the evaluation and instant feedback on improper exercise form on the user interface and possibly from a live trainer can provide a motivational balance to perfect each repetition of, for example, a weightlifting exercise, while using the constantly changing standings on the leaderboard, as additional motivation. Properly performing an extra repetition(s) on a heavier weight can prove to be more beneficial (e.g., higher score) than poorly swinging (e.g., based on a severity threshold) a dumbbell back and forth and logging a large number of repetitions that ultimately will not be counted by computer vision and machine learning-based form feedback and scoring system 504. Additionally, focusing on exercise form, number of repetitions, heaviness of weights, and other factors involved to generate that user's exercise score can make getting a top spot on a leaderboard much more rewarding when it happens.

In a specific implementation, the exercise score of a user on the leaderboard also factors in, for each class participant, on the amount of weight they lift. At the conclusion of an exercise class, the user is able to see not just the number of reps but also the exact number of pounds lifted. The user interface records the exercise results and parameters to give access to this kind of information while working out.

In a specific implementation, training software of the computer vision and machine learning-based form feedback and scoring system 504 can receive information from other components of the computer vision and machine learning-based form feedback and scoring system 504 (e.g., the 3D computer vision and models components) to drive recommendations for which classes a user should take to maximize their performance, and what weights they should lift in each class. The computer vision and machine learning-based form feedback and scoring system 504 can track a user's form, counts the user's repetitions, and recommend weights while also empowering live coaches to give the user a richer and more effective workout. Weight recommendation can also be tailored for each particular user to track repetitions and heaviness of weights, and form, over time to make recommendations to the user.

In a specific implementation, in addition to the live trainer and leaderboard, a user interface generated by the computer vision and machine learning-based form feedback and scoring system 504 can show how much time remains in each round of a class workout, the current routine, the user's target repetitions, and/or the like, and a user's heart rate (e.g., which can be pulled from an included heart rate monitor the user wears for each session). The computer vision and machine learning-based form feedback and scoring system 504 can connect via Bluetooth to a fitness tracker worn by the user to obtain additional monitored body parameters to record and incorporate into evaluating a user's performance. Such a user interface can provide video demonstrations and the live trainer can also provide live demonstrations to provide technique feedback to help the user achieve proper form. For example, when a user does squats, the computer vision and machine learning-based form feedback and scoring system 504 can notice whenever the user's knees go past their toes (e.g., outside the parameters of proper form for that exercise for this user according to the model) and then alert the user each time it happens. On the next rep, the user interface will then tell the user if the user has fixed their form or if the exercise form still needs to be corrected again. Once a class finishes, a class recap on the user interface shows the user each routine that prompted an error message, as well as how many reps the user completed and the user's total range of motion.

In a specific implementation, the computer vision and machine learning-based form feedback and scoring system 504 can include, for example, a built-in Azure Kinect 3D sensor. By making use of artificial intelligence and the Azure Kinect 3D sensor, the computer vision and machine learning-based form feedback and scoring system 504 can track the user's every move, comparing what it is capturing against how each lift should look (e.g., as defined by a model). The computer vision and machine learning-based form feedback and scoring system 504 knows exactly, for example, what dumbbell presses should look like for that individual, the correct form for push-ups, and even how a burpee should be performed. It is like having a digital personal trainer watching the user's every move and just slightly altering the user's form as needed.

In various implementations, the computer vision and machine learning-based form feedback and scoring system 504 can provide live feedback with ultra-low latency that quickly delivers feedback triggered by the user to the instructor which can then allow for the live feedback from the instructor to the user(s). The machine learning models/algorithms of the computer vision and machine learning-based form feedback and scoring system 504 can take the input of million points of raw data (e.g., in 3D depth and RGB) captured by two or more sensors to create at least the 25 points on the skeleton and then interprets what is a repetition, and what is a proper form for that user and that exercise, and what is wrong and different levels of severity for what is wrong about the exercise being performed by the user.

In a specific implementation, the computer vision and machine learning-based form feedback and scoring system 504 can implement a variety machine learning models and algorithms. For example, an example artificial intelligence evaluation process that can be performed by the computer vision and machine learning-based form feedback and scoring system 504 can be as follows. The artificial intelligence can be trained specifically for each exercise, feedback, or other feature. Some of the artificial intelligence models may have been trained with supervised learning, some with unsupervised learning, some with both, and some are just calculations based on the skeletal data. Note, some classes of exercise have similar machine learning approaches and minorly tweaked configurations. For example, bicep exercises can all use similar models but depending on the type of bicep exercise (e.g., DB Bicep Curl, BB Bicep Curl, alternating versions of those, BB Reverse Curl and a few others) have minorly tweaked configurations.

In a specific implementation, the computer vision and machine learning-based form feedback and scoring system 504 can evaluate for each set of training a user's form, such as when users are dangerously using their back to lift the weight instead of their arms. In an example, a statistical model based on the positions of the 3D joints can estimate the orientation of the back, and can track this through the repetition, using the range of motion in space and comparing this to a simple supervised-learned machine learning model that can calculate and reports a severity score (e.g., 0 to 1).

Thus, for example, when the user makes an error, the error can be detected by, for example, the computer vision and machine learning-based form feedback and scoring system 504 executing convolutional neural networks CNNs, recurrent neural networks (RNN), statistical analysis, or support vector machines across the feature vector of the human skeleton across one or more frames, producing an error "severity" score on the interval (e.g., 0 to 1) that represents how badly the user made the mistake, with, for example, 1.0 being "as bad as possible".

The computer vision and machine learning-based form feedback and scoring system 504 can determine if a severity score is above a threshold. This threshold can be dynamic and specific to a user. For example, a beginner can have a higher (or otherwise different) threshold than an expert. If the score is above the threshold, computer vision and machine learning-based form feedback and scoring system 504 can notify the user via an onscreen indicator showing they have made a particular error.

Figure 21:
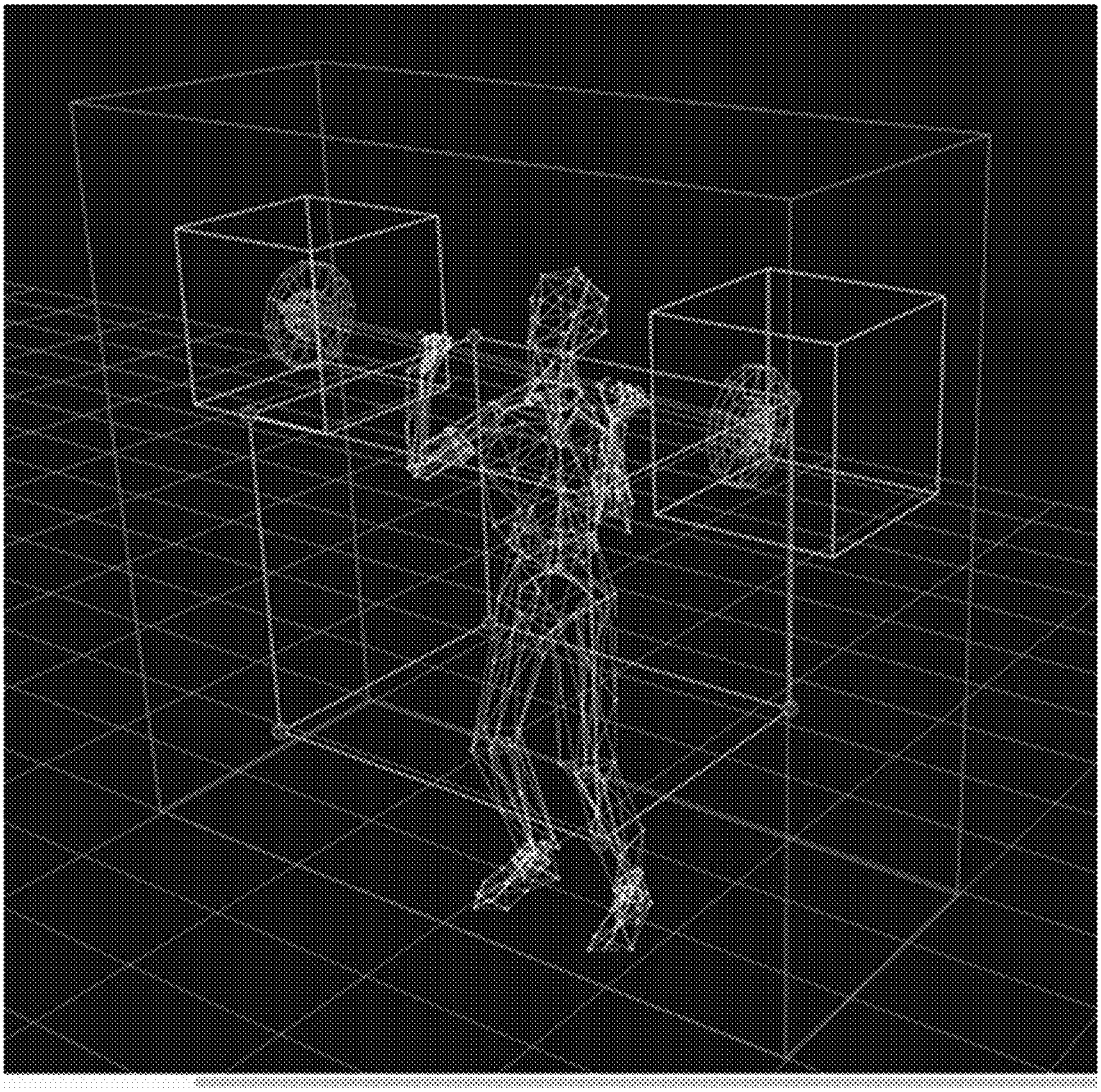
FIG. 21 depicts an example 3D model of a user and exercise equipment.

In some embodiments, the trained models, classifiers and other artificial intelligence of the computer vision and machine learning-based form feedback and scoring system 504 can use a feedback path to use unsupervised learning algorithms to update the model when it is deployed (e.g., at someone's dwelling). The trained models, classifiers, and other artificial intelligence of the computer vision and machine learning-based form feedback and scoring system 504 can be individualized for users at a particular location and/or be based on average example users during the training. The trained models, classifiers, and other artificial intelligence of the computer vision and machine learning-based form feedback and scoring system 504 can use many different weighting factors to generate severity scores and/or dynamic thresholds. The trained models, classifiers, and other artificial intelligence of the computer vision and machine learning-based form feedback and scoring system 504 can be trained from, for example, three years of exercises by users in a gym setting captured by 3D equipment in a 3D motion capture studio into 3D data sets with over 1 million tagged recordings and analyzed. An example 3D model is shown in FIG. 21.

In a specific implementation, the computer vision and machine learning-based form feedback and scoring system 504 can include a 3D time of flight camera, and can have example minimum requirements for the CPU (e.g., cores, threads, processor speed, etc.) and GPU (e.g., memory size, memory speed, etc.) to allow for the live training and feedback. In one example, hardware requirements of an example computer vision and machine learning-based form feedback and scoring system 504 can be a GPU with >=3 GB of RAM, and a CPU with >=4 cores, equivalent to 9th-generation Intel i5.

In a specific implementation, the computer vision and machine learning-based form feedback and scoring system 504 can provide coaches who really coach. As shown below, in live classes, the live coaches in a studio at a remote location from the user's dwelling are notified in real-time when the user makes a mistake, enabling them to provide precise guidance on when to straighten the user's back, pin the user's elbows, sit deeper in the user's squat, the user's knee came in during the back squat, the user's had bad depth during the back squat, and/or the like.

In a specific implementation, the computer vision and machine learning-based form feedback and scoring system 504 can send relevant data on, for example, 25 joint movements and how that is relevant to a current exercise being performed by a user over the internet to a cloud platform (e.g., leaderboard system 506 and/or instructor system 508) is much faster than sending 80,000 individual points 30 times a second over the internet to a cloud platform, which significantly reduces lag in providing feedback from a live trainer or the software models when the user is still doing the exercise. Ultra-low latency can be achieved for the exercises being captured by the computer vision and machine learning-based form feedback and scoring system 504 when the hardware and software performs the local calculations for an exercise being performed by the user to check for errors in that exercise. The hardware of the GPU and CPU can be embedded local to the computer vision and machine learning-based form feedback and scoring system 504, along with the various models described in this paper, so that the analysis and calculations on whether proper form and technique are being used can be calculated in real time, thus, merely the results of the calculations and analysis can be sent over the internet to the live trainer so the trainer can comment on the form and show proper technique in real time just like in a real time class. The local calculation and analysis allows for real-time form cues and feedback during the user's workout.

As discussed, the computer vision and machine learning-based form feedback and scoring system 504 can provide live feedback and ultra-low latency. In a specific implementation, the computer vision and machine learning-based form feedback and scoring system 504 can use specialized hardware. The computer vision and machine learning-based form feedback and scoring system 504 can allow for live video streaming from the studio (e.g., instructor system 508) to the user's screens. The computer vision and machine learning-based form feedback and scoring system 504 can capture motion by emitting pulses of infrared light, for example, 30 times a second, generating a 3D model of the user's body made up of for example, 80,000 individual points. The artificial intelligence of the computer vision and machine learning-based form feedback and scoring system 504 can analyze, for example, the 80,000 individual points and break this down into, for example, 25 points of the user's body's essential joints as the user works out. Computer vision and machine learning-based form feedback and scoring system 504 can further compress down the information captured by the 3D camera hardware of the computer vision and machine learning-based form feedback and scoring system 504 into information regarding what mistakes are made by user(s) and to what severity, number of repetitions, and/or the like.

The leaderboard system 506 can function to generate and/or display leaderboards. Functionality of the leaderboard system 506 can be performed by one or more servers (e.g., a cloud-based server) and/or other computing devices. In some embodiments, some or all of the functionality of the leaderboard system 506 can be included in one or more of the other systems described herein (e.g., free-standing A-frame exercise equipment cabinet 102 and/or computer vision and machine learning-based form feedback and scoring system 504).

The instructor systems 508 can function to capture video, audio, and/or haptic information of an instructor, and provide that information to one or more remote systems (e.g., computer vision and machine learning-based form feedback and scoring system 504). For example, an instructor system 508 can capture video of an instructor leading an exercise class, and that video can be provided (e.g., live-streamed or pre-recorded) to one or more systems over a network (e.g., CRM 502). Functionality of the instructor systems 508 can be performed by one or more servers (e.g., a cloud-based server) and/or other computing devices. In some embodiments, functionality of the instructor systems 508 can be included in another of systems described herein (e.g., free-standing A-frame exercise equipment cabinet 102 and/or computer vision and machine learning-based form feedback and scoring system 504). As used herein, an instructor may also be referred to as a trainer, personal trainer, coach, and/or the like.

In a specific implementation, an instructor system 508 can allow a live instructor who is leading the live class can choose to provide individual guidance to users who made an error, calling them out by their usernames and telling them how they can fix the mistake they made. This video feed can broadcast from a studio using, for example, Blackmagic cameras which are connected to a video mixing board, which feeds into a hardware H.264 encoder that packages the video and uploads it using RTMP to the cloud video services, which package this into a DASH video feed, which can then be consumed by the computer vision and machine learning-based form feedback and scoring system 504.

In a specific implementation, the instructor systems 508 can receive data from computer vision and machine learning-based form feedback and scoring systems 504. For example, an instructor system 508 can be notified from the computer vision and machine learning-based form feedback and scoring system 504 when a user has corrected their form, and the instructor system 508 and send a return notification acknowledging the corrected mistake, and/or other associated messages.

Figure 6:
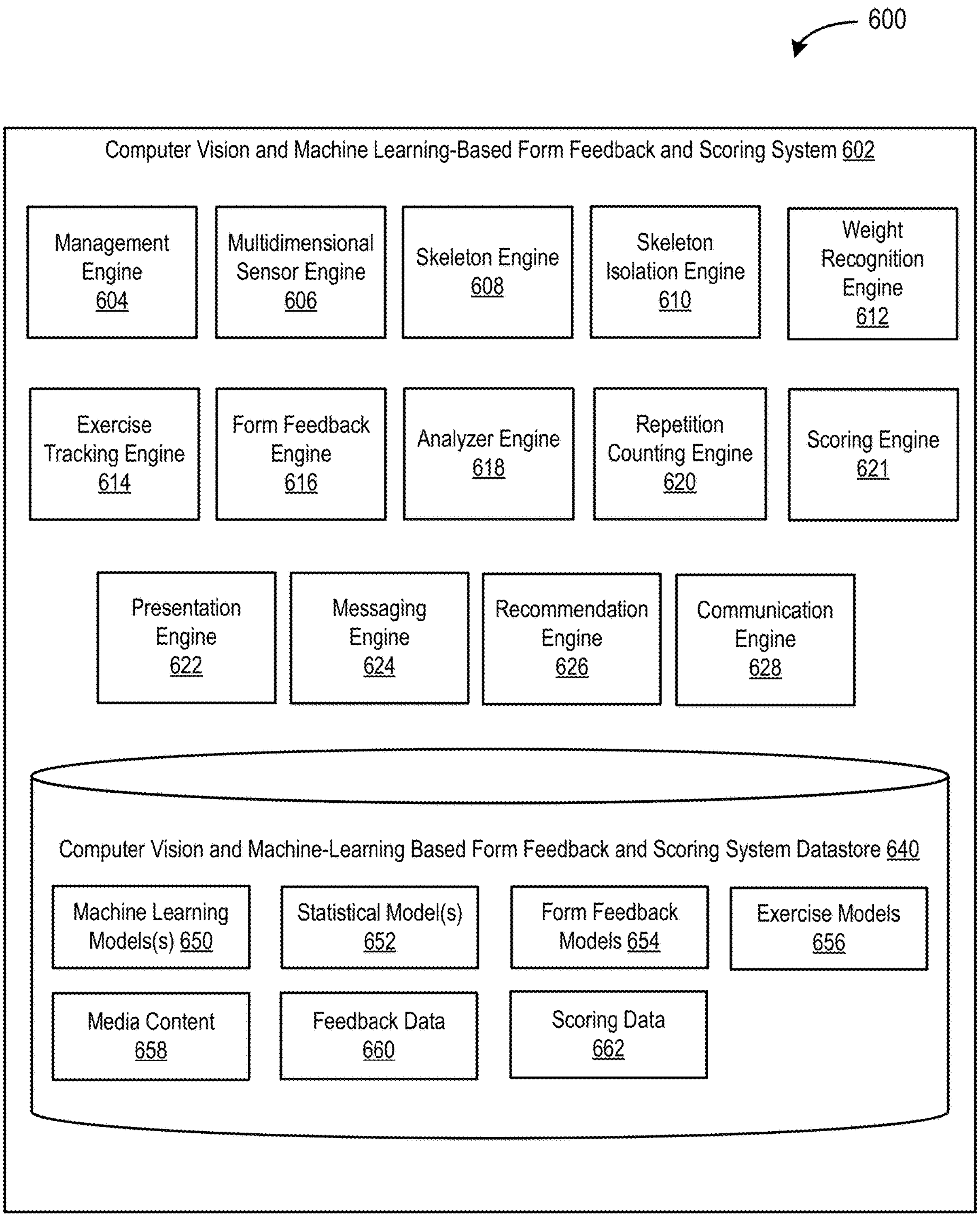
FIG. 6 is a diagram of an example of a computer vision and machine learning-based form feedback and scoring system.

FIG. 6 is a diagram 600 of an example of a computer vision and machine learning-based form feedback and scoring system 602. In the example of FIG. 6, the computer vision and machine learning-based form feedback and scoring system 602 includes a management engine 604, a multidimensional sensor engine 606, a skeleton engine 608, a skeleton isolation engine 610, a weight recognition engine 612, an exercise tracking engine 614, a form feedback engine 616, an analyzer engine 618, a repetition counting engine 620, a scoring engine 621, a presentation engine 622, a messaging engine 624, a recommendation engine 626, a communication engine 628, and a computer vision and machine learning-based form feedback and scoring system datastore 640. In a specific implementation, all of the engines 604-628, or functionality thereof, execute locally (e.g., locally on a free-standing A-frame exercise equipment cabinet 102).

The management engine 604 is intended to represent an engine that manages (e.g., create, read, update, delete, or otherwise access) machine learning models 650, statistical models 652, form feedback models 654, exercise models 656, media content 658, feedback data 660, scoring data 662, and/or other data associated with the computer vision and machine learning-based form feedback and scoring system 602. In some embodiments, any of the model 654-656 can be a subset of the machine learning models 650 and/or the statistical models 652. The management engine 604 can perform any of these operations manually (e.g., by a user interacting with a GUI) and/or automatically (e.g., triggered by one or more of the engines 606-626). Like other engines described herein, some or all the functionality of the management engine 204 can be included in and/or cooperate with one or more other engines (e.g., engines 606-626) and datastores (e.g., datastore 640). Like other engines described herein, the management engine 604 may performs its functionality entirely locally (e.g., executing on a computing system of a free-standing A-frame exercise equipment cabinet 102), or remotely (e.g., on a cloud-based system), or a combination thereof.

As used in this paper, machine learning and/or artificial intelligence can use one or more machine learning models 650 to provide predictions, estimations and decisions (e.g., without being explicitly programmed to do so). Training data (e.g., labeled data) can be used to train the machine learning models 650. Each engine can each use one or more of the same or different types of machine learning models 650 (e.g., for different stages of operations). Different types of machine learning approaches and models of 650 can be used. For example, the machine learning described in this paper can use CNNs, neural networks, graph neural networks, deep learning, clustering, Bayesian networks, random forest, supervised learning (e.g., requiring a user or other information source to label pairs of training data), semi-supervised learning (e.g., active learning), k-nearest neighbor, and the like. In a specific implementation, a graph neural network can be particularly beneficial as it can efficiently handle large amounts of data, which can reduce computation time and/or computation resource requirements (e.g., processor requirements).

The statistical models 652 can include, for example, logistic regression models, time-series models, clustering models, decision tree models, and/or the like. Regression models can include logistic, polynomial, and linear regression models.

The form feedback models 654 and/or the exercise models 656 can include 3D representations of different exercises (e.g., including various motions of the exercises) being performed with proper technique.

The multidimensional sensor engine 606 is intended to represent an engine that captures (or detects), and/or controls the capture (or detection) of, data (e.g., 2D data, 3D data). For example, the multidimensional sensor engine 606 can capture motion data (e.g., 3D video, 3D images, 2D images that can be converted to 3D images, 2D video that can be converted to 3D video, and/or the like). It will be appreciated that techniques described in this paper for 3D can also be applied to 2D. For example, context may determine whether to use 2D or 3D.

In a specific implementation, the multidimensional sensor engine 606 can function to capture raw data in 3D depth and RGB. Thus, for example, the multidimensional sensor engine 606 can function to periodically emit infrared (IR) pulses (e.g., 30 times per second), capture IR video, depth video, RGB images, and/or other 3D motion capture signals and data. Like the other engines described herein, the multidimensional sensor engine 606 can include hardware and/or software. For example, the multidimensional sensor engine 606 can include 3D sensors (e.g., 3D motion sensors), 2D sensors, acoustic (or, sonic) sensors, and/or the like. More specifically, the multidimensional sensor engine 606 can include IR sensors, red, green, and blue (RGB) sensors, acoustic sensors, and/or the like, as well as hardware and/or software for controlling such sensors. In some embodiments, the multidimensional sensor engine 606 comprises a 3D camera (e.g., a 3D time of flight camera) and functionality to control the 3D camera. For example, the 3D camera can include the aforementioned sensors. In various embodiments, the cameras and/or sensors described in this paper can capture light at various wavelengths (e.g., IR) and also acoustic data. Accordingly, techniques described herein that utilize sensor data (e.g., video, images, IR, RGB) can also use acoustic data in addition to, or instead of, other data (e.g., video, images, IR, RGB).

In a specific implementation, the multidimensional sensor engine 606 can function to capture (e.g., of users and/or equipment) and record each frame (e.g., at 30 frames per second) of movements, motions, positions, orientations, and/or the like.

The skeleton engine 608 is intended to represent an engine that generates a point cloud representation of a user and/or equipment. In a specific implementation, the skeleton engine 608 can function to generate a point cloud of the user during a workout based on periodically emitted IR pulses. For example, a point cloud may include at least 80,000 points. In a specific implementation, the skeleton engine 608 can function to generate a 3D model of the user. The 3D model can include the point cloud of the user and the exercise equipment. The 3D model can be generated in response to the generation of the point cloud of the user and the exercise equipment.

The skeleton isolation engine 610 is intended to represent an engine that uses machine learning to estimate (or, predict) set of joints (e.g., particular points of a point cloud of a user) of a representation of a user (e.g., a point cloud of a user, a 3D model of a user). This can allow, for example, the engines of the computer vision and machine learning-based form feedback and scoring system 602 to operate on a set of joints comprising, for example, 25 points, as opposed to operating on a set of 80,000 or more points.

In a specific implementation, the skeleton isolation engine 610 can function to input raw data (e.g., IR video, depth video, RGB data) into one or more machine learning models 650. For example, the skeleton isolation engine 610 can function to input raw data into a convolutional neural net machine learning model 650. Based on the output of the machine learning model 650, the skeleton isolation engine 610 can estimate a set of joints for a user. For example, the set of joints may correspond to a subset of points of a point cloud. For example, each joint may correspond to a single point of the point cloud. In another example, each joint may correspond to multiple points (e.g., adjacent points) of the point cloud. In a specific implementation, the skeleton isolation engine 610 can function to validate an estimated set of joints. The validating can be performed using one or more other machine learning models 650 and/or one or more statistical models 652.

The weight recognition engine 612 is intended to represent an engine that determines (or, "recognizes" or "identifies") a type of exercise equipment and/or an associated weight. For example, the weight recognition engine 612 can recognize a barbell with a 45 lb plate on each end of the bar. In a specific implementation, the weight recognition engine 612 can know the color and geometry of exercise equipment and/or weights in order to identify equipment and/or weights. The weight recognition engine 612 can use a table storing color-coded and/or geometric-coded information. For example, particular colors may be associated with particular weight values (e.g., 5 lb, 10 lb, 25 lb, 45 lb, and/or the like), and particular geometric values (e.g., shape of equipment, diameter, circumference, and/or the like) may be associated with particular weight equipment (e.g., barbell, dumbbell, weight plate, and/or the like). In a specific implementation, the weight recognition engine 612 can cooperate with the multidimensional sensor engine 606 to determines types of exercise equipment and associated weights using RGB sensors.

The exercise tracking engine 614 is intended to represent an engine that can track the motion of users and equipment in three-dimensions. For example, the exercise tracking engine 614 use the estimated set of joints of a user in a 3D model to track a user's motion over a particular period of time tracks one or more positions, orientations, and/or motions of the equipment over the period of time. This can, for example, be more computationally efficient than tracking motion using a point cloud with over 80,000 points.

The form feedback engine 616 is intended to represent an engine that determines and provides (e.g., in real-time) feedback regarding the form of exercise movements performed by a user. Form can correspond to position, motion, and/or orientation of a user's body and/or equipment being used be the user performing the exercise. The form feedback engine 616 can use form feedback models and/or exercise models to compare tracked user motion of a user performing an exercise (e.g., as represented set of joints of a user in a 3D model) to a correct form of the exercise as defined in the models. The form feedback engine 616 may use machine learning models to determine which exercise a user in performing if the computer vision and machine learning-based form feedback and scoring system 602 does not already know which exercise is being performed.

In a specific implementation, the form feedback engine 616 can determine a form feedback value. The form feedback value can be determined based on a tracked user's motion over a period of time and one or more models 650-656. The form feedback value can be determined from a set of form feedback values and/or otherwise. For example, the form feedback value can be determined from a set of form feedback values including a satisfactory value (e.g., indicating the user's form during a repetition and/or exercise is satisfactory based on a threshold value, such as a severity threshold or other threshold), an unsatisfactory value (e.g., indicating the user's form during a repetition and/or exercise is unsatisfactory based on the threshold value, such as the severity threshold or other threshold), and/or the like. Feedback values can also correspond to one or more errors made by the user (e.g., not going far enough down during a squat based on a depth threshold), and/or required changes to achieve a satisfactory repetition (e.g., the amount of additional depth required based on the depth threshold). In some situations, such as on-demand classes (e.g., as opposed to live classes), the form feedback engine 616 can take the place of a live instructor to supply user feedback to a user (e.g., regarding their form).

The analyzer engine 618 is intended to represent an engine that determines a degree of error in an exercise performed by a user. In a specific implementation, the analyzer engine 618 determines, based on tracked user motion and one or more models 650-656, a severity score (e.g., a value between 0.0 and 1.0) associated with an exercise performed by the user. The severity score can indicate a degree of error in some or all of the movements of an exercise performed by the user. Movement can include body movements, equipment movements, and/or the like.

In a specific implementation, the analyzer engine 618 determines, based on a severity score and a dynamic severity threshold value, that a user had made an error in some or all of the movements of an exercise performed by the user. For example, the analyzer engine 618 can determine the user made an error if the severity score exceeds a dynamic threshold value based on a comparison between the severity score and the dynamic severity threshold value.

In a specific implementation, the analyzer engine 618 can evaluate, for each set of training, a user's form, such as when users are dangerously using their back to lift the weight instead of their arms. In one example, a statistical model 652 based on the positions of 3D joints can estimate the orientation of the back, and can track this through the repetition, using the range of motion in space and compare this to a simple supervised-learned machine learning model 650 that can calculate and/or report a severity score (e.g., 0 to 1).

Thus, for example, when the user makes an error, the error can be detected by, for example, by the analyzer engine 618 executing one or more CNNs, recurrent neural networks (RNN), statistical analysis, or support vector machines across the feature vector of the human skeleton across one or more frames, producing an error "severity" score on the interval (e.g., 0 to 1) that represents how badly the user made the mistake, with, for example, 1.0 being "as bad as possible," and 0.0 being "as good as possible."

In a specific implementation, the trained models, classifiers and other artificial intelligence (collectively, the machine learning models 650) can use a feedback path to use unsupervised learning algorithms to update a model after it is deployed (e.g., at someone's dwelling). The trained models, classifiers, and other artificial intelligence can be individualized for the users at that location and/or be based on average example users during the training. The trained models, classifiers, and other artificial intelligence can use many different weighting factors to generate the score, which has the dynamic threshold. The trained models, classifiers, and other artificial intelligence can be trained from, for example, three years of exercises by users in a gym setting captured by 3D equipment in a 3D motion capture studio into 3D data sets with over 1 million tagged recordings and analyzed. An example 3D model is shown in FIG. 21.

In a specific implementation, the analyzer engine 618 can determine if a severity score is above a threshold. This threshold can be dynamic and specific to a user. For example, a beginner can have a higher threshold than an expert. If the score is above the threshold, the user can be notified by an onscreen indicator that they have made this error.

The repetition counting engine 620 is intended to represent an engine that counts the number of repetitions of an exercise, or exercise movement, by a user. In a specific implementation, the repetition counting engine 620 can function to determine a number of repetitions of the exercise performed by the user based on tracked user motion over and one or more models 650-656.

In a specific implementation, the repetition counting engine 620 can function to reduce a number of determined repetitions performed by a user. For example, the number of repetitions can be reduced in response to, and/or based on, a form feedback value (e.g., an "unsatisfactory" value) and/or a severity score (e.g., a severity below a particular threshold value).

In a specific implementation, the repetition counting engine 620 can function to compare each frame of captured video (or portions of 3D representations) against an exercise definition of an exercise model 656. The exercise definition and/or the exercise model 656 can be a specific file that is created for each exercise (e.g., squats, lunges, deadlifts, and/or the like) that can include configuration for machine learning and/or statistical techniques, such as convolutional neural network (CNN), statistical requirements, random forests and/or other conditions for a repetition to be counted. Repetitions and form may be evaluated based on all or some of the frames of captured video or portions of 3D representations. For example, models 650-656 may define which motions are relevant to particular exercises, and the system may only need to evaluate the frames or portions of 3D representations associated with those motions.

Figure 22:
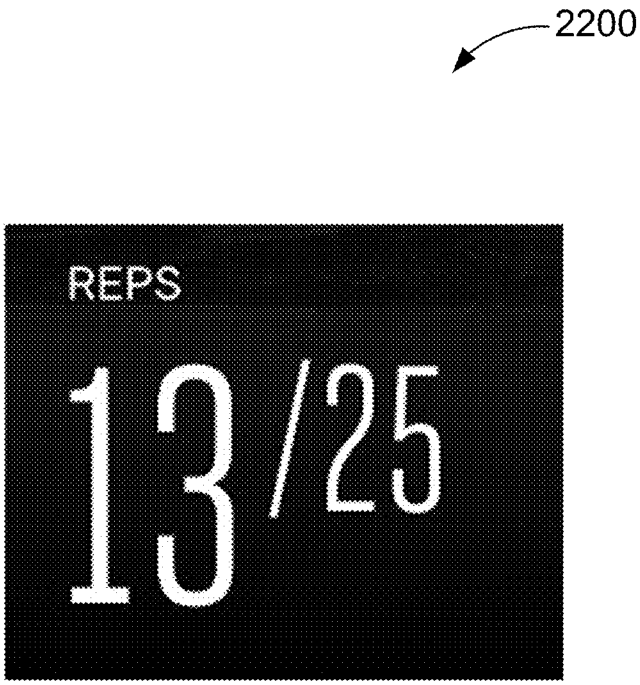
FIG. 22 depicts an example display indicating an example number of repetitions performed of a set of a repetitions.

In a specific implementation, the repetition counting engine 620 can function to report to the user that a repetition has been counted (e.g., as shown in FIG. 22). In some embodiments, the repetition counting engine 620, or a component thereof (e.g., exercise model 656), generates the report, and the messaging engine 624 provides the report indicating the counted repetition to the user. The repetition counting engine 620 can also function to report that a repetition has been finished in response to detecting/determining that a user has returned to a starting position of the motion of the exercise. In some embodiments, the repetition counting engine 620 can cooperate with the multidimensional sensor engine 606 to detect/determine that the user has returned to the starting position.

The scoring engine 621 is intended to represent an engine that calculates user exercise scores based on a user's performance of various exercises, movements of exercises, sets of exercises, and/or the like (collectively, exercises). The user exercise score may be associated with the user that performed the exercises. In one example, the scoring engine 621 can calculate a user exercise score based on a number of repetitions performed (e.g., as counted by the repetition counting engine 620) by the user and a form feedback value (e.g., as determined by the form feedback engine 616). For example, the exercise score may not be based on repetitions associated with an unsatisfactory feedback value. In another example, the scoring engine 621 can calculate a user exercise score based on the weight associated with the exercise equipment (e.g., as determined by the weight recognition engine 612) and the number of repetitions and the form feedback value. Thus, a user that lifts more weight (e.g., absolute weight and/or weight relative to body weight or other body attributes) may have higher score than if they lifted lower weight. Exercises scores may also be calculated based on other parameters, such as time taken to perform the exercise, a degree of error in the form used by the user, height of the user, weight of user, and/or other body attributes.

The presentation engine 622 is intended to represent an engine that generates and/or presents audio, visual, and/or haptic information. The presentation engine 622 can also generate interactive displays (e.g., for use with touch screens). In some embodiments, the presentation engine 622 generates graphical user interface which can display a variety of information, such as leaderboards, video of instructor leading a class or demonstrating an exercise, a rendered 3D model of a user performing an exercise, and/or other information described herein capable of being displayed through a graphical user interface. In some embodiments, the presentation engine 622 can cooperate with other systems (e.g., remote systems) to render a complete graphical user interface. In a specific implementation, the presentation engine 622 can generate and/or present any of the images and displays shown in FIGS. 11-26.

Figure 23:
FIG. 23 is a screenshot of images displayed by an example computer vision and machine learning-based form feedback and scoring system.
Figure 25:
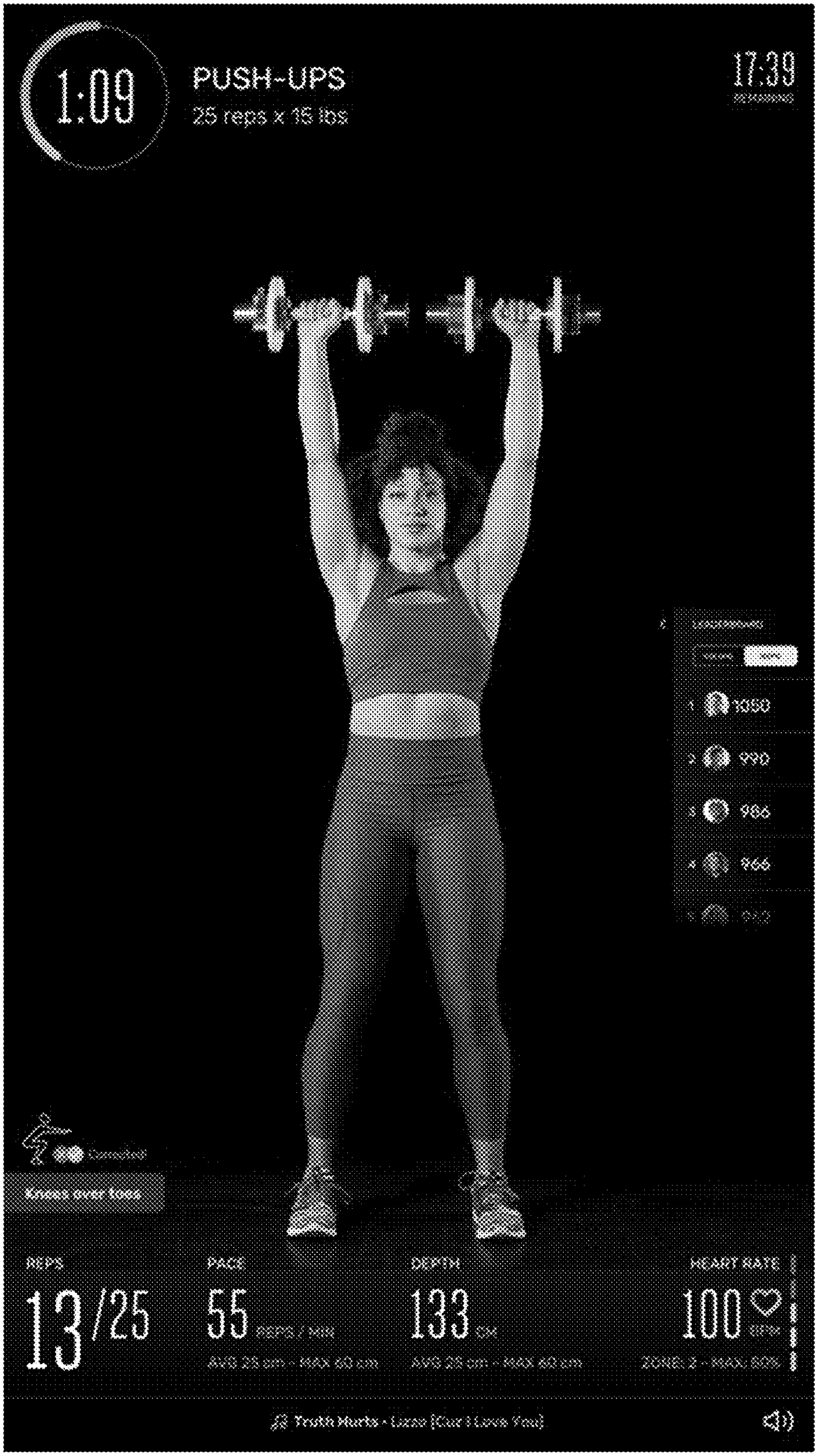
FIGS. 25 and 26 depict an example display that a user may view while using a computer vision and machine learning-based form feedback and scoring system.
Figure 26:

In a specific implementation, the presentation engine 622 can cooperate with the leaderboard system 506 to generate and display leaderboards. Example leaderboards are shown in FIGS. 11, 23 and 25, to name a few.

In a specific implementation, the presentation engine 622 can generate interfaces that allows a user to see their form while exercising, as well as allowing the user to select, for example, HIIT and Tabata classes, warm-up and cool-down sessions, mobility routines, and even body-part-specific workouts. The presentation engine 622 can also generate interfaces that allow users to select different live classes and/or on-demand recorded exercise classes (e.g., media content 658). The presentation engine 622 can present live trainer-led courses without any real lag. Live instructors can explain each workout and its proper form while also physically doing the entire routine alongside you.

The messaging engine 624 is intended to represent an engine that generates, provides, and/or receives notifications and/or other messages. In a specific implementation, the messaging engine 624 can function to provide a user exercise score and/or a form feedback value to a user. The messaging engine 624 can also notify a user if they have made an error while performing an exercise. For example, such a notification can be based on a form feedback value, a severity score, a dynamic severity threshold value, and/or the like.

In one example, the messaging engine 624 can generate and provide reports indicating that a repetition has been counted (e.g., as shown in FIG. 22). In some embodiments, the repetition counting engine 620, or a component thereof (e.g., exercise model 656) generates the report, and a messaging engine 624 provides the report indicating the counted repetition to the user.

The recommendation engine 626 is intended to represent an engine that can recommend a type of exercise equipment a user should use, an amount of weight a user should use, what exercise the user should perform (e.g., based on their goals and weekly workout routine). For example, the recommendation engine 626 can function to provide sophisticated guidance in real time by using a user's anatomy and fitness history to influence the recommendations that the recommendation engine 626 makes for technique and heaviness of weights to use.

In a specific implementation, the recommendation engine 626 can collect, obtain, or otherwise access, data pertaining to a user's workout history. For example, the management engine 604 can store exercises completed by the user, tracked motions of the user during movements, repetitions, weights, form, severity scores associated with exercises performed by the user, and/or any other information generated or described herein. The recommendation engine 626 may use all or some of that information (e.g., information within the last 30 days) to provide tailored recommendation for each particular user. For example, that information may be used as input for a machine learning model 650 to provide the recommendations.

The communication engine 628 is intended to represent an engine that sends requests, transmits and receives communications, and/or otherwise provides communication with one or more of the systems, engines, devices and/or datastores described herein. In a specific implementation, the communication engine 628 can function to encrypt and decrypt communications. The communication engine 628 can function to send requests to and receive data from one or more systems through a network or a portion of a network (e.g., CRM 502). In a specific implementation, the communication engine 628 can send requests and receive data through a connection, all or a portion of which can be a wireless connection. The communication engine 628 can request and receive messages, and/or other communications from associated systems and/or engines. Communications can be stored in the datastore 640.

Figure 7:
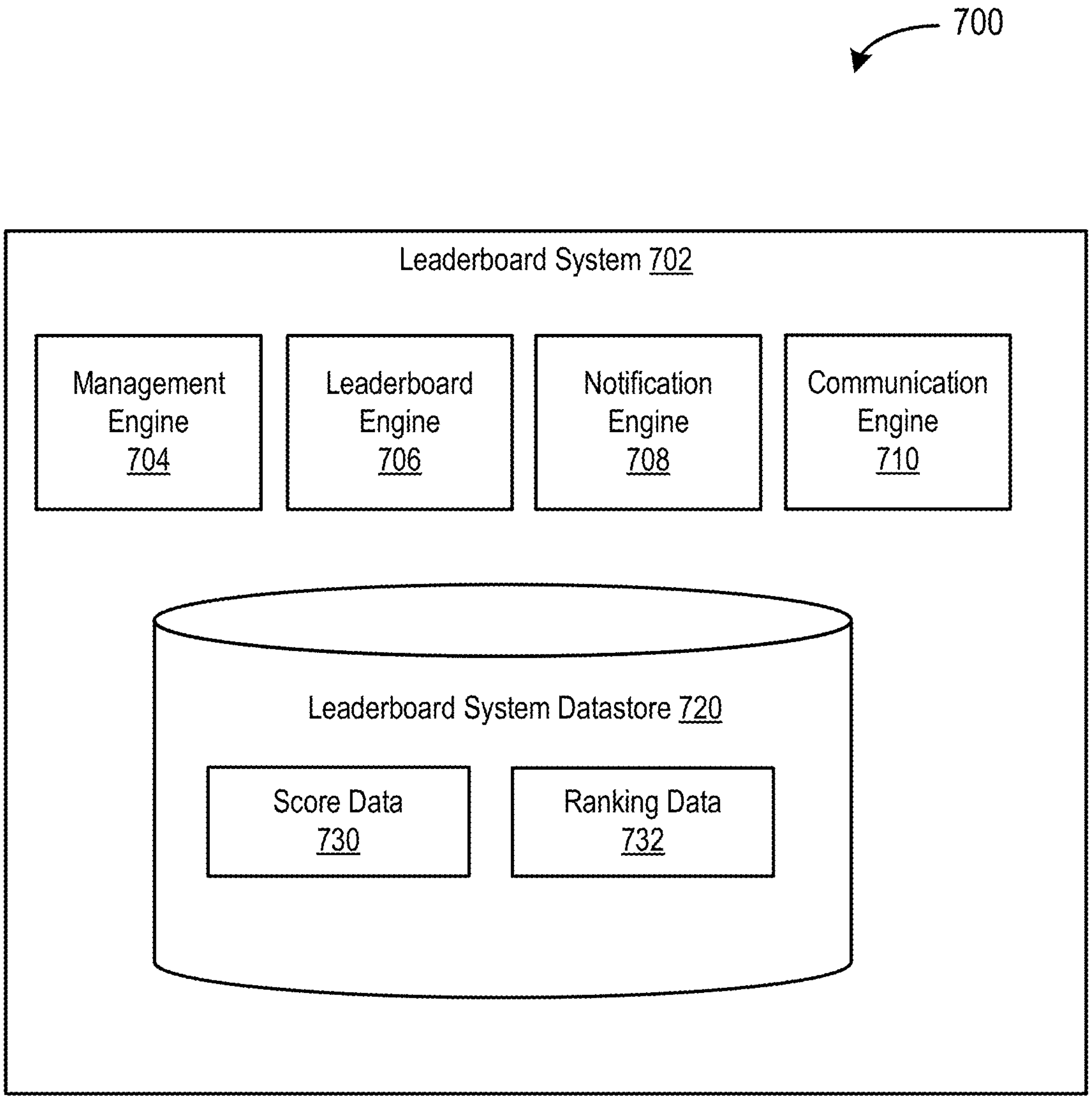
FIG. 7 is a diagram of an example of a leaderboard system.

FIG. 7 is a diagram 700 of an example of a leaderboard system 702. In the example of FIG. 7, the leaderboard 702 includes a management engine 704, a leaderboard engine 706, a notification engine 708, a presentation engine 710, a communication engine 712, and a leaderboard system datastore 720.

The management engine 704 is intended to represent an engine that manages (e.g., create, read, update, delete, or otherwise access) score data 730, ranking data 732, and/or other data associated with the leaderboard system 702. The management engine 704 can perform any of these operations manually (e.g., by a user interacting with a GUI) and/or automatically (e.g., triggered by one or more of the engines 706-712). Like other engines described herein, some or all the functionality of the management engine 204 can be included in and/or cooperate with one or more other engines (e.g., engines 706-712) and datastores (e.g., datastore 720).

The leaderboard engine 706 is intended to represent an engine that generates and provides leaderboards, or the information needed to generate and provide leaderboards. For example, the leaderboard engine 706 can function to rank users based on exercises scores and provide a ranked list of users for display as part of a leaderboard presented by the computer vision and machine learning-based form feedback and scoring system 504. For example, the list may be ranked in ascending or descending order based on exercise user scores. Leaderboards may be generated for particular dates (e.g., a current day, a past day), date ranges (e.g., last 30 days), and/or the like.

The notification engine 708 is intended to represent an engine that generates and provides notifications and other messages. For example, the notification engine 708 can generate and provide notifications that include ranked lists of users which may be used to generate and display various leaderboards.

The presentation engine 710 is intended to represent an engine that presents audio, visual, and/or haptic information. In some embodiments, the presentation engine 710 generates graphical user interface components (e.g., server-side graphical user interface components), such as leaderboards, that can be rendered as complete graphical user interfaces on other systems (e.g., computer vision and machine learning-based form feedback and scoring systems).

The communication engine 712 is intended to represent an engine that sends requests, transmits and receives communications, and/or otherwise provides communication with one or more of the systems, engines, devices and/or datastores described herein. In a specific implementation, the communication engine 712 can function to encrypt and decrypt communications. The communication engine 712 can function to send requests to and receive data from one or more systems through a network or a portion of a network (e.g., CRM 502). In a specific implementation, the communication engine 712 can send requests and receive data through a connection, all or a portion of which can be a wireless connection. The communication engine 712 can request and receive messages, and/or other communications from associated systems and/or engines. Communications can be stored in the datastore 720.

Figure 8:
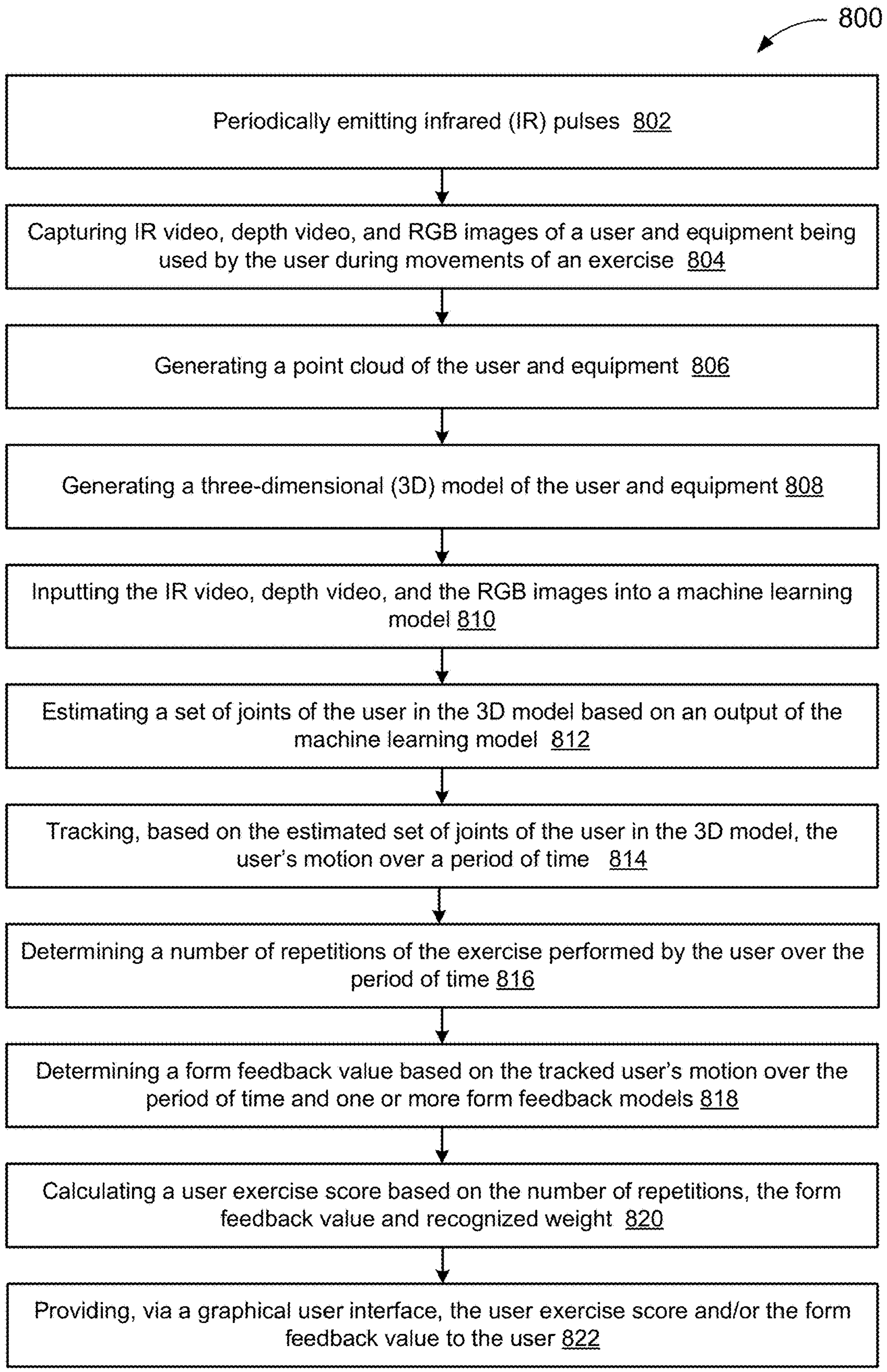
FIG. 8 is a flowchart of an example of method of operation of a computer vision and machine learning-based form feedback and scoring system.

FIG. 8 is a flowchart 800 of an example of method of operation of a computer vision and machine learning-based form feedback and scoring system. In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 802, a computer vision and machine learning-based form feedback and scoring system (e.g., computer vision and machine learning-based form feedback and scoring system 602) periodically emits, by at least a portion of a plurality of 3D motion sensors, infrared (IR) pulses (e.g., 30 times per second). The plurality of 3D motion sensors can include one or more IR sensors and one or more red, green, and blue (RGB) sensors. The plurality of 3D motion sensors can be capable of capturing IR video, depth video, and RGB images. In some embodiments, the 3D motion sensors are implemented as part of a 3D camera (e.g., a 3D time of flight camera). In other words, in some embodiments, a 3D camera may comprise the plurality of 3D motion sensors. In some embodiments, a multidimensional sensor engine (e.g., multidimensional sensor engine 606) includes and/or controls some or all of the aforementioned sensors and periodically emits the IR pulses.

In module 804, the computer vision and machine learning-based form feedback and scoring system captures, using the plurality of 3D motion sensors and at least partially based on the periodically emitted IR pulses, IR video of a user and equipment being used by the user through a plurality of movements of an exercise, depth video of the user and the equipment being used by the user through the plurality of movements of the exercise, and RGB images of the user and equipment being used by the user through the plurality of movements of the exercise. As used in this paper, it will be appreciated that reference to a "user" may refer to the user and any equipment being used by the user (e.g., a barbell) and/or it may refer to the user without the equipment. In some embodiments, the multidimensional sensor engine captures the video and images.

In module 806, the computer vision and machine learning-based form feedback and scoring system generates, at least partially based on the captured IR pulses, a point cloud of the user and the exercise equipment being used by the user through the plurality of movements of the exercise. For example, a point cloud may include at least 80,000 points. In some embodiments, a skeleton engine (e.g., skeleton engine 608) generates the point cloud.

In module 808, the computer vision and machine learning-based form feedback and scoring system generates a 3D model of the user. The 3D model can include the point cloud of the user and the exercise equipment. The 3D model can be generated in response to the generation of the point cloud of the user and the exercise equipment. In some embodiments, the skeleton engine generates the 3D model of the user.

In module 810, the computer vision and machine learning-based form feedback and scoring system inputs the IR video of the user, the depth video of the user, and the RGB images of the user into a machine learning model (e.g., machine learning model 650). For example, the machine learning model can be a convolutional neural net machine learning model. In some embodiments, a skeleton isolation engine (e.g., skeleton isolation engine 610) inputs the data into the machine learning.

In module 812, the computer vision and machine learning-based form feedback and scoring system estimates (or, predicts) a set of joints of the user in the 3D model, the estimating using the point cloud and the machine learning model with the inputted IR video, the inputted depth video, and the inputted RGB images. For example, the set of joints may comprise 25 points determined based on an output of the machine learning model. The set of joints may correspond to a subset of the points of the point cloud. For example, each joint may correspond to a single point of the point cloud. In another example, each joint may correspond to multiple points (e.g., adjacent points) of the point cloud. In some embodiments, the skeleton isolation engine estimates (or, predicts) the set of joints of the user in the 3D.

In some embodiments, the computer vision and machine learning-based form feedback and scoring system validates the estimated set of joints of the user in the 3D model prior to proceeding to the next step (e.g., tracking the user's motion over the period of time in step 814). The validating can be performed using one or more other machine learning models and/or one or more statistical models (e.g., statistical models 652). Thus, for example, if the validating is successful, the method can proceed to step 814. Otherwise, the method may terminate, or return to a prior step of the method.

In module 814, the computer vision and machine learning-based form feedback and scoring system tracks the user's motion over a period of time (e.g., 5 minutes, an amount of time need to perform one or more repetitions of an exercise, and/or the like). The computer vision and machine learning-based form feedback and scoring system can perform the tracking based on the estimated set of joints of the user in the 3D model. In some embodiments, an exercise tracking engine (e.g., exercise tracking engine 614) tracks the user's motion.

In module 816, the computer vision and machine learning-based form feedback and scoring system determines a number of repetitions of the exercise performed by the user over the period of time. The computer vision and machine learning-based form feedback and scoring system can perform the determination based on the tracked user's motion over the period of time and one or more exercise models. In some embodiments, a repetition counting engine (e.g., repetition counting engine 620) determines the number of repetitions.

In module 818, the computer vision and machine learning-based form feedback and scoring system determines a form feedback value. The form feedback value can be determined based on the tracked user's motion over the period of time and one or more form feedback models (e.g., form feedback models 654). The form feedback value can be determined from a set of form feedback and/or otherwise. For example, the form feedback value can be determined from a set of form feedback values including a satisfactory value (e.g., indicating the user's form during a repetition and/or exercise is satisfactory based on a threshold value, such as a severity threshold or other threshold), an unsatisfactory value (e.g., indicating the user's form during a repetition and/or exercise is unsatisfactory based on the threshold value, such as the severity threshold or other threshold), and/or the like. Feedback values can also correspond to one or more errors made by the user (e.g., not going far enough down during a squat based on a depth threshold), and/or required changes to achieve a satisfactory repetition (e.g., the amount of additional depth required based on the depth threshold). In some embodiments, a form feedback engine (e.g., form feedback engine 616) determines the form feedback value.

In module 820, the computer vision and machine learning-based form feedback and scoring system calculates a user exercise score. The user exercise score can be calculated based on the number of repetitions and the form feedback value and/or weight of associated exercise equipment. In some embodiments, a scoring engine (e.g., scoring engine 621) calculates the user exercise score.

In module 822, the computer vision and machine learning-based form feedback and scoring system provides, via a graphical user interface, the user exercise score and/or the form feedback value to the user. This can, for example, instruct the user to adjust their form during subsequent repetitions of the exercise. In some embodiments, the graphical user interface comprises a graphical user interface presented on a screen display of a free-standing A-frame exercise equipment cabinet (e.g., free-standing A-frame exercise equipment cabinet 102). In some embodiments, a messaging engine (e.g., messaging engine 624) and/or a communication engine (e.g., communication engine 626) provides the information to the user via the graphical user interface generated by the presentation engine 622.

Figure 9:
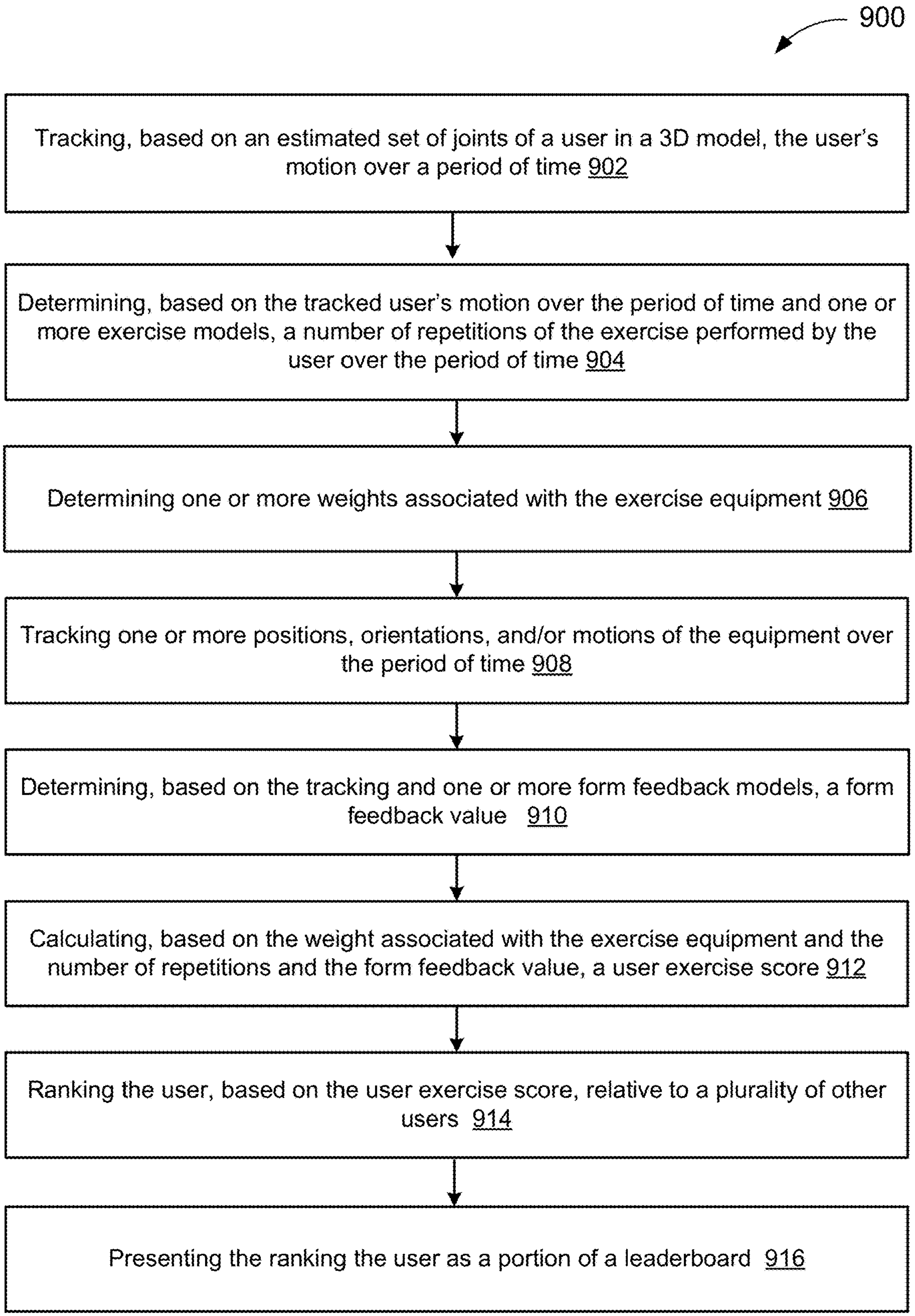
FIG. 9 is a flowchart of an example of a method of providing form feedback and exercise scoring based user movements and the position, motion, orientation, and weight of associated exercise equipment.

FIG. 9 is a flowchart 900 of an example of a method of providing form feedback and exercise scoring based user movements and the position, motion, orientation, and weight of associated exercise equipment. In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 902, a computer vision and machine learning-based form feedback and scoring system (e.g., computer vision and machine learning-based form feedback and scoring system 602) tracks, based on an estimated set of joints of a user in a 3D model, the user's motion over a period of time. In some embodiments, am exercise tracking engine (e.g., exercise tracking engine 614) tracks the user's motion.

In module 904, the computer vision and machine learning-based form feedback and scoring system determines, based on the tracked user's motion over the period of time and one or more exercise models, a number of repetitions of the exercise performed by the user over the period of time. In some embodiments, a repetition counting engine (e.g., repetition counting engine 620) counts the number of repetitions.

In module 906, the computer vision and machine learning-based form feedback and scoring system identifies and/or determines one or more weights associated with the exercise equipment. For example, the computer vision and machine learning-based form feedback and scoring system can use one or more RGB sensors to identify the one or more weights. In some embodiments, the exercise equipment is of a particular color, and the one or more weights associated with the exercise equipment are identified based on the particular color. In some embodiments, a weight recognition engine identifies and/or determines one or more weights associated with the exercise equipment.

In module 908, the computer vision and machine learning-based form feedback and scoring system tracks one or more positions, orientations, and/or motions of the equipment over the period of time. In some embodiments, the exercise tracking engine performs the tracking.

In module 910, the computer vision and machine learning-based form feedback and scoring system determines, based on the tracked user's motion over the period of time and the tracked position(s) and orientation(s) and/or motion(s) of the equipment over the period of time and one or more form feedback models, a form feedback value. In some embodiments, a form feedback engine (e.g., form feedback engine determines the form feedback value.

In module 912, the computer vision and machine learning-based form feedback and scoring system calculates, based on the weight associated with the exercise equipment and the number of repetitions and the form feedback value, a user exercise score. In some embodiments, a scoring engine (e.g., scoring engine 621) calculates the user exercise score.

In module 914, the computer vision and machine learning-based form feedback and scoring system and/or a leaderboard system (e.g., leaderboard system 506) ranks the user, based on the user exercise score, relative to a plurality of other users, wherein each of the other users each have their own respective user exercise score (e.g., calculated in a similar manner as the user exercise score of the user). For example, the computer vision and machine learning-based form feedback and scoring system for provide the user score to the leaderboard system, and other computer vision and machine learning-based form feedback and scoring systems associated with other users may provide their respective user scores to the leaderboard system, and the leaderboard system can determine a ranking of all the users, and provide a user list based on the ranking (e.g., a list ranked in ascending or descending order based on exercise user scores) back to the computer vision and machine learning-based form feedback and scoring systems for presentation the users (step 916). In some embodiments, the communication engine provides the user exercise scores to a leaderboard engine (leaderboard engine 706), and the leaderboard engine can determine the ranking, and a communication engine of the leaderboard system (e.g., communication engine 710) can provides the ranked user list to the respective messaging engines and/or communication engines of the respective computer vision and machine learning-based form feedback and scoring systems, and respective presentation engines (e.g., presentation engine 622) can present ranked list (e.g., as a leaderboard interface, or portion thereof).

FIG. 10 is a flowchart 100 of an example of a method of determining a relative degree of error in an exercise performed by a user, and adjusting a repletion count accordingly. In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 1002, a computer vision and machine learning-based form feedback and scoring system (e.g., computer vision and machine learning-based form feedback and scoring system 602) tracks, based on the estimated set of joints of the user in the 3D model, the user's motion over a period of time. In some embodiments, an exercise tracking engine (e.g., exercise tracking engine 614) tracks the user's motions.

In module 1004, the computer vision and machine learning-based form feedback and scoring system determines, based on the tracked user's motion over the period of time and one or more exercise models, a number of repetitions of the exercise performed by the user over the period of time. In some embodiments, a repetition counting engine determines the number of repetitions.

In module 1006, the computer vision and machine learning-based form feedback and scoring system determines, based on the tracked user's motion over the period of time and one or more form feedback models, a form feedback value. In some embodiments, a form feedback engine determines the feedback value.

In module 1008, the computer vision and machine learning-based form feedback and scoring system determines, based on the tracked user's motion over the period of time and one or more other machine learning models, a severity score (e.g., a value between 0.0 and 1.0) associated with an exercise performed by the user over the period of time. The severity score can indicate a degree of error in some or all of the movements of the exercise performed by the user. The severity score may be based on a form feedback value or other output of a form feedback model. In some embodiments, an analyzer engine (e.g., analyzer engine 618) determines the severity score.

In module 1010, the computer vision and machine learning-based form feedback and scoring system determines, based on the severity score and a dynamic severity threshold value, the user made an error in some or all of the movements of the exercise performed by the user. For example, the system may determine the user made an error if the severity score exceeds a dynamic threshold value based on a comparison between the severity score and the dynamic severity threshold value. In some embodiments, the analyzer engine determines whether a user has made an error.

In module 1012, the computer vision and machine learning-based form feedback and scoring system reduces the number of determined repetitions performed by the user over the period time. For example, the number of repetitions can be reduced in response to, and/or based on, determining the form feedback value and/or the severity score. The number of repetitions can be reduced based on the form feedback value and/or the severity score. In some embodiments, the repetition counting engine reduces the number of repetitions.

In module 1014, the computer vision and machine learning-based form feedback and scoring system notifies the user that the user has made an error. The notification can be based on any of the form feedback value, the severity score and a dynamic severity threshold value. In some embodiments, a messaging engine (e.g., messaging engine 624) can notify the user.

FIG. 11 is a screenshot 1100 of an example of a leaderboard. For example, the leaderboard can be generated and/or presented by a leaderboard system 506 and/or computer vision and machine learning-based form feedback and scoring system 504. As shown in FIG. 11, the competitive leaderboard is based on real fitness data that is widely accepted in the weight training community-weights, technique and form and reps completed, not just an abstract metric like heartrate. The experience can be made motivating with its real-time leaderboard. For each workout, the screen shows a running scoreboard that ranks each person who has ever done the class on both a total rep and total weight basis. As the user does a specific routine, like push-ups, weighted lunges, or barbell curls, the machine counts each individual rep and updates the leaderboard throughout the class.

Though the repetition counter is important so that the user is able to hit the user's goal each round, it is hard not to keep an eye on the user's class standing. There is a delicate balance between making sure the user's form and technique are correct and just quickly doing a certain motion to increase rank on the scoreboard.

FIG. 23 is a screenshot of images displayed by an example computer vision and machine learning-based form feedback and scoring system. As shown in FIG. 23, in addition to a trainer and leaderboard, the display shows how much time remains in each round, the current routine, the user's target reps, and the user's heart rate (e.g., which can be pulled from an associated heart rate monitor).

Figure 27:
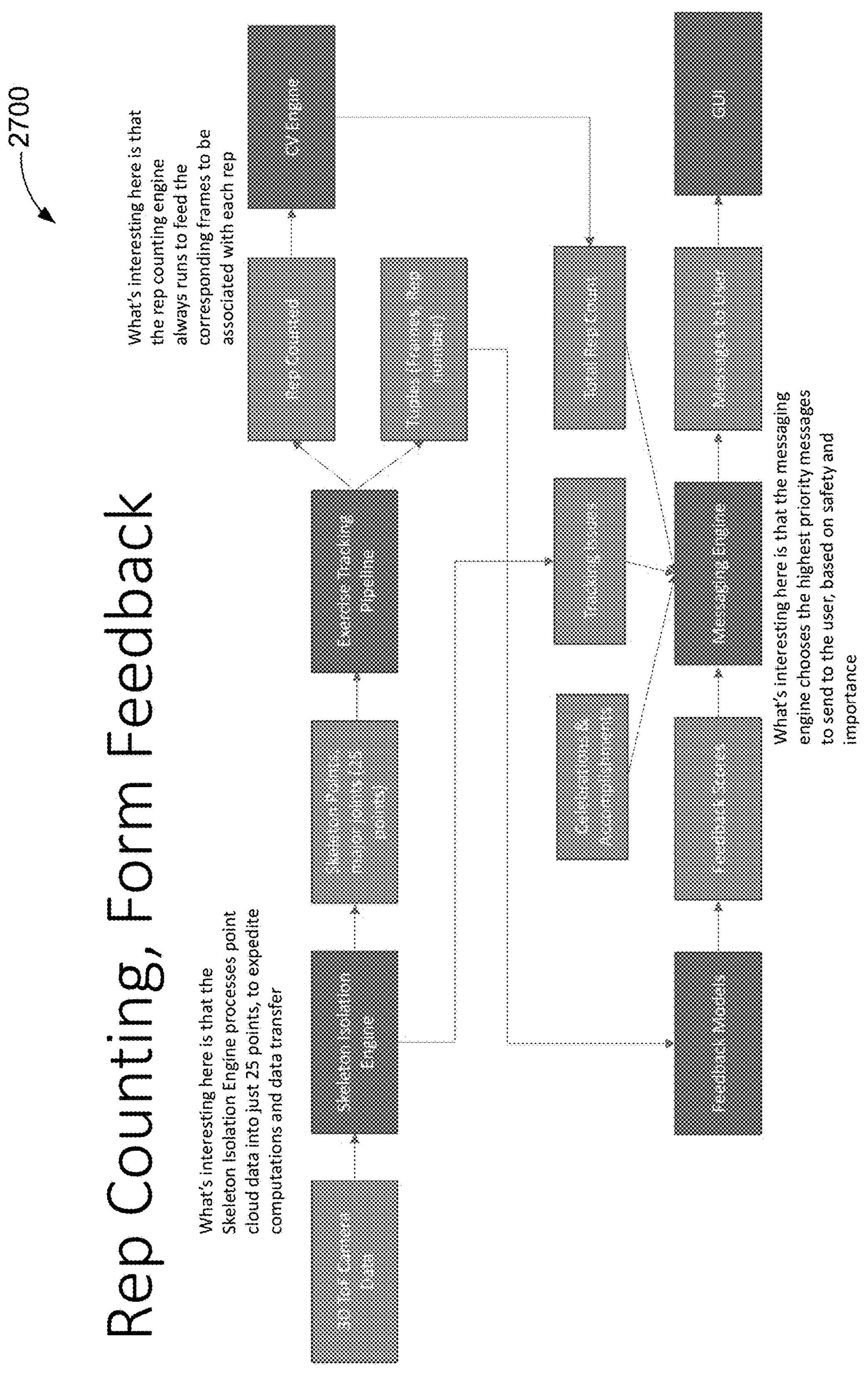
FIG. 27 is a flowchart of an example of a repetition counting and form feedback method.

FIG. 27 is a flowchart 2700 of an example of a repetition counting and form feedback method (e.g., that may be performed by the computer vision and machine learning-based form feedback and scoring system and/or a repetition counting engine). In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

Figure 28:
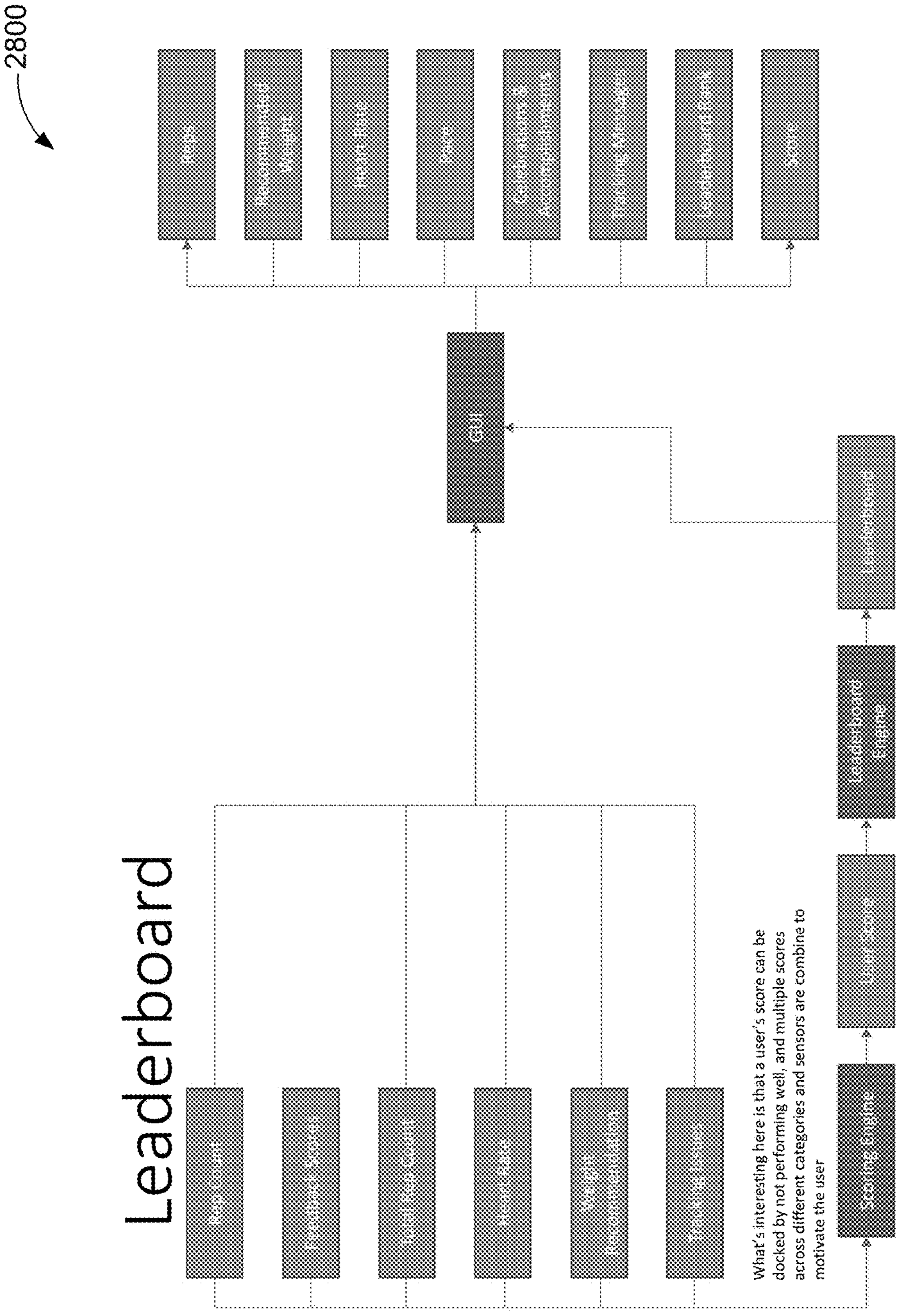
FIG. 28 is a diagram of an example leaderboard structure and an example method of generating a leaderboard.

FIG. 28 is a diagram 2800 of an example leaderboard structure and an example method of generating a leaderboard. For example, the leaderboard may be presented by a computer vision and machine learning-based form feedback and scoring system. The leaderboard may be generated by a leaderboard system and/or a computer vision and machine learning-based form feedback and scoring system. In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

Figure 29:
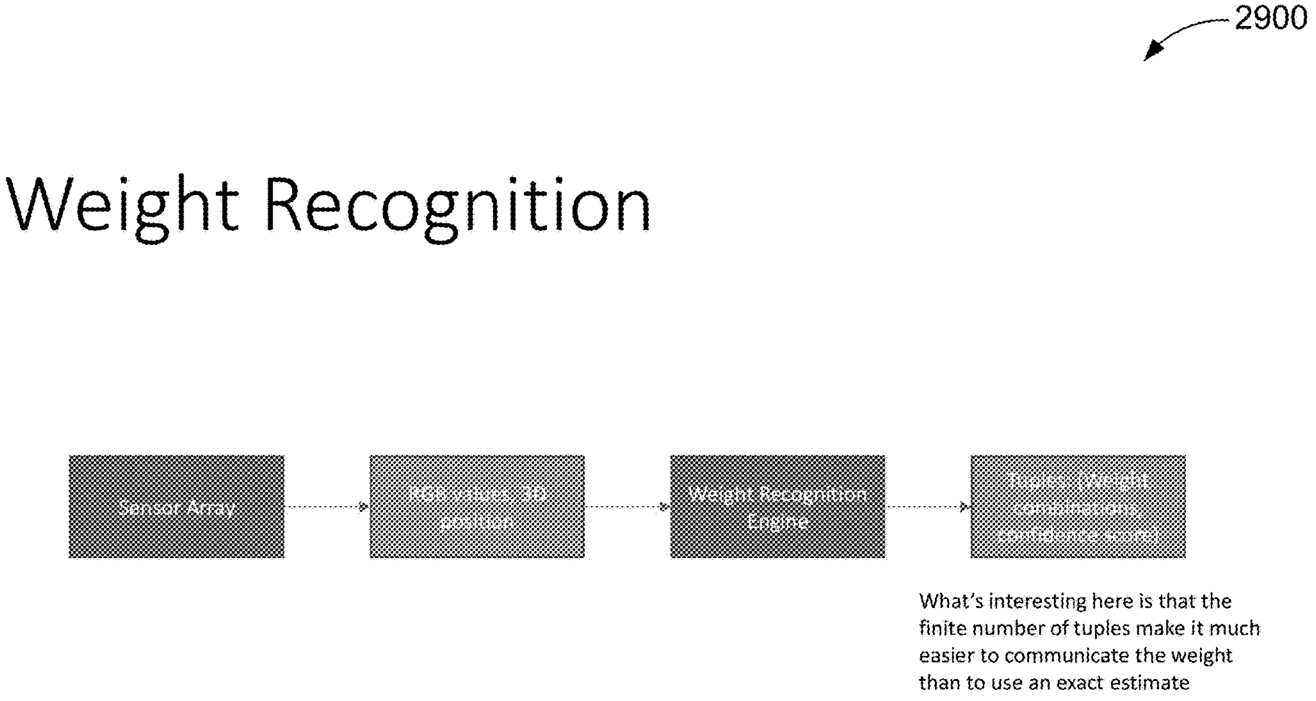
FIG. 29 is a flowchart of an example method of weight recognition.

FIG. 29 is a flowchart 2900 of an example method of weight recognition. In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

Figure 30:
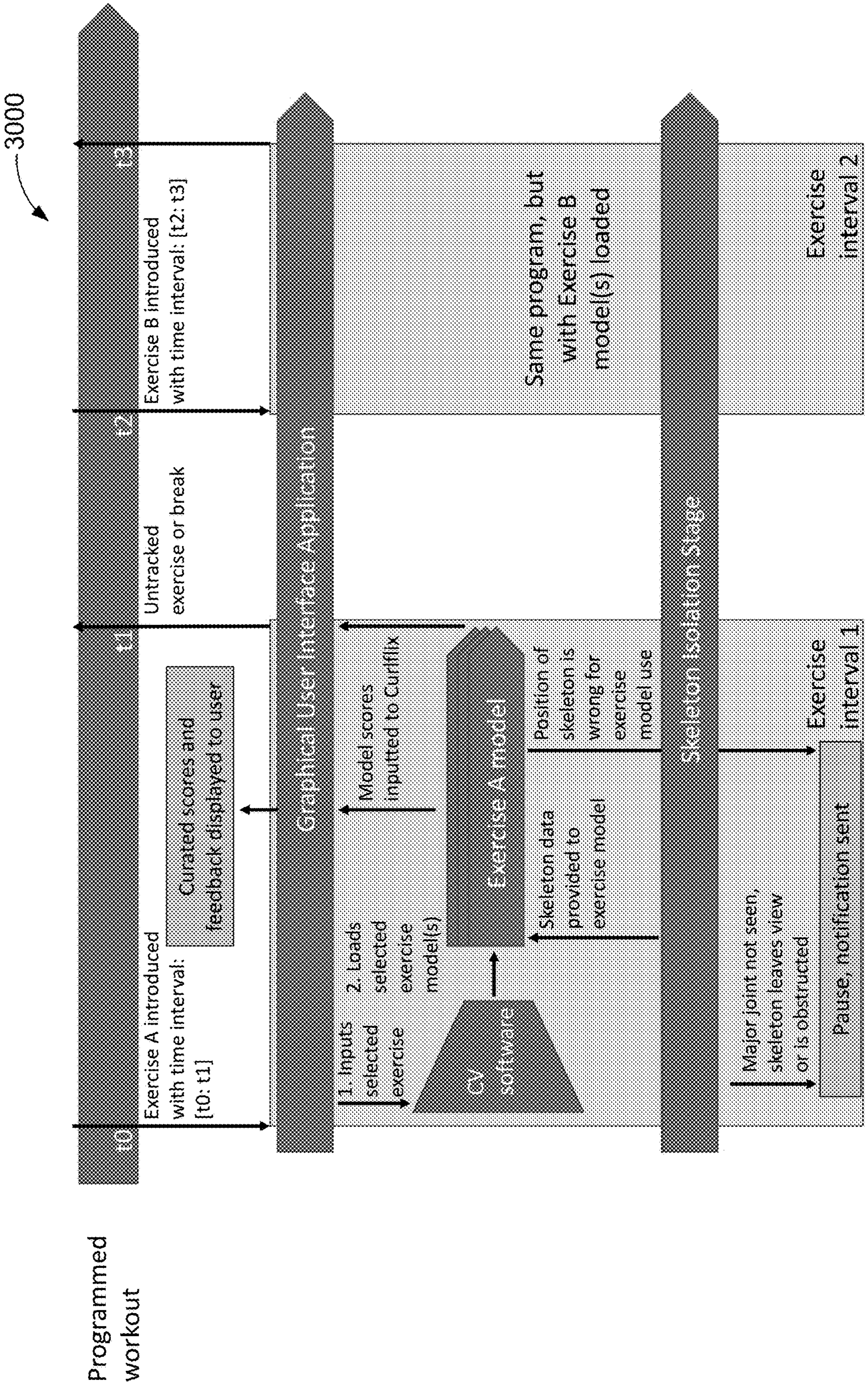
FIGS. 30-32 depict flowcharts of example operations of a computer vision and machine learning-based form feedback and scoring system.
Figure 31:
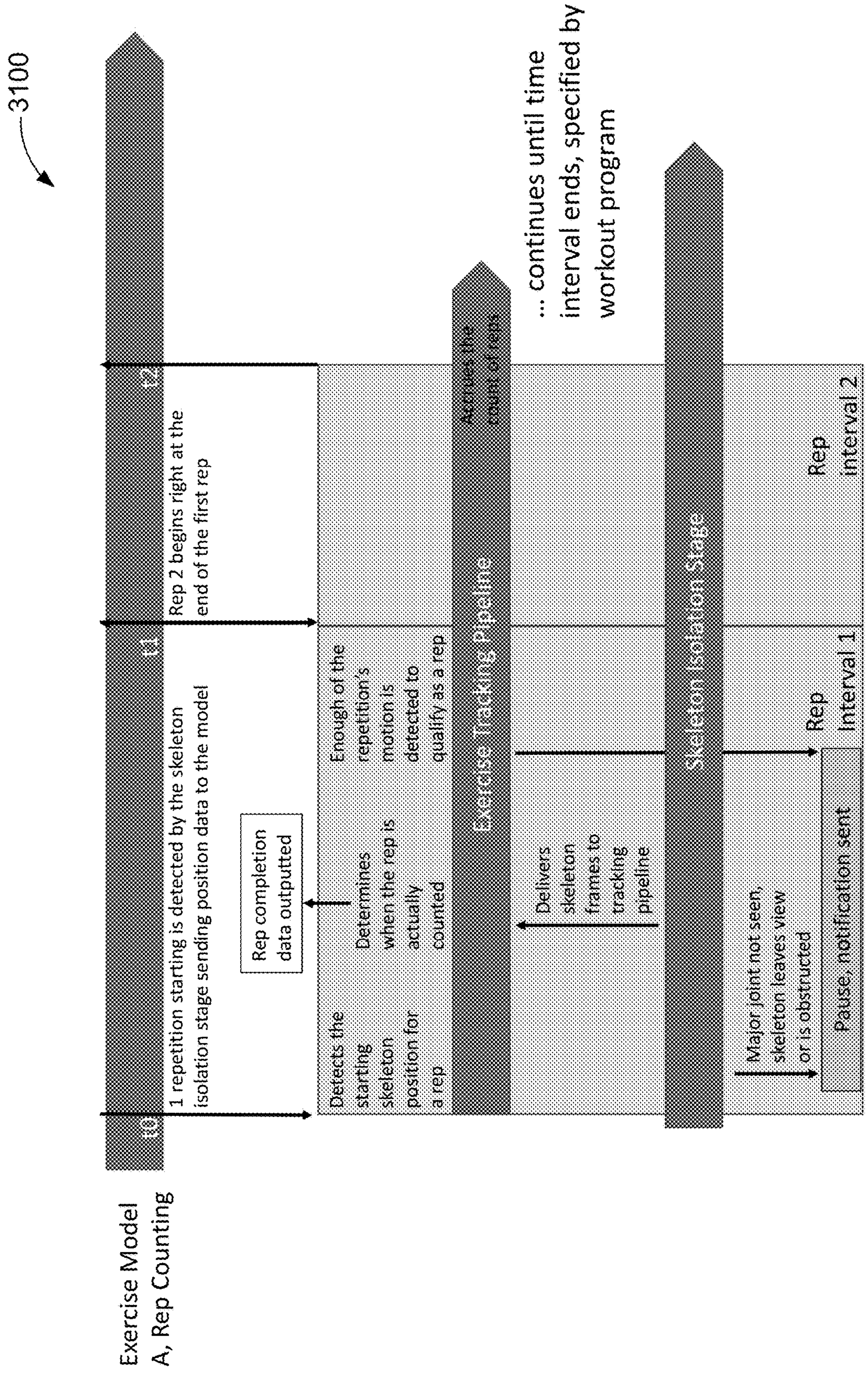
Figure 32:
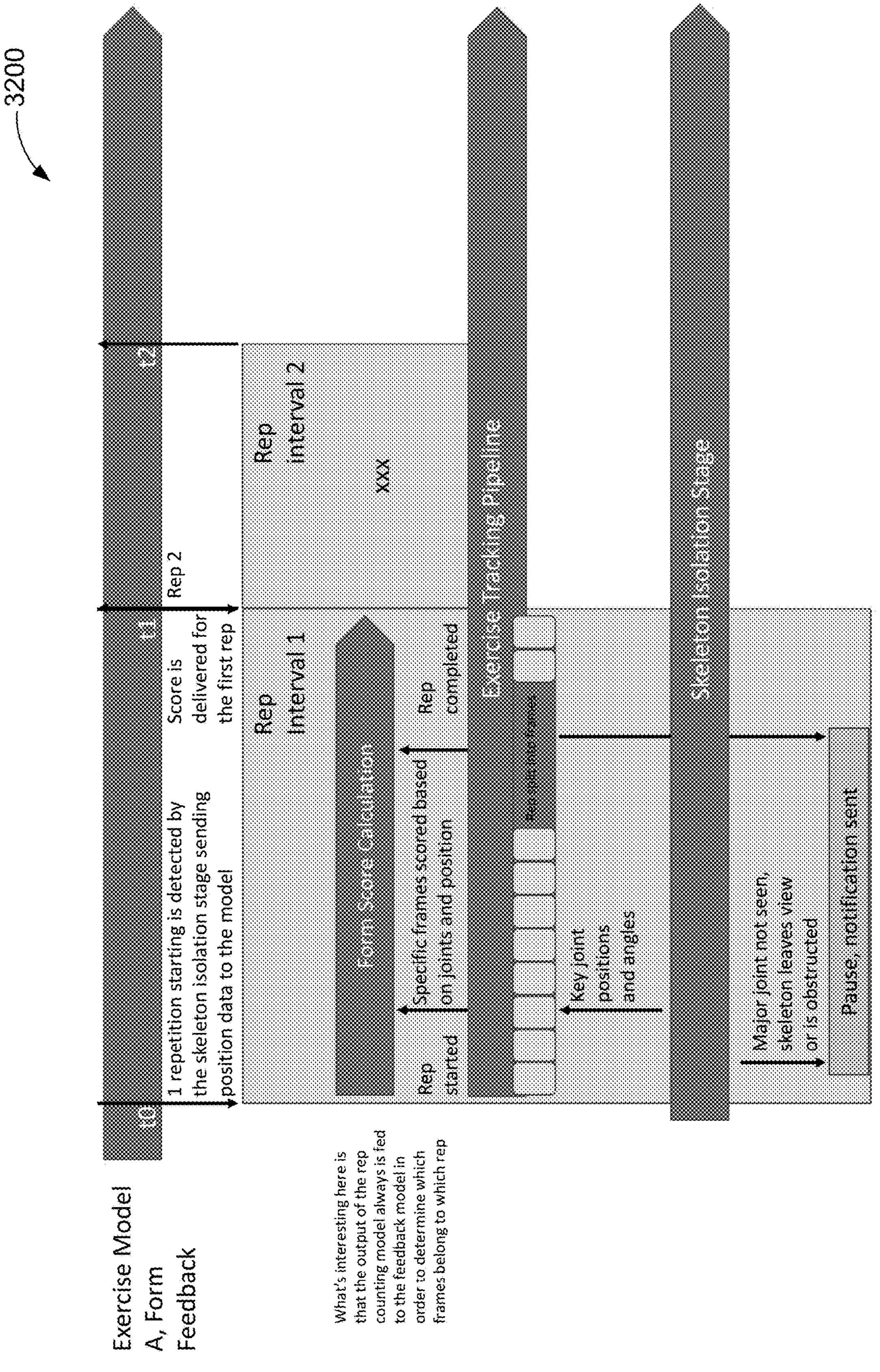

FIGS. 30-32 depict flowcharts 3000, 3100 and 3200 of example operations of a computer vision and machine learning-based form feedback and scoring system. In these and other flowcharts and/or sequence diagrams, the flowcharts illustrate by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

Figure 33:
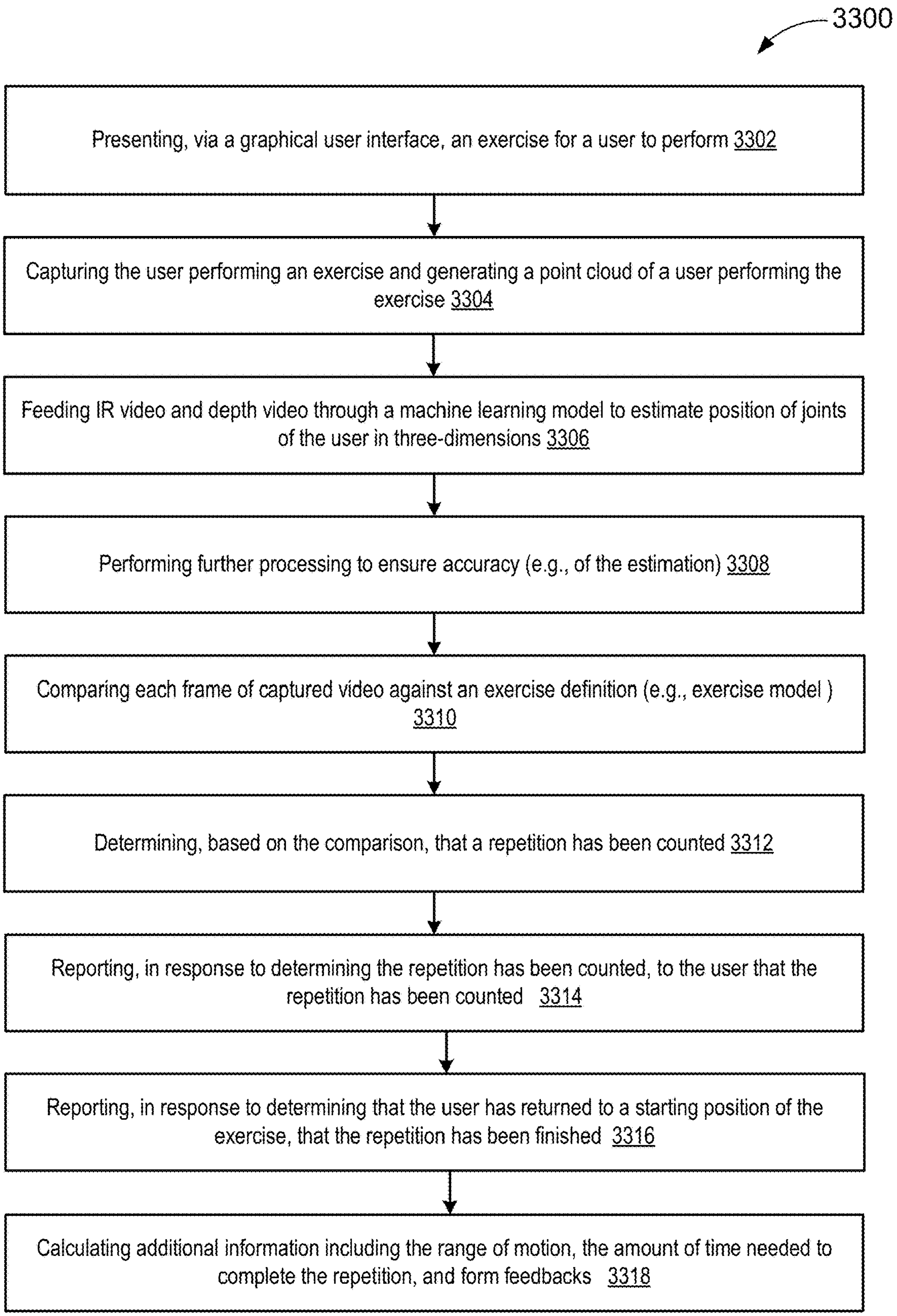
FIG. 33 is a flowchart of an example method of counting exercise repetitions.

FIG. 33 is a flowchart 3300 of an example method of counting exercise repetitions. In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 3302, a computer vision and machine learning-based form feedback and scoring system (e.g., computer vision and machine learning-based form feedback and scoring system 602) presents, via a graphical user interface, an exercise for a user to perform. The presenting may occur automatically (e.g., as determined by the computer vision and machine learning-based form feedback and scoring system) and/or in response to user input (e.g., a user specifically requesting a particular exercise or selecting the exercise from a list of exercises). In some embodiments, a presentation engine (e.g., presentation engine 622) generates the graphical user interfaces and presents the exercise for a user to perform.

In module 3304, the computer vision and machine learning-based form feedback and scoring system captures, in three-dimensions, the user performing the exercise and generates (or, captures) a point cloud of the user. In some embodiments, a multidimensional sensor engine (e.g., multidimensional sensor engine 606) captures the user and a skeleton engine (e.g., skeleton engine 608) generates (or, captures) the point cloud of the user.

In module 3306, the computer vision and machine learning-based form feedback and scoring system feeds, based on the capturing performed in step 3304, IR video and depth video through a machine learning model (e.g., a convolutional neural net) to estimate the position of 25 joints of the user in 3D. In some embodiments, a skeleton isolation engine (e.g., skeleton isolation engine 610) feeds the information through the machine learning model.

In module 3308, the computer vision and machine learning-based form feedback and scoring system further processes the IR video, depth video, and/or the estimated positions of the joints though other machine learning models and/or statistical models (e.g., statistical models 652) for accuracy (e.g., of the estimated joints). In some embodiments, the skeleton isolation engine may perform the further processing. In some embodiments, embodiments, steps 3306 and/or 3308 may require a GPU with at least 2 GB of RAM to be available onboard the computer vision and machine learning-based form feedback and scoring system, which can allow the system to avoid uploading data to the cloud. This can have, for example, several major advantages, such as (1) Instantaneity—the system has a latency of <100 ms, (2) security—no image data is required to be uploaded during use, and (3) much lower internet bandwidth requirement—in a normal representation uploading the raw data would require bandwidth upwards of 30 MB/s, which is currently very rare and would limit the users to people in major cities with excellent internet infrastructure.

In some embodiments, positions are recorded for each frame from a camera (e.g., 3D camera of the multidimensional sensor engine) at 30 FPS.

In module 3310, the computer vision and machine learning-based form feedback and scoring system compares each frame of captured video against an exercise definition (e.g., exercise model 656). The exercise definition can a specific file that is created for each exercise (e.g., squats, lunges, deadlifts, and/or the like) that can include configuration for a convolutional neural network (CNN), statistical requirements, random forests and/or other conditions for a repetition to be counted. In some embodiments, a repetition counting engine (e.g., repetition counting engine 620) performs the comparison.

In module 3312, the computer vision and machine learning-based form feedback and scoring system determines, based on the comparison, that a repetition has been counted. In some embodiments, the repetition counting engine determines whether a repetition is counted.

In module 3314, the computer vision and machine learning-based form feedback and scoring system reports, in response to determining the repetition has been counted, to the user that the repetition has been counted (e.g., as shown in FIG. 22). In some embodiments, the repetition counting engine, or a component thereof (e.g., exercise model 656) generates the report, and a messaging engine (e.g., messaging engine 624) provides the report indicating the counted repetition to the user.

In module 3316, the computer vision and machine learning-based form feedback and scoring system reports, in response to detecting/determining that the user has returned to the starting position of the motion of the exercise, that the repetition has been finished. In some embodiments, the repetition counting engine cooperating with the multidimensional sensor engine detects/determines that the user has returned the starting position, and the repetition counting engine reports that the repetition has been finished.

In module 3318, the computer vision and machine learning-based form feedback and scoring system calculates additional information including the range of motion, the amount of time needed to complete the repetition, and form feedbacks (e.g., as shown in FIG. 22, FIG. 23, FIG. 25, and FIG. 26).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made, and other embodiments may be used without departing from the broader scope of the present invention(s). Therefore, these and other variations upon the example embodiments are intended to be covered by the present invention(s).

What is claimed is:

1. A system comprising:

one or more hardware processors;

memory storing instructions that, when executed by the one or more hardware processors, cause the system to perform:

capturing IR video of a user and exercise equipment being used by the user through a plurality of movements of an exercise;

generating, at least partially based on the captured IR video, a 3D model of the user including a representation of the user and the exercise equipment being used by the user through the plurality of movements of the exercise;

estimating a set of joints of the user in the 3D model;

tracking, based on the estimated set of joints of the user in the 3D model, the user's motion over a period of time;

determining, based on the user's tracked motion over the period of time and one or more exercise models, a number of repetitions of the exercise performed by the user over the period of time;

determining, based on the user's tracked motion over the period of time and one or more form feedback models, a form feedback value from a set of form feedback values;

calculating, based on the number of repetitions and the form feedback value, a user exercise score;

providing, via a graphical user interface, the user exercise score and the form feedback value to the user, thereby instructing the user to adjust their form during subsequent repetitions of the exercise.

2. The system of claim 1, wherein the instructions, when executed by the one or more hardware processors, cause the system to perform:

identifying one or more weights associated with the exercise equipment;

tracking position, orientation and motion of the exercise equipment over the period of time;

wherein the form feedback value is determined based the user's tracked motion over the period of time, the tracked position, orientation and motion of the exercise equipment over the period of time, and the one or more form feedback models; and wherein the user exercise score is calculated based on the one or more weights associated with the exercise equipment, the number of repetitions and the form feedback value.

3. The system of claim 2, wherein the exercise equipment is of a particular color, and the one or more weights associated with the exercise equipment are identified based on the particular color.

4. The system of claim 2, wherein the instructions, when executed by the one or more hardware processors, cause the system to perform:

ranking the user, based on the user exercise score, relative to a plurality of other users, wherein each of the other users have a corresponding user exercise score;

providing, via the graphical user interface, a leaderboard including a user list, the user list based on the ranking of the user relative to the other users.

5. The system of claim 1, wherein the estimating the set of joints of the user in the 3D model is performed using a machine learning model comprising a convolutional neural net machine learning model.

6. The system of claim 5, wherein the instructions, when executed by the one or more hardware processors, cause the system to perform:

validating, using another machine learning model and a statistical model, the estimated set of joints of the user in the 3D model prior to tracking the user's motion over the period of time.

7. The system of claim 1, wherein the estimating the set of joints of the user in the 3D model is based on a point cloud comprising at least 80,000 points.

8. The system of claim 1, wherein the graphical user interface comprises a graphical user interface presented on a screen display of a free-standing A-frame exercise equipment cabinet.

9. The system of claim 1, wherein the instructions, when executed by the one or more hardware processors, cause the system to perform:

determining, based on the user's tracked motion over the period of time and one or more machine learning models, a severity score associated with the exercise performed by the user over the period of time, the severity score indicating a degree of error in some or all of the movements of the exercise performed by the user;

notifying, based on the severity score and a dynamic severity threshold value, the user that the user has made an error.

10. They system of claim 1, wherein the instructions, when executed by the one or more processors, cause the system to perform:

reducing, in response to determining the form feedback value and based on the form feedback value, the number of determined repetitions performed by the user over the period of time.

11. A method implemented by a computing system including one or more processors and storage media storing machine-readable instructions, wherein the method is performed using the one or more processors, the method comprising:

capturing IR video of a user and exercise equipment being used by the user through a plurality of movements of an exercise;

generating, at least partially based on the captured IR video, a 3D model of the user including a representation of the user and the exercise equipment being used by the user through the plurality of movements of the exercise;

estimating a set of joints of the user in the 3D model;

tracking, based on the estimated set of joints of the user in the 3D model, the user's motion over a period of time;

determining, based on the user's tracked motion over the period of time and one or more exercise models, a number of repetitions of the exercise performed by the user over the period of time;

determining, based on the user's tracked motion over the period of time and one or more form feedback models, a form feedback value from a set of form feedback values;

calculating, based on the number of repetitions and the form feedback value, a user exercise score;

providing, via a graphical user interface, the user exercise score and the form feedback value to the user, thereby instructing the user to adjust their form during subsequent repetitions of the exercise.

12. The method of claim 11, further comprising:

identifying one or more weights associated with the exercise equipment;

tracking position, orientation and motion of the exercise equipment over the period of time;

wherein the form feedback value is determined based the user's tracked motion over the period of time, the tracked position, orientation and motion of the exercise equipment over the period of time, and the one or more form feedback models; and wherein the user exercise score is calculated based on the one or more weights associated with the exercise equipment, the number of repetitions and the form feedback value.

13. The method of claim 12, wherein the exercise equipment is of a particular color, and the one or more weights associated with the exercise equipment are identified based on the particular color.

14. The method of claim 12, further comprising:

ranking the user, based on the user exercise score, relative to a plurality of other users, wherein each of the other users have a corresponding user exercise score;

providing, via the graphical user interface, a leaderboard including a user list, the user list based on the ranking of the user relative to the other users.

15. The method of claim 11, wherein the estimating the set of joints of the user in the 3D model uses a machine learning model comprising a convolutional neural net machine learning model.

16. The method of claim 15, further comprising:

validating, using another machine learning model and a statistical model, the estimated set of joints of the user in the 3D model prior to tracking the user's motion over the period of time.

17. The method of claim 11, wherein the estimating the set of joints of the user in the 3D model is based on a point cloud comprising at least 80,000 points.

18. The method of claim 11, wherein the graphical user interface comprises a graphical user interface presented on a screen display of a free-standing A-frame exercise equipment cabinet.

19. The method of claim 11, further comprising:

determining, based on the user's tracked motion over the period of time and one or more machine learning models, a severity score associated with the exercise performed by the user over the period of time, the severity score indicating a degree of error in some or all of the movements of the exercise performed by the user;

notifying, based on the severity score and a dynamic severity threshold value, the user that the user has made an error.

20. The method of claim 11, further comprising:

reducing, in response to determining the form feedback value and based on the form feedback value, the number of determined repetitions performed by the user over the period of time.

* * * * *